US012222763B2

(12) United States Patent
Cha et al.

(10) Patent No.: US 12,222,763 B2
(45) Date of Patent: Feb. 11, 2025

(54) DISPLAY DEVICE

(71) Applicant: LG ELECTRONICS INC., Seoul (KR)

(72) Inventors: Taesung Cha, Seoul (KR); Kyungmin Jeong, Seoul (KR); Heegun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 17/771,794

(22) PCT Filed: Oct. 25, 2019

(86) PCT No.: PCT/KR2019/014143
§ 371 (c)(1),
(2) Date: Apr. 25, 2022

(87) PCT Pub. No.: WO2021/080053
PCT Pub. Date: Apr. 29, 2021

(65) Prior Publication Data
US 2022/0404872 A1    Dec. 22, 2022

(51) Int. Cl.
*G06F 1/16* (2006.01)
(52) U.S. Cl.
CPC .......... *G06F 1/1652* (2013.01); *G06F 1/1624* (2013.01); *G06F 1/1656* (2013.01); *G06F 1/1681* (2013.01)
(58) Field of Classification Search
CPC .... G06F 1/1652; G06F 1/1624; G06F 1/1656; G06F 1/1681; G06F 1/1601; G06F 1/16; G09F 9/301
See application file for complete search history.

(56) References Cited

U.S. PATENT DOCUMENTS 6,019,124 A * 2/2000 Sebion ................. F04B 53/103
417/571
2001/0052892 A1   12/2001 Oda
(Continued)

FOREIGN PATENT DOCUMENTS

| JP | 10215085 | 8/1998 |
| JP | 2008082158 | 4/2008 |

(Continued)

OTHER PUBLICATIONS

PCT International Application No. PCT/KR2019/014143, Search Report dated Jul. 17, 2020, 3 pages.
(Continued)

*Primary Examiner* — Abhishek M Rathod
*Assistant Examiner* — Keon Nmn Kim
(74) *Attorney, Agent, or Firm* — LEE, HONG, DEGERMAN, KANG & WAIMEY

(57) ABSTRACT

Provided is a display device including a housing; a roller installed inside the housing; a display unit wound around the roller; a link having a first arm povitably mounted on the display unit and a second arm pivotably connected to the first arm and povitably on to the housing; a lead screw installed inside the housing; a slider moving on the lead screw according to rotation of the lead screw; a rod having one side connected to the slider and the other side connected to the second arm; a plurality of springs allowing the lead screw to be inserted thereinto, providing an elastic force to the slider, and arranged in series; a spacer located between the plurality of springs and allowing the lead screw to be inserted thereinto; and a damping member supporting a lower side of the spring.

14 Claims, 73 Drawing Sheets

(56) References Cited

U.S. PATENT DOCUMENTS

| | | | |
|---|---|---|---|
| 2008/0001866 A1* | 1/2008 | Martin | F16M 11/10 |
| | | | 345/84 |
| 2010/0282798 A1* | 11/2010 | Park | B60R 11/0235 |
| | | | 224/309 |
| 2013/0149051 A1* | 6/2013 | Li | B23C 5/08 |
| | | | 407/30 |
| 2016/0032957 A1* | 2/2016 | Jung | F16B 33/002 |
| | | | 411/111 |
| 2017/0156219 A1 | 6/2017 | Heo et al. | |
| 2018/0160554 A1* | 6/2018 | Kang | H05K 5/0017 |

FOREIGN PATENT DOCUMENTS

| | | | | |
|---|---|---|---|---|
| JP | 2008082158 A * | 4/2008 | | B60J 1/2033 |
| KR | 200232059 | 10/2001 | | |
| KR | 20170062342 A * | 6/2016 | | H04N 5/65 |
| KR | 1020170062343 | 6/2017 | | |
| KR | 1020180027318 | 3/2018 | | |

OTHER PUBLICATIONS

European Patent Office Application Serial No. 19949623.3, Search Report dated Jun. 29, 2023, 10 pages.

* cited by examiner

DISPLAY DEVICE

CROSS-REFERENCE TO RELATED APPLICATIONS

This application is the National Stage filing under 35 U.S.C. 371 of International Application No. PCT/KR2019/014143, filed on Oct. 25, 2019, the contents of which are all incorporated by reference herein in their entirety.

TECHNICAL FIELD

The present disclosure relates to a display device.

BACKGROUND ART

As the information society has developed, the demand for display device is increasing in various forms, and accordingly, in recent years, various display devices such as a liquid crystal display (LCD), plasma display panel (PDP), electroluminescent display (ELD), vacuum fluorescent display (VFD), and the like have been studied and used.

Thereamong, a display device using an organic light emitting diode (OLED) has excellent luminance and viewing angle characteristics in comparison with a liquid crystal display device and does not require a backlight unit, thereby being implemented in an ultrathin type.

In addition, a flexible display may be bent or wound around a roller. A display device that unfolds on a roller or winds around the roller may be implemented as necessary, using the flexible display.

Structural research has been actively made on such a flexible display.

SUMMARY

The present disclosure is to solve the above and other problems.

The present disclosure is also to reduce noise that may occur when a display device is driven.

The present disclosure is also to reduce vibration that may occur when a display device is driven.

In an aspect, a display device includes: a housing; a roller installed inside the housing; a display unit wound around the roller; a link having a first arm povitably mounted on the display unit and a second arm pivotably connected to the first arm and povitably on to the housing; a lead screw installed inside the housing; a slider moving on the lead screw according to rotation of the lead screw; a rod having one side connected to the slider and the other side connected to the second arm; a plurality of springs allowing the lead screw to be inserted thereinto, providing an elastic force to the slider, and arranged in series; a spacer located between the plurality of springs and allowing the lead screw to be inserted thereinto; and a damping member supporting a lower side of the spring.

Also according to another aspect of the present disclosure, the damping member may have a depressed surface that forms a concave upper surface and contacts an outer circumferential surface of the spring, and a radial direction of the depressed surface may be the same as a radial direction of the spring.

Further, according to another aspect of the present disclosure, a curvature of the spring may be greater than a curvature of the depressed surface of the damping member.

According to another aspect of the present disclosure, the lead screw may include: a first lead screw; and a second lead screw spaced apart from the first lead screw in a longitudinal direction of the first lead screw, wherein the display device may further include: a motor assembly disposed between the first lead screw and the second lead screw and driving the first lead screw and the second lead screw.

According to another aspect of the present disclosure, the plurality of springs may allow the first lead screw to be inserted therein, and the plurality of springs may include: a first part spring located between the motor assembly and the slider; a second part spring located between the slider and the first part spring; and a third part spring located between the slider and the second part spring, wherein the spacer may include: a first spacer and a second spacer located between the first part spring and the second part spring; and a third spacer and a fourth spacer located between the second part spring and the third part spring.

According to another aspect of the present disclosure, the first spacer may be symmetrical with the second spacer, and the third spacer may be symmetrical with the fourth spacer.

According to another aspect of the present disclosure, the display device may further include: a first bearing supporting one side of the first lead screw; and a second bearing supporting the other side of the first lead screw.

According to another aspect of the present disclosure, the first bearing may be located adjacent to the motor assembly, and the spacer may further include: a fifth spacer located between the first bearing and the first part spring; and a sixth spacer located between the slider and the third part spring.

According to another aspect of the present disclosure, the spacer may further include: a body into which the first lead screw is inserted; a support rib formed on one surface of the body and inserted between one of the plurality of springs and the lead screw; a holding rib formed on one surface of the body and supporting an outer circumferential surface of one of the plurality of springs; and a friction rib facing the support rib with respect to the body and formed on the other surface of the body.

Also, according to another aspect of the present disclosure, a length of the support rib may be smaller than a thickness of a coil of the spring, and a length of the holding rib may be greater than the thickness of the coil of the spring.

Also, according to another aspect of the present disclosure, the thickness of the holding rib may be greater than the thickness of the support rib.

According to another aspect of the present disclosure, the body may have a ring shape, and the friction rib may include: a first friction rib located adjacent to an outer diameter of the body; and a second friction rib located adjacent to an inner diameter of the body.

According to another aspect of the present disclosure, the display device may further include: an accommodation portion located between the first friction rib and the second friction rib and forming a step from the first friction rib and the second friction rib, wherein a lubricant may be applied to the accommodation portion.

According to another aspect of the present disclosure, the first spacer may be symmetrical with the second spacer, the first friction rib of the first spacer may be in contact with the first friction rib of the second spacer, and the second friction rib of the first spacer may be in contact with the second friction rib of the second spacer.

Also, according to another aspect of the present disclosure, the display device may further include: a coupling connecting the motor assembly to the first lead screw.

Advantageous Effects

The effects of the display device according to the present disclosure will be described as follows.

According to at least one of the embodiments of the present disclosure, noise that may occur when a display device is driven may be reduced.

According to at least one of the embodiments of the present disclosure, vibration that may occur when a display device is driven may be reduced.

Further scope of applicability of the present disclosure will become apparent from the following detailed description. However, it should be understood that the detailed description and specific embodiments such as embodiments of the present disclosure are given by way of example only because various changes and modifications within the spirit and scope of the present disclosure may be clearly understood by those skilled in the art.

DESCRIPTION OF EXEMPLARY EMBODIMENTS

Hereinafter, embodiments of the present disclosure will be described below in detail with reference to the accompanying drawings where those components are rendered the same reference number that are the same or are in correspondence, regardless of the figure number, and redundant explanations are omitted. In the following description, usage of suffixes such as 'module', 'part' or 'unit' used for referring to elements is given merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

Hereinafter, an organic light emitting display (OLED) will be described as an example for a display panel, but the display panel applicable to the present disclosure is not limited to the liquid crystal panel.

Figure 1:
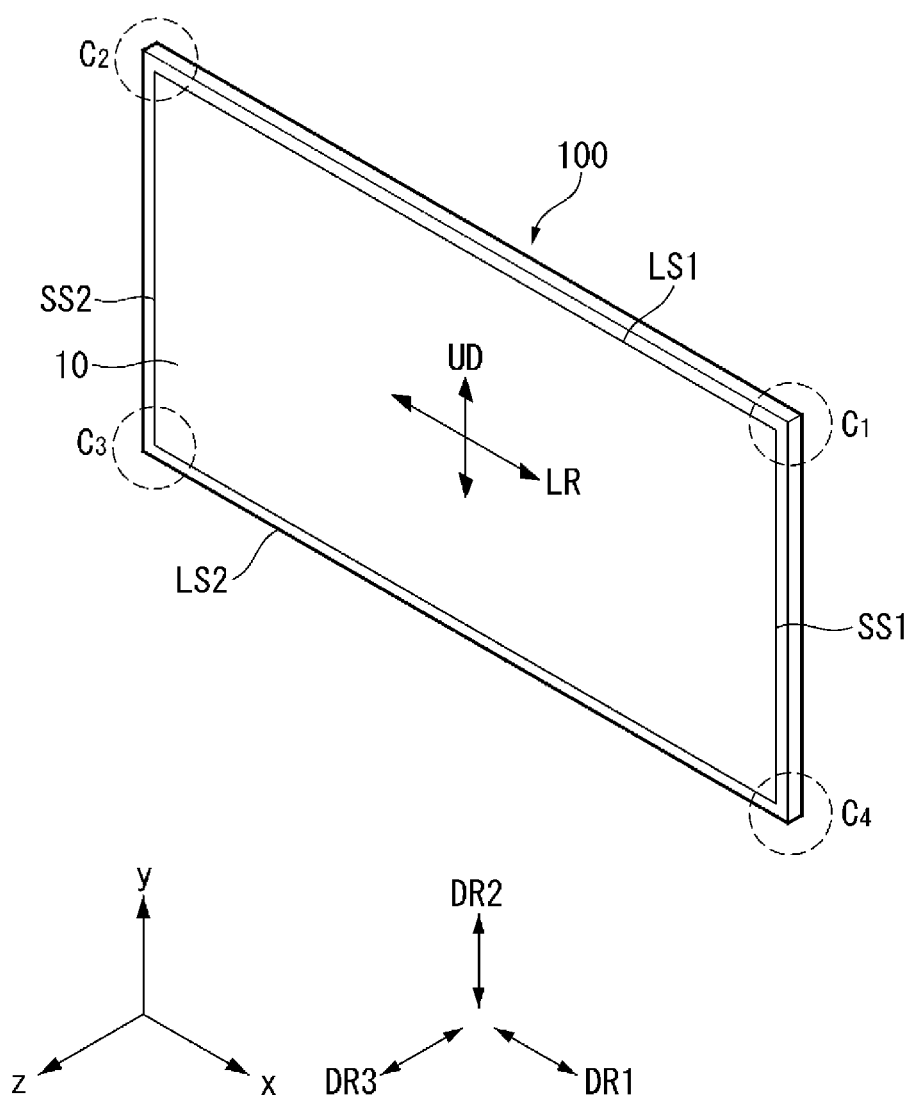
FIGS. 1 to 71 are diagrams illustrating examples of a display device according to embodiments of the present disclosure.

As shown in FIG. 1, below, the display panel 10 may include a first long side (LS1), a second long side (LS2) opposite to the first long side (LS1), a first short side (SS1) adjacent to the first long side LS1 and the second long side (LS2), and a second short side (SS2) opposite to the first short side (SS1).

Here, the first short side area SS1 may be referred to as a first side area, the second short side area SS2 may be referred to as a second side area opposite to the first side area, the first long side area LS1 may be referred to as a third side area adjacent to the first side area and the second side area and located between the first side area and the second side area, and the second long side area may be referred to as a fourth side area adjacent to the first side area and the second side area, located between the first side area and the second side area, and opposite to the third side area.

In addition, for convenience of explanation, lengths of the first and second long sides LS1 and LS2 are illustrated and described as being longer than lengths of the first and second short sides SS1 and SS2, but a case in which the lengths of the first and second long sides LS1 and LS2 are approximately equal to the lengths of the first and second short sides SS1 and SS2 may also be possible.

In addition, in the following, a first direction (DR1) may be a direction parallel to the long side (LS1, LS2) of the display panel 100, and a second direction (DR2) of the display panel 10 may be a direction parallel to the short side (SS1, SS2).

The third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

From another point of view, the side on which the display device 100 displays an image may be referred to as a front side or a front surface. When the display device 100 displays an image, the side from which an image cannot be observed may be referred to as a rear side or rear surface. When the display device 100 is viewed from the front side or the front surface, the side of the first long side LS1 may be referred to as an upper side or an upper surface. Similarly, the side of the second long side LS2 may be referred to as a lower side or a lower surface. Similarly, the side of the first short side SS1 may be referred to as a left side or left surface, and the side of the second short side SS2 may be referred to as a right side or a right surface.

In addition, the first long side LS1, the second long side LS2, the first short side SS1, and the second short side SS2 may be referred to as edges of the display device 100. Also, a point where the first long side LS1, the second long side LS2, the first short side SS1, and the second short side SS2 meet may be referred to as a corner. For example, a point where the first long side LS1 and the first short side SS1 meet may be a first corner C1, a point where the first long side LS1 and the second short side SS2 meet may be a second corner C2, a point where the second short side SS2 and the second long side LS2 meet may be a third corner C3, and a point where the second long side LS2 and the first short side SS1 meet may be a fourth corner C4.

Here, a direction from the first short side SS1 to the second short side SS1 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

A+x-axis direction may be referred to as a rightward direction, a right direction, or a right side direction. A ?x-axis direction may be referred to as a leftward direction, a left direction, or a left side direction. A+y-axis direction may be referred to as an upward direction. A ?y-axis direction may be referred to as a downward direction. A+z-axis direction may be referred to as a forward direction, a front direction, or a front side direction. A ?z-axis direction may be referred to as a rearward direction, a rear direction, or a rear side direction.

The x-axis direction may be a direction parallel to the first direction. The y-axis direction may be a direction parallel to the second direction. The z-axis direction may be a direction parallel to the third direction.

Figure 2:
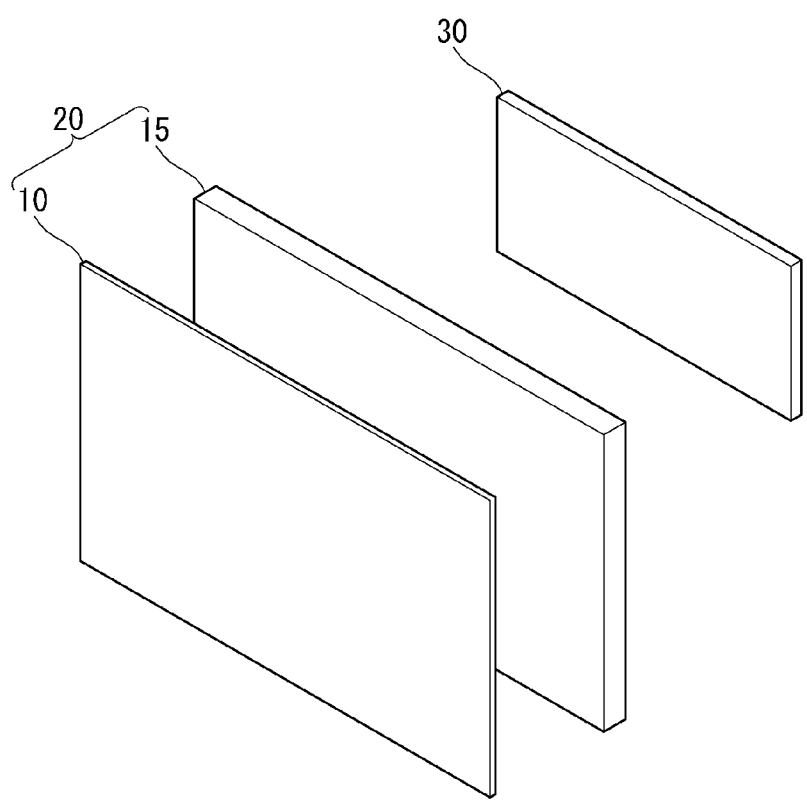

Referring to FIG. 2, the display device 100 according to the present disclosure may include a display unit 20 and a housing 30.

The display unit 20 may include a display panel 10 and a module cover 15. The display panel 10 may be provided on the front surface of the display device 100 and an image may be displayed. The display panel 10 may be controlled to divide an image into a plurality of pixels and emit light according to color, brightness, and saturation of each pixel to output an image. The display panel 10 may be divided into an active area in which an image is displayed and an inactive area in which an image is not displayed.

When the display panel 10 has elasticity, the display panel 10 may be referred to as a flexible display panel 10.

The display panel 10 may have a rectangular shape. However, the present disclosure is not limited thereto, and the display panel 10 may have a shape having a predetermined curvature at the corners. The display panel 10 may be an organic light emitting diode (OLED) panel. However, the present disclosure is not limited thereto, and the display panel 10 may be a liquid crystal display panel.

The module cover 15 may be provided on the rear surface of the display panel 10. The module cover 15 may be directly attached to the display panel 10. The module cover 15 may be the same as the size of the display panel 10 or larger than the display panel 10.

The module cover 15 may support the rear surface of the display panel 10. Accordingly, the module cover 15 may include a material which is light and has high strength. For example, the module cover 15 may include aluminum or a stainless material.

The housing 30 may be provided on the rear surface of the display unit 20. That is, the housing 30 may be provided on the rear surface of the module cover 15. The housing 30 may shield at least one PCB. That is, it means that the housing 30 covers at least one PCB attached to the rear surface of the module cover 15. A detailed coupling structure and coupling method of at least one PCB will be described below.

The housing 30 may transmit electromagnetic waves emitted from at least one PCB. Accordingly, although not illustrated, the housing 30 may include an inner housing formed of a conductive material and an outer housing covering the inner housing. However, the present disclosure is not limited thereto, and the housing 30 may be formed of a single conductive material.

Figure 3:
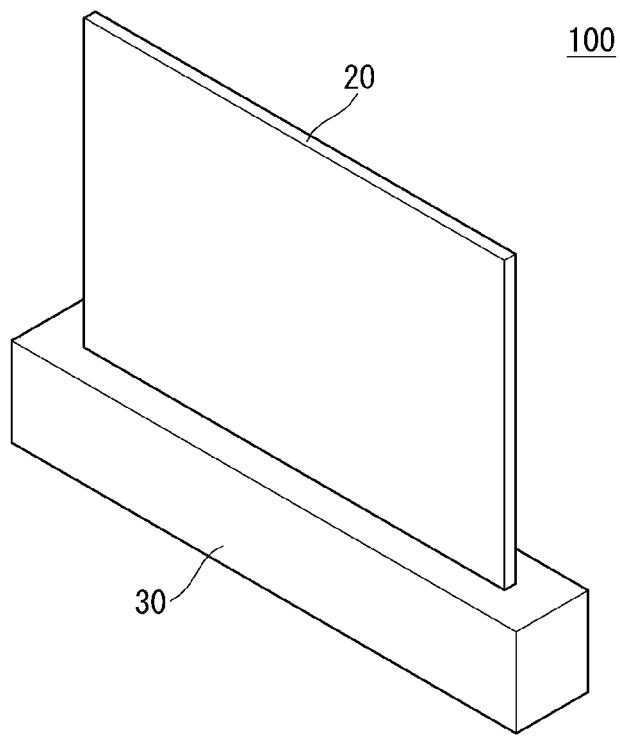
Figure 3:
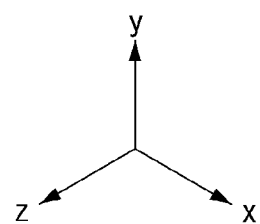

Referring to FIG. 3, the housing 30 may be located below the display unit 20. In detail, the housing 30 may have a shape surrounding a lower portion of the display unit 20. The housing 30 may prevent various driving equipment or driving circuits located therein from being exposed to the outside.

A width of the housing 30 in first and third directions may be greater than a width of the display unit 20 to protect the display unit 20 therein. A width of the housing 30 in a second direction may be smaller than a width of the display unit 20.

The housing 30 may not be located in an active area of the display unit 20.

Figure 4:
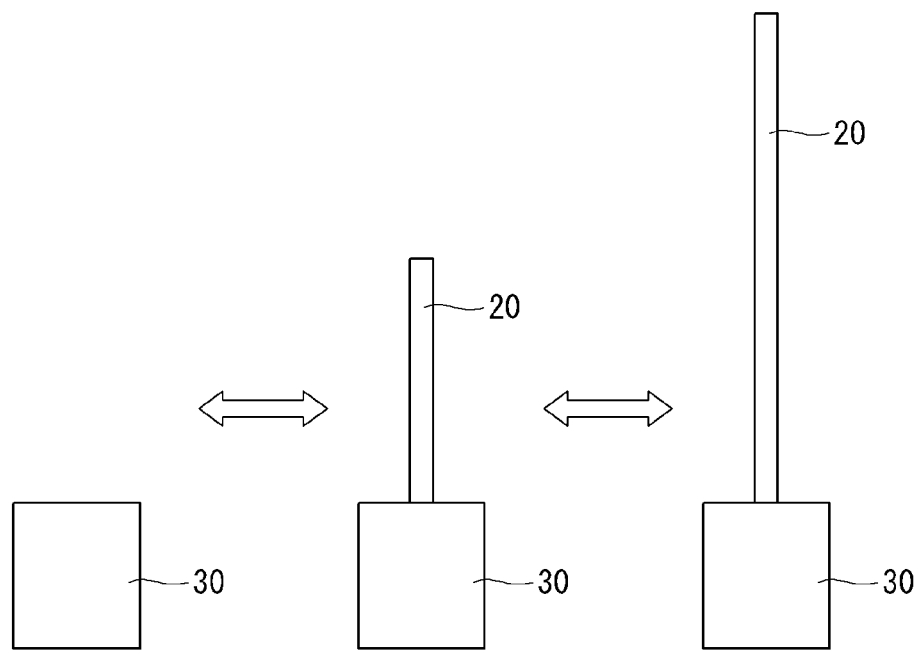

Referring to FIG. 4, the active region of the display unit 20 may be located inside the housing 30 in a first state and may be exposed to the outside of the housing 30 in a second state.

When the display device 100 is in the first state, the active area of the display unit 20 may be located inside the housing 30. That is, it means that the display unit 20 may be shielded by the housing 30.

When the display device 100 is in the second state, the active area of the display unit 20 may be exposed to the outside of the housing 30. That is, when the display unit 20 is in the second state, at least a portion thereof may protrude to an upper portion of the housing 30.

Although not shown, the display unit 20 may change from the first state to the second state by a roller located in the housing 30. In detail, the first state in which the display unit 20 is wound by the roller may be changed into the second state in which the roller may be unwound and the display unit 20 is exposed to the outside. Conversely, the display unit 20 may change from the second state to the first state when the roller in an unwound state is wound. A detailed structure and operation method of the roller and the display unit 20 will be described below.

The display unit 20 may be in any one of the first state and the second state. Accordingly, the display unit 20 may be exposed to the outside of the housing 30 only when the display device 100 is used, and space may be saved.

Figure 5:
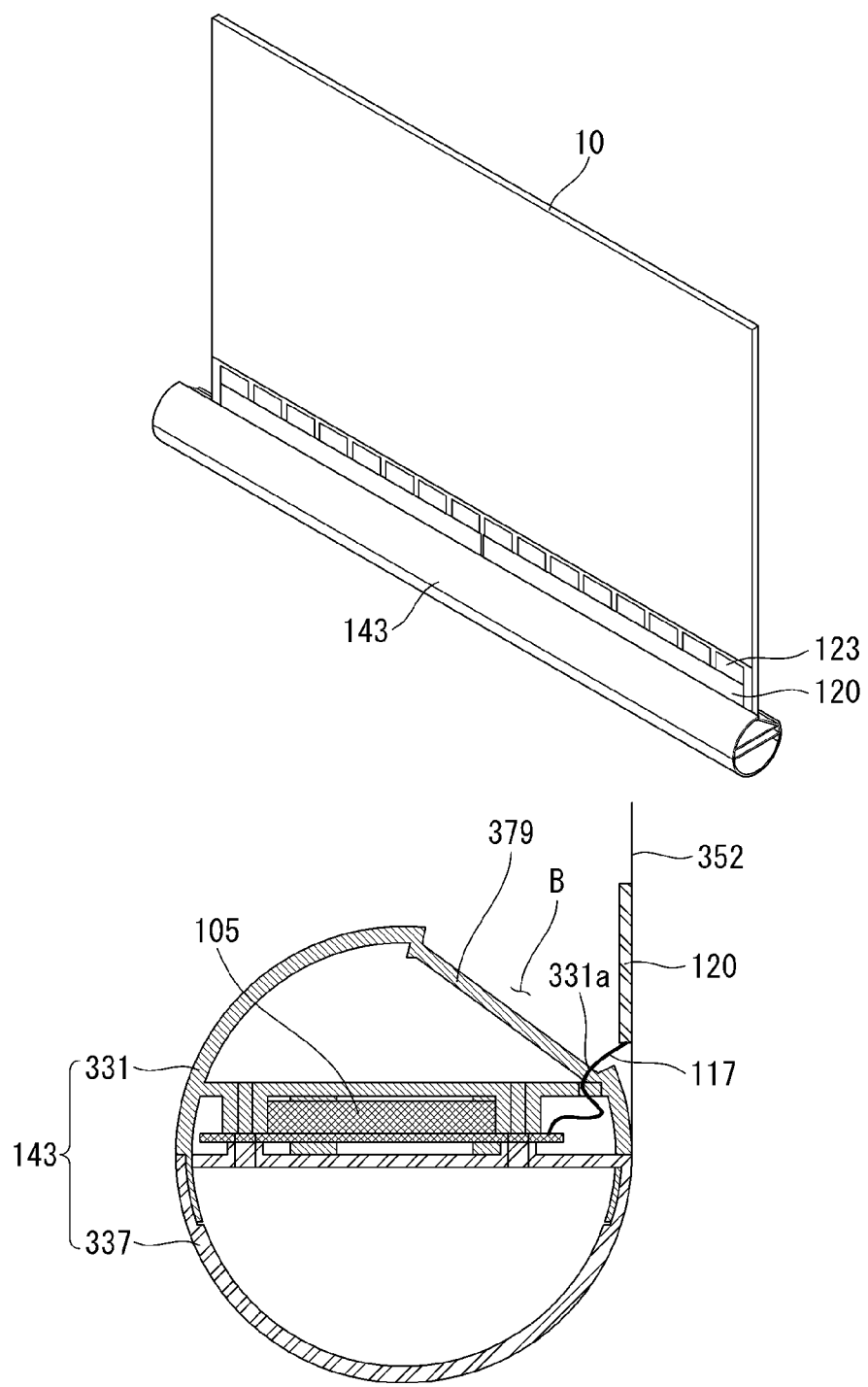

Referring to FIG. 5, a panel roller 143 may be connected to one end of the display panel 10. The panel roller 143 may wind and unwind the display panel 10 so that the display panel 10 may be in either the first state or the second state. The panel roller 143 may be referred to as a roller 143.

At least one source PCB 120 may be located on at least a portion of the front surface of the display panel 10. Each of the source PCBs 120 may be located to be spaced apart from each other.

Signal wirings for transmitting digital video data and timing control signals transmitted from a timing controller board 105 may be located in the at least one source PCB 120. The source PCB 120 may be connected to the display panel 10 by a source chip on film (COF) 123. The source COF 123 connected to one side of the source PCB 120 may extend to an active area of the display panel 10 to be connected to the display panel 10.

A seating portion 379 may be located on an outer periphery of the panel roller 143. The accommodation space B may be formed in the seating portion 379 as a portion of the outer periphery of the panel roller 143 is stepped. The seating portion 379 may be located at a portion where the source PCB 120 contacts the panel roller 143 as the panel roller 143 is wound. The seating portion 379 may have a shape in which at least a portion of the outer periphery of the panel roller 143 is depressed.

When the panel roller 143 is wound, the source PCB 120 may be accommodated in the accommodation space B formed by the seating portion 379. Accordingly, even when the panel roller 143 is wound, the source PCB 120 may not be damaged.

The timing controller board 105 may be mounted inside the panel roller 143. An FFC cable 117 may electrically connect the timing controller board 105 and the source PCB 120.

The panel roller 143 may include an upper panel roller 331 and a lower panel roller 337. The upper panel roller 331 and the lower panel roller 337 may be coupled to each other by screws. The timing controller board 105 may be mounted between the upper panel roller 331 and the lower panel roller 337. The screw may interconnect the upper panel roller 331, the lower panel roller 337, and the timing controller board 105. The FFC cable 117 may be connected to the timing controller board 105 and the source PCB 120 through the hole 331a located in the upper panel roller 331.

Since the timing controller board 105 rotates with the panel roller 143, the FFC cable 117 may not be twisted. In addition, since the timing controller board 105 is mounted inside the panel roller 143, space may be saved.

Figure 6:
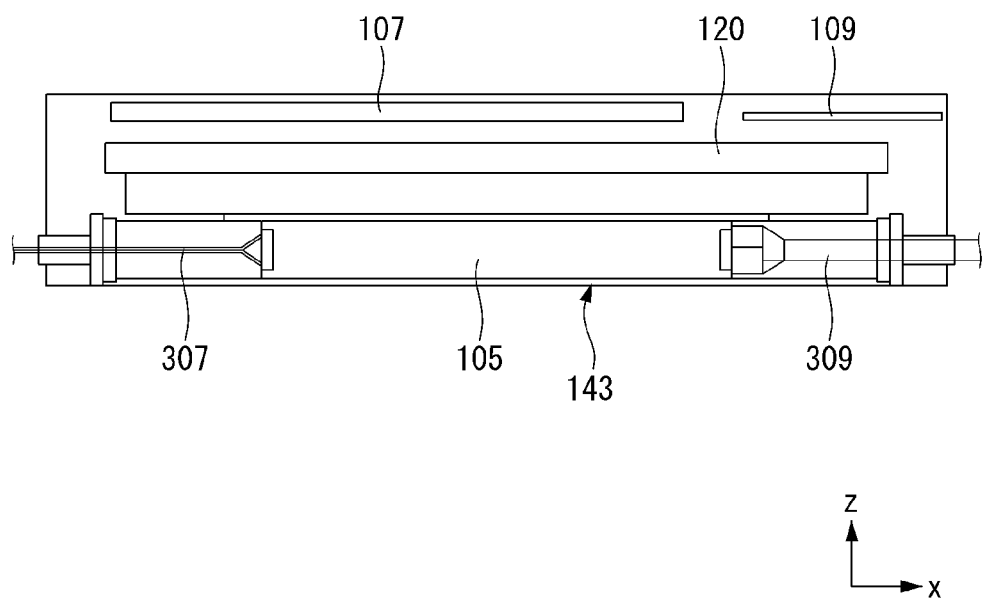

Referring to FIG. 6, the timing controller board 105 is mounted on the panel roller 143 on one side with respect to the center of the housing 30 from which the display panel moves up, and the main board 109 and the power supply 107 may be located on the other side.

The timing controller board 105 may be connected to the main board 109 and the power supply 107. The timing controller board 105 may be connected to the main board 109 and the power supply 107 through wiring electrodes. The wiring electrode may include a first wiring electrode 307 connecting the timing controller board 105 and the power supply 107 and a second wiring electrode 309 connecting the timing controller board 105 and the main board 109.

For example, the number of first wiring electrodes 307 may be plural. Also, the first wiring electrode 307 may have a circular shape. The first wiring electrode 307 may connect the timing controller board 105 and the power supply 107 through an opening in the center of a rotation shaft of the panel roller 143.

The second wiring electrode 309 may use an FFC cable through which the timing controller board 105 and the source PCB 120 are connected. The second wiring electrode 309 may connect the timing controller board 105 and the main board 109 through an opening in the center of a rotation shaft of the panel roller 143.

The first wiring electrode 307 and the second wiring electrode 309 may be located on opposite sides of the timing controller board 105. The opening through which the first wiring electrode 307 passes and the opening through which the second wiring electrode 309 passes may be located on opposite sides of each other.

The timing controller board 105 may be mounted on the panel roller 143, and the power supply 107 and the main board 109 may be located on opposite sides of the display panel. Accordingly, there is an advantage that the space inside the housing 30 may be saved.

Figure 7:
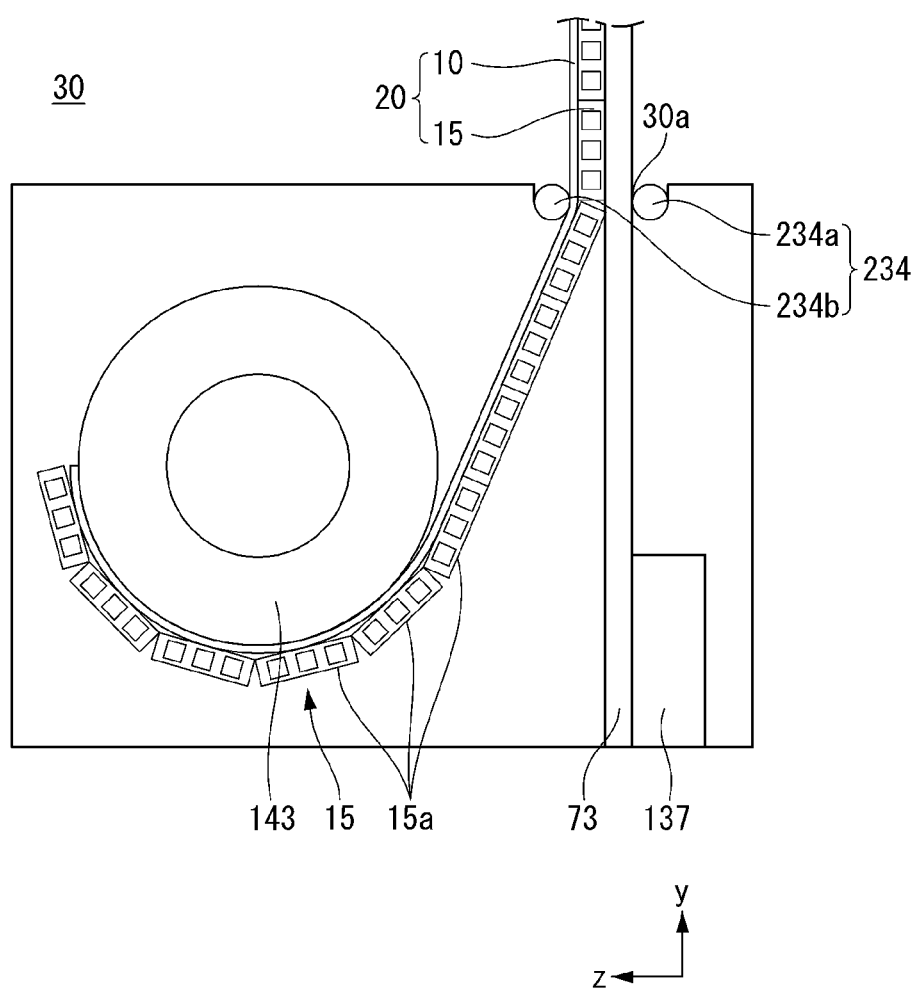

Referring to FIG. 7, the display device may include a panel roller 143, a motor assembly 137, and a link 73 inside the housing 30. The link 73 may also be referred to as a support portion 73. The module cover 15 may include a plurality of segments 15a. The segment 15a may also be referred to as an apron.

The panel roller 143 may be located in front of a portion where the display unit 20 of the housing 30 moves up and down. The panel roller 143 may simultaneously wind the display panel 10 and the module cover 15.

The link 73 may be installed in the housing 30. The link 73 may raise or lower an upper bar 75 (refer to FIG. 9A) coupled to an upper portion of the module cover 15 and the display panel 10.

The display unit 20 may be connected to an upper bar 75 at an upper end, and a lower end thereof may be connected to the panel roller 143. A portion between the upper end and the lower end of the display unit 20 may be easily bent. The link 73 may support the module cover 15 from the rear side of the module cover 15 so that the module cover 15 is not bent.

The motor assembly 137 may be located at a portion to which the link 73 is connected. The motor assembly 137 may drive the link 73 to be moved up and down. The motor assembly 137 may change the link 73 from the first state to the second state.

A guide bar 234 may be located at an inlet 30a through which the link 73 moves up and down into the housing 30. The guide bar 234 may include first and second guide bars 234a and 234b. The inlet 30a of the housing 30 may be formed between the first and second guide bars 234a and 234b. The first and second guide bars 234a and 234b may face each other with the link 73 interposed therebetween.

For example, the first guide bar 234a may be located at the rear of the link 73, and the second guide bar 234b may be located at the front of the link 73.

The display panel 10 and the module cover 15 may be simultaneously wound with the single roller 143. Accordingly, a thickness of the housing 30 may be reduced.

Figure 8:
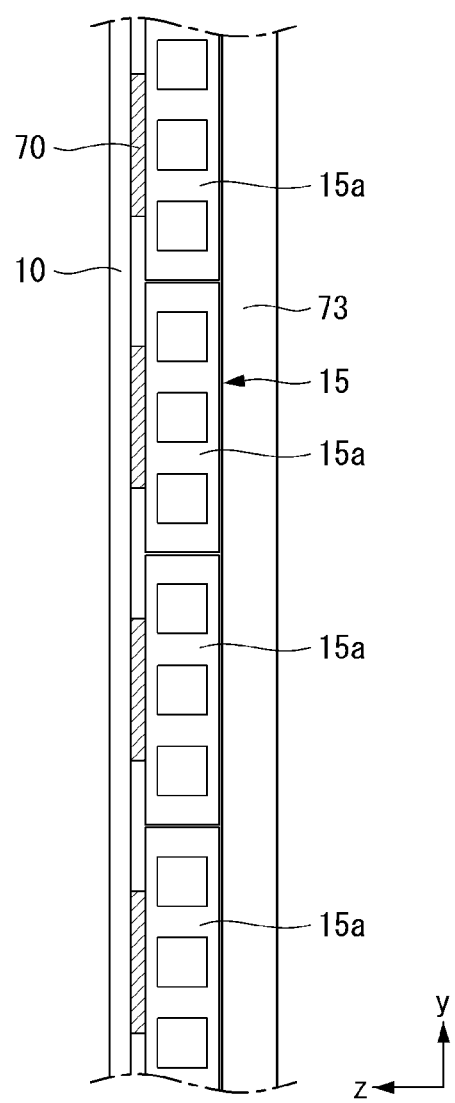

Referring to FIG. 8, the segments 15a may be spaced apart from each other in the y-axis direction, and may be attached to the rear surface of the display panel 10. The module cover 15 may include a plurality of segments 15a, and may be wound or unwound by the rollers 143. The module cover 15 may include a plastic or aluminum material. Accordingly, the module cover 15 may protect the display panel 10 from external impact.

The display panel 10 and the module cover 15 may be coupled through an adhesive layer 70. The adhesive layer 70 may be a double-sided tape. The module cover 15 may be wound together with the display panel 10 by the adhesive layer 70. The adhesive layer 70 may be located on each segment 15a to be attached to the display panel 10. The adhesive layer 70 may be spaced apart from each other. Accordingly, when the module cover 15 is wound or unwound by the roller, a shape thereof may be easily deformed. As a width of the adhesive layer 70 in the second direction decreases, the display panel 10 may not be crumpled and may be naturally unwound or wound around the panel roller 143 (refer to FIG. 7).

In addition, as a width of the segment 15a in the second direction increases, rigidity is improved to stably support the display panel 10.

When the width of the adhesive layer 70 in the second direction is less than or equal to 30% of the width of the segment 15a in the second direction, a small amount of external force may be transmitted to the display panel 10, thereby reducing a wrinkle of the display screen.

In addition, when the width of the adhesive layer 70 in the second direction is 15% or more of the width of the segment 15a in the second direction, the rigidity of the display panel 10 may be improved, thereby significantly reducing the wrinkle of the display panel 10.

Also, as the width of the adhesive layer 70 in the third direction increases, deformation of the display panel 10 with respect to an external force may be reduced. In detail, as the width of the adhesive layer 70 in the third direction is greater, flexibility is good, so that the display panel 10 and the module cover 15 may be stably attached to each other.

In addition, as the width of the segment 15a in the third direction decreases, the wrinkle of the display panel 10 may be reduced. In detail, as the width of the segment 15a in the third direction decreases, the rigidity of the segment 15a may be improved, thereby reducing the wrinkle of the display panel 10.

Accordingly, when the width of the adhesive layer 70 in the third direction is 3% or more of the width of the segment 15a in the third direction, the rigidity of the display panel 10 may be improved, so that the wrinkle of the display panel 10 may be significantly reduced.

In addition, when the width of the adhesive layer 70 in the third direction is 6% or less of the width of the segment 15a in the third direction, the rigidity of the display panel 10 may be improved, so that the wrinkle of the display panel 10 may be significantly reduced.

The module cover 15 includes a plurality of segments 15a, and the adhesive layer 70 may be located on each segment 15a.

Figure 9A:
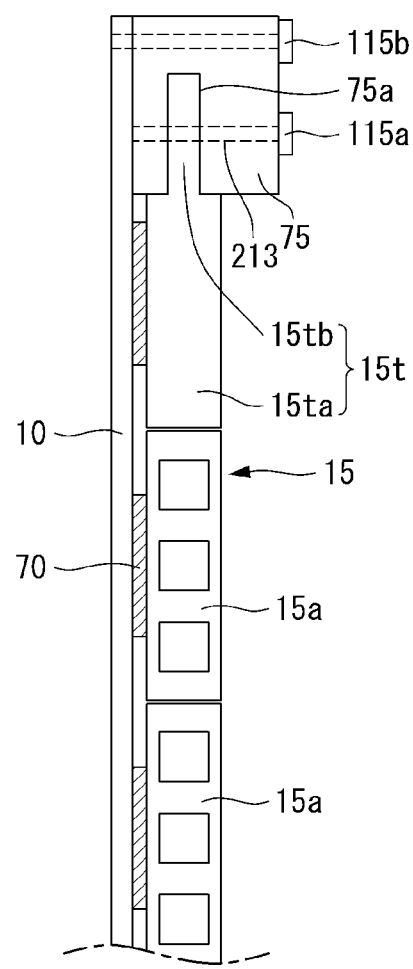
Figure 9B:
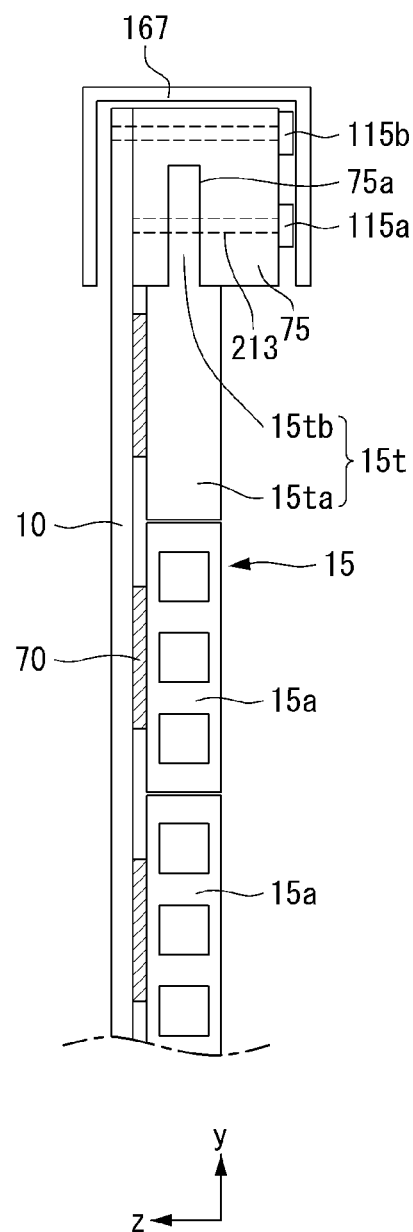

Referring to FIGS. 9A and 9B, the module cover 15 and the display panel 10 may be fastened to the upper bar 75.

The module cover 15, the display panel 10, and the upper bar 75 may be coupled to each other by screws 115a and 115b.

The screws 115a and 115b may allow the upper bar 75, the module cover 15, and the display panel 10 to move up and down together. The screw 115a may fasten the upper bar 75 and the module cover 15. Alternatively, the screw 115b may fasten the upper bar 75 to the display panel 10.

The upper portion of the module cover 15 may have a shape for being coupled to the upper bar 75. An upper segment 15t may be a segment located at the top of the module cover 15. The upper segment 15t may have a different shape from that of the other segments 15a. The upper segment 15t may be referred to as an upper module cover 15t.

The upper segment 15t may include a first body 15ta connected to the other segment 15a and a second body 15tb coupled to the upper bar 75. A lower end of the first body 15ta may be connected to the other segment 15a, and the second body 15tb may be formed on an upper portion of the first body 15ta.

The upper bar 75 may include a recess 75a formed in the +y-axis direction. The second body 15tb may be inserted into the recess 75a. A screw 115a may pass through the second body 15tb in the z-axis direction.

A thickness of the first body 15ta in the z-axis direction may be thicker than a thickness of the second body 15tb in the z-axis direction.

Referring to FIG. 9B, a top case 167 may cover the upper bar 75, the module cover 15, and the display panel 10. The upper bar 75, the module cover 15, and the display panel 10 may not be exposed to the outside by the top case 167. The top case 167 may be fastened to the upper bar 75, the module cover 15, or the display panel 10 by screws.

Figure 10A:
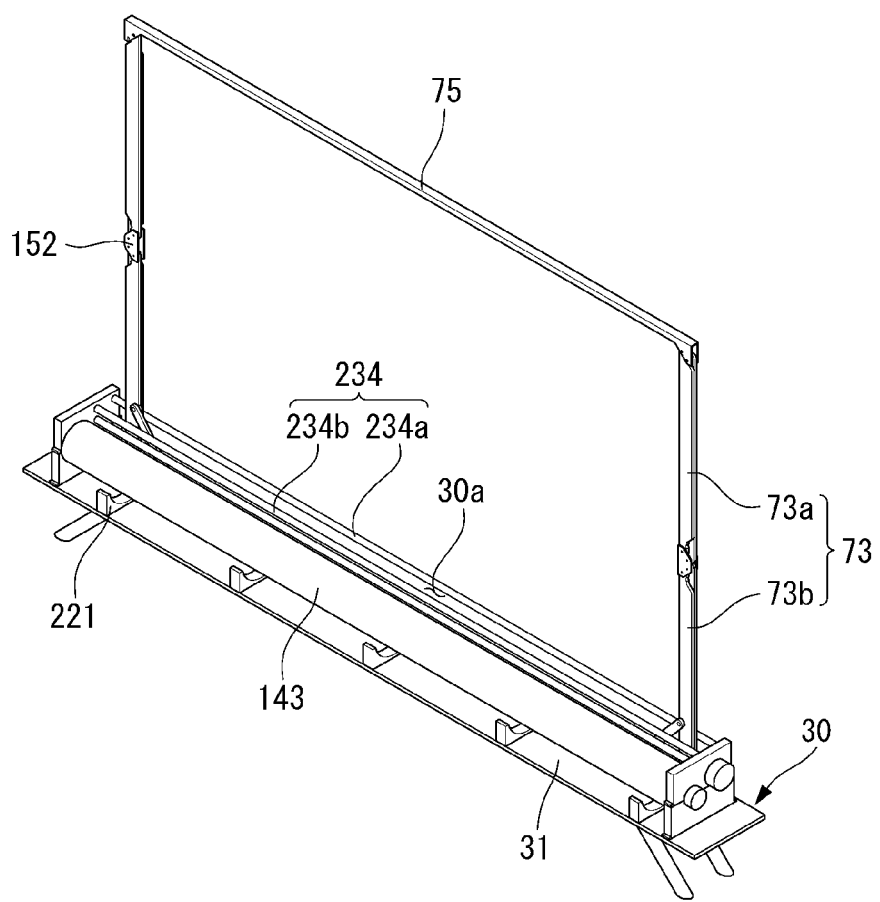

Referring to FIG. 10A, the link 73 may support both sides of the upper bar 75. The upper bar 75 may be raised and lowered by the link 73. The link 73 may include a first arm 73a and a second arm 73b. The first arm 73a may be referred to as an upper link 73a. The second arm 73b may be referred to as a lower link 73b.

The first arm 73a and the second arm 73b may be connected by an arm joint 152. The arm joint 152 may be referred to as a hinge 152 or a joint 152.

An upper end of the first arm 73a may be fastened to the upper bar 75, and a lower end of the first arm 73a may be fastened to the arm joint 152. A lower end of the second arm 73b may be fastened to the motor assembly, and an upper end of the second arm 73b may be fastened to the arm joint 152.

A guide bar 234 may be located at an inlet 30a through which the link 73 moves up and down into the housing 30. The guide bar 234 may include first and second guide bars 234a and 234b. The inlet 30a of the housing 30 may be located between the first and second guide bars 234a and 234b. The first and second guide bars 234a and 234b may face each other with the link 73 interposed therebetween. For example, the first guide bar 234a may be located at the rear of the link 73, and the second guide bar 234b may be located at the front of the link 73.

The panel roller 143 may be located in front of the link 73. The base 31 of the housing 30 may include a plurality of brackets 221. The base 31 may also be referred to as a bottom surface 31.

The plurality of brackets 221 may be formed below the panel roller 143. The plurality of brackets 221 may be spaced apart from each other in the longitudinal direction of the panel roller 143. Alternatively, the plurality of brackets 221 may be spaced apart from each other in the longitudinal direction of the base 31. Each bracket 221 may be fixed to the base 31 through a screw.

Figure 10B:
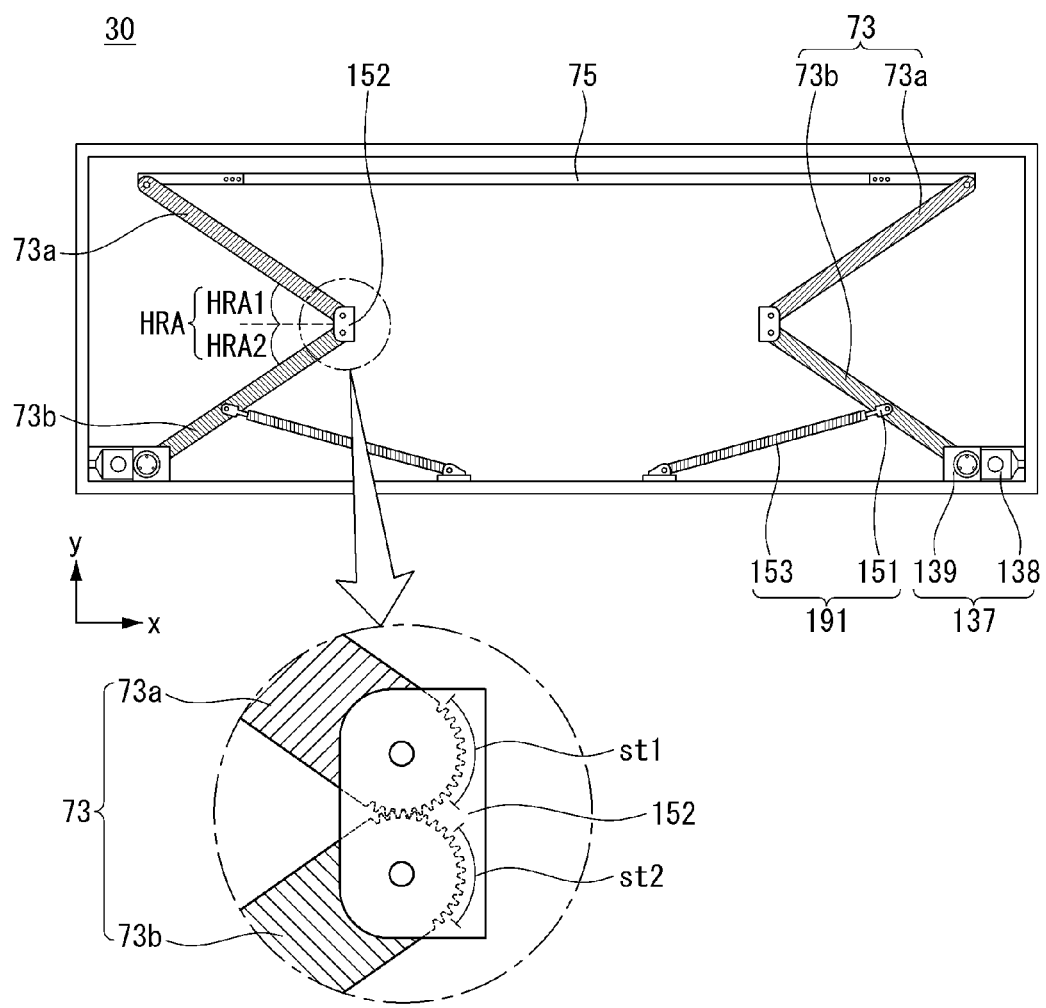

Referring to FIG. 10B, one end of the first arm 73a located inside the arm joint 152 and one end of the second arm 73b may be correspondingly engaged to have a gear shape. The arm joint 152 may also be referred to as a connection portion 152. The first arm 73a may also be referred to as an upper support link 73a. The second arm 73b may also be referred to as a lower support link 73b.

The first arm 73a may be pivotably connected to an upper portion of the arm joint 152. The second arm 73b may be pivotably connected to a lower portion of the arm joint 152.

A gear st1 may be formed at a lower portion of the first arm 73a. A gear st2 may be formed at an upper portion of the second arm 73b. The gear st1 of the first arm 73a and the gear st2 of the second arm 73b may be engaged with each other.

An angle HRA1 of the first arm 73a from the ground and an angle HRA2 of the second arm 73b from the ground may be the same because the first arm 73a and the second arm 73b are engaged with each other to have a gear shape. Also, an angle between the first arm 73a and the second arm 73b on both sides may also be the same because the first arm 73a and the second arm 73b are engaged with each other to have a gear shape. Accordingly, both sides of the upper bar 75 may be raised or lowered, while maintaining a level without inclining. That is, the angle between the first arm 73a and the second arm 73b of each link 73 may be the same regardless of a height of the upper bar 75 from the ground.

Figure 11:
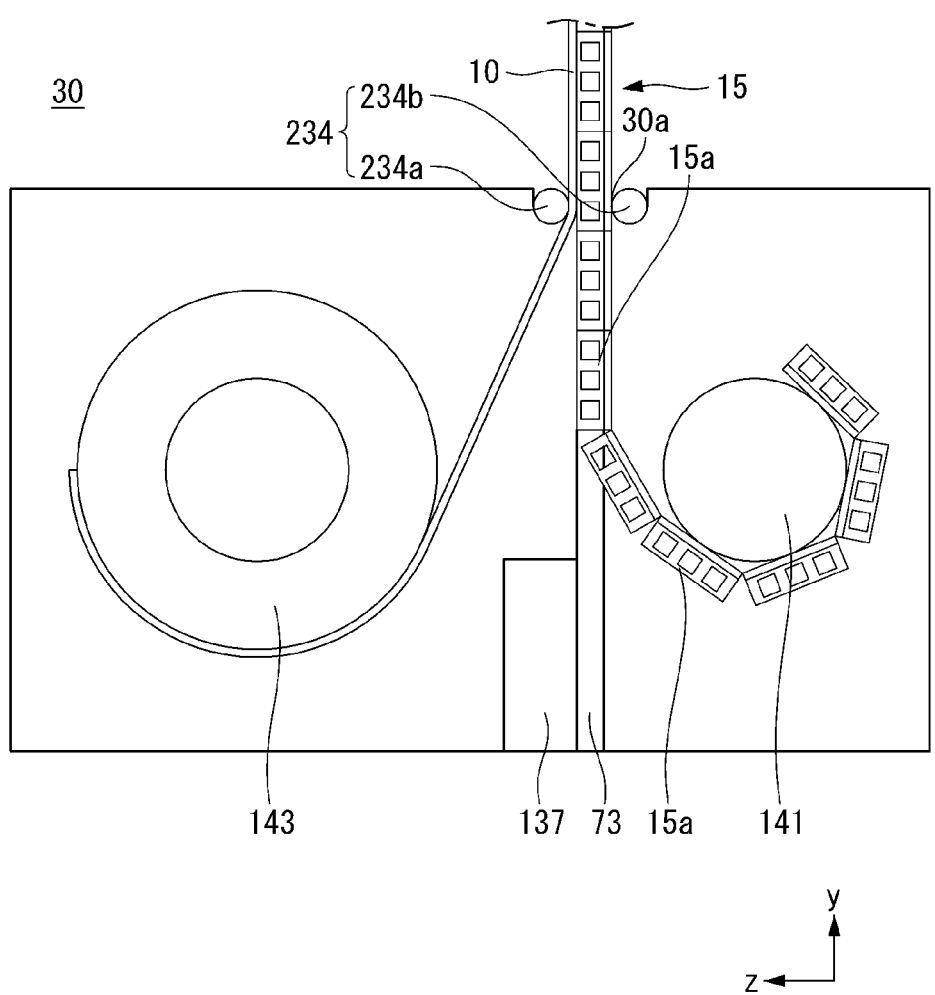

Referring to FIG. 11, a module cover roller 141, as well as the panel roller 143, may be further installed in the housing 30. The module cover roller 141 may also be referred to as an apron roller 141.

The panel roller 143 may be located in front of the link 73 and the module cover roller 141 may be located in the rear. That is, the panel roller 143 and the module cover roller 141 may face each other based on the link 73.

The panel roller 143 may wind the display panel 10, and the module cover roller 141 may wind the module cover 15.

The module cover 15 may be thicker than the display panel 10. The module cover roller 141 on which the module cover 15 is wound may occupy more space inside the housing 30 than the panel roller 143 on which the display panel 10 is wound. Accordingly, the motor assembly 137 may be located in front of the link 73 having a relatively enough space.

Since the display panel 10 and the module cover 15 are separately wound inside the housing 30, a force for the panel roller 143 to wind the display panel 10 may be greater than an adhesive force between the display panel 10 and the module cover 15. In addition, a force for the module cover roller 141 to wind the module cover 15 may be greater than the adhesion force between the display panel 10 and the module cover 15.

In the present disclosure, the display panel 10 and the module cover 15 may be wound by two rollers, respectively. Accordingly, compared to a case in which both the display panel 10 and the module cover 15 are wound on one roller, a smaller weight may be wound on each roller. Accordingly, sagging of the display panel 10 wound around the panel roller 143 may be prevented. In addition, sagging of the module cover 15 wound around the module cover roller 141 may be prevented.

Figure 12:
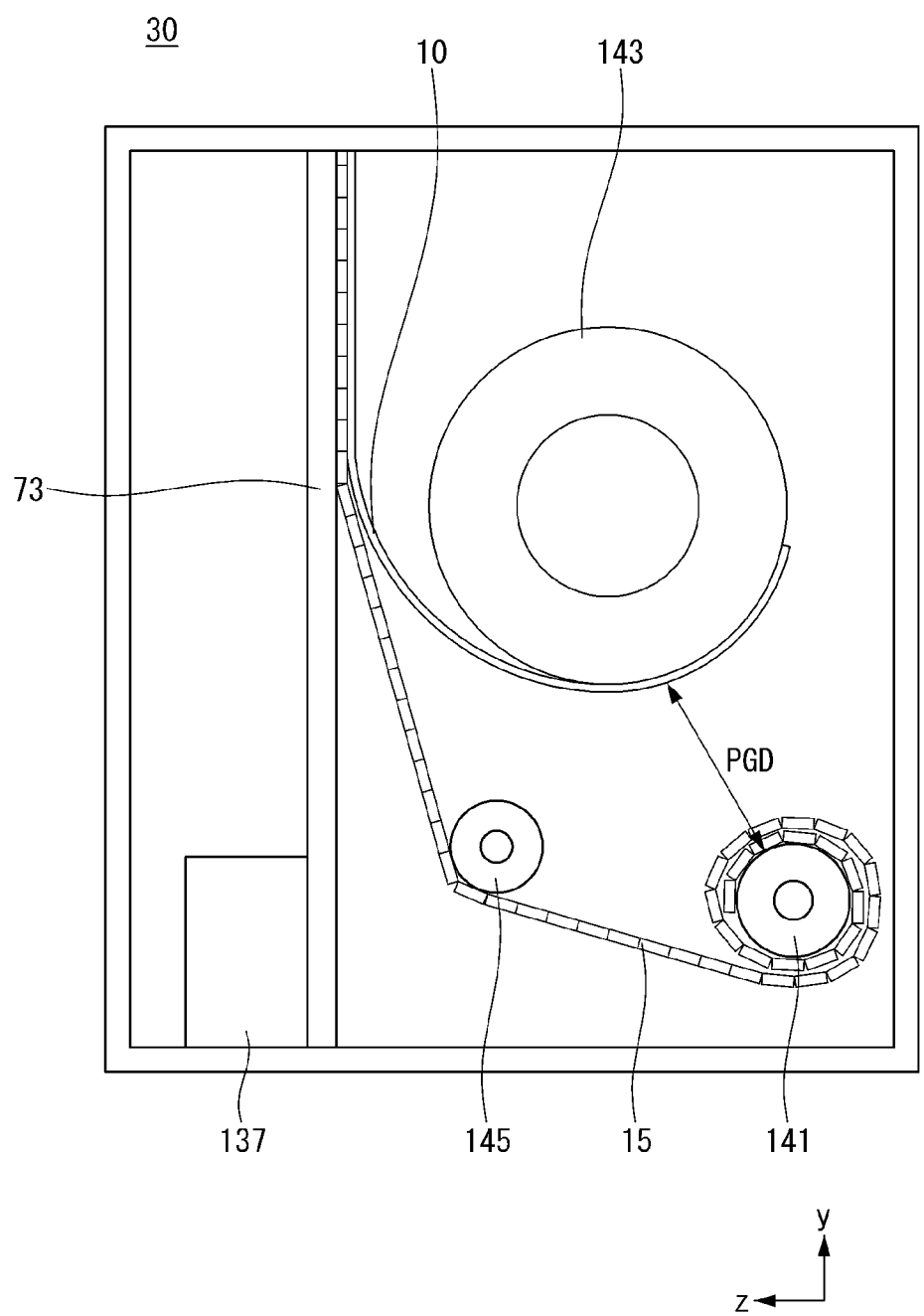

Referring to FIG. 12, the panel roller 143 and the module cover roller 141 may be located on the same side with respect to the link 73. For example, the panel roller 143 and the module cover roller 141 may be located at the rear of the link 73. However, the present disclosure is not limited thereto, and the panel roller 143 and the module cover roller 141 may be located in front of the link 73.

The module cover roller 141 may be located below the panel roller 143. The module cover roller 141 on which the module cover 15 is wound and the panel roller 143 on which the display panel 10 is wound may interfere with each other. Accordingly, the module cover roller 141 is spaced apart from the panel roller 143 by a first gap (PGD) or more, thereby preventing mutual interference.

The first gap PGD may be a distance at which interference between the display panel 10 wound around the panel roller 143 and the module cover 15 wound around the module cover roller 141 is prevented.

The guide roller 145 may be located under the panel roller 143. The guide roller 145 may guide a position of the module cover 15 so that the module cover 15 does not interfere with the panel roller 143.

Figure 13:
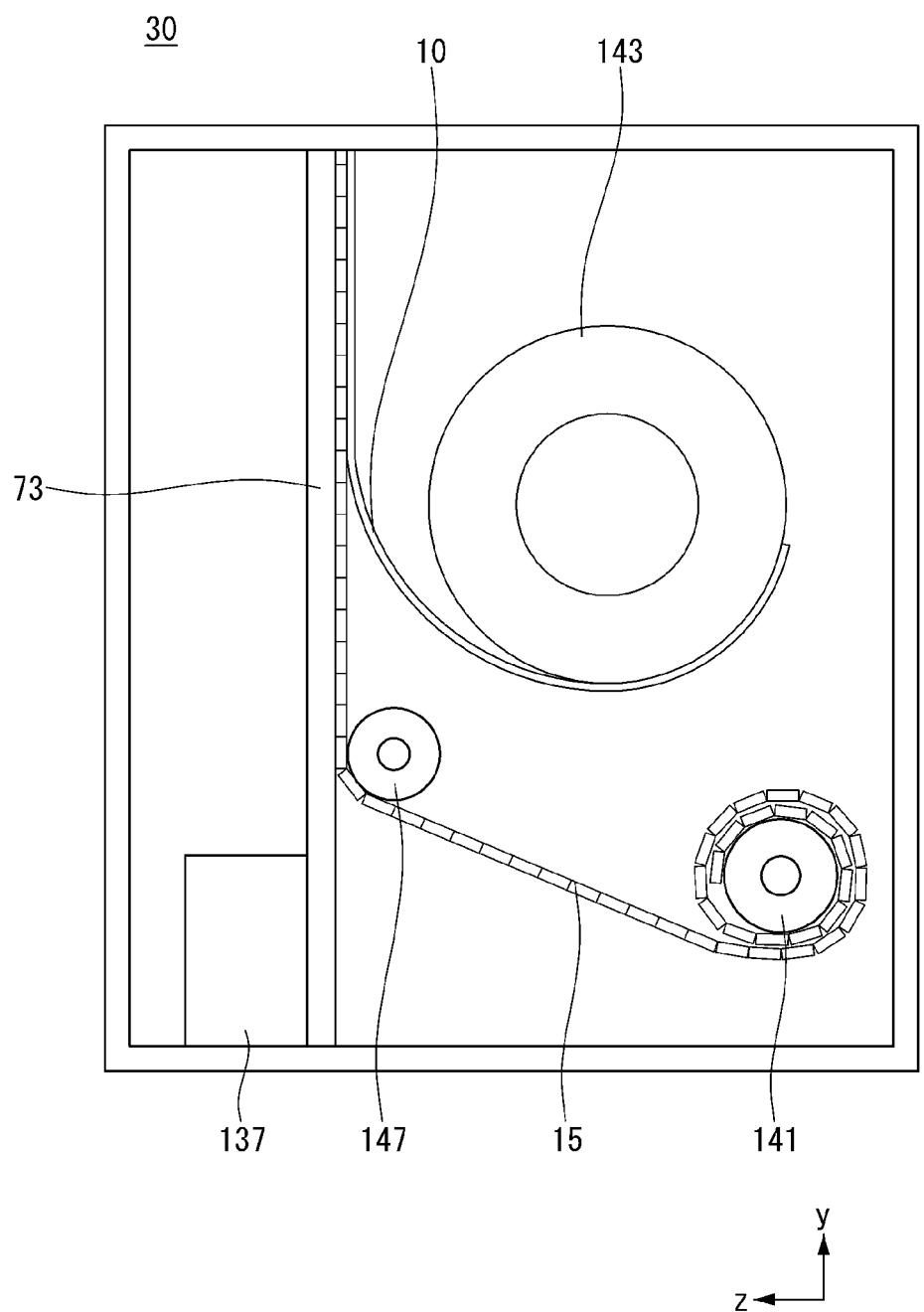

Referring to FIG. 13, a pressure roller 147 may be located below the panel roller 143. The pressure roller 147 may press the module cover 15 so that the module cover 15 comes into contact with the link 73. Accordingly, sagging or bending of the module cover 15 may be prevented. The pressure roller 147 may be located adjacent to the link 73. The pressure roller 147 may guide the module cover 15 so that the module cover 15 and the display panel 10 do not interfere with each other.

Figure 14:
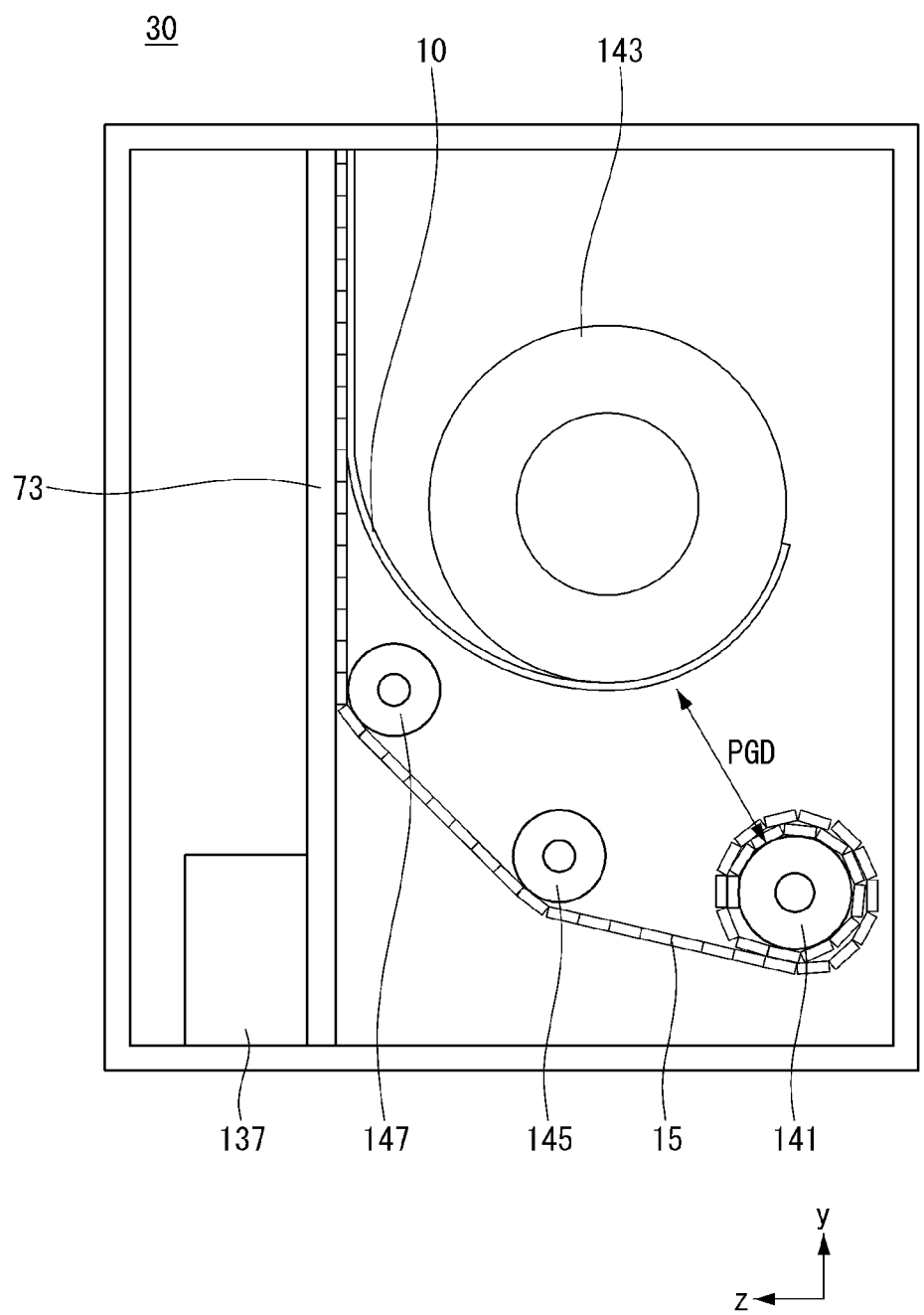

Referring to FIG. 14, the guide roller 145 and the pressure roller 147 may be located below the panel roller 143. The guide roller 145 may guide a position of the module cover 15 so that the module cover 15 does not interfere with the panel roller 143. The pressure roller 147 may press the module cover 15 so that the module cover 15 comes into contact with the link 73.

Accordingly, a malfunction of the display device due to sagging or bending of the module cover 15 may be prevented. In addition, a malfunction of the display device due to mutual interference between the module cover 15 and the display panel 10 may be prevented.

Figure 15:
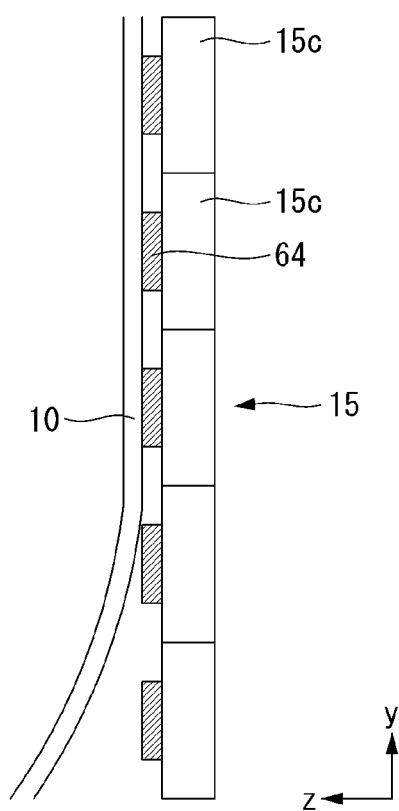

Referring to FIG. 15, segments 15*c* located on both sides of the module cover may be attached to the display panel 10. The segment 15*c* may also be referred to as a third module cover 15*c*.

A magnet 64 may be attached to the front side of the segment 15*c*. A magnet 64 may be attached to the segment 15*c* via double-sided tape. The magnet 64 may be provided for each segment 15*c*.

The display panel 10 may include a metal material. Accordingly, the display panel 10 and the magnet 64 may be attached to each other by magnetic force. Also, the display panel 10 and the segment 15*c* may be attached to each other due to the magnet 64.

The display panel 10 may include a Fe—Ni Invar alloy on the rear surface. Accordingly, the display panel 10 may be strongly attached to the magnet 64.

Since the display panel 10 and the module cover 15 are attached by the magnets 64 located only on both sides of the module cover 15, a lot of the magnets 64 are not needed, so manufacturing costs may be saved.

Figure 16:
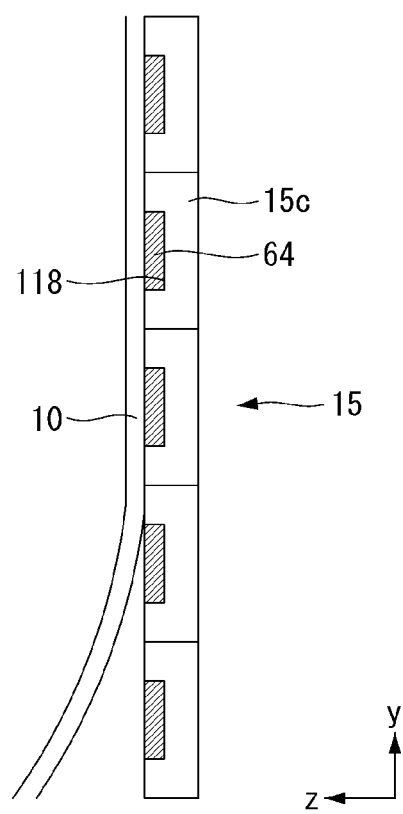

Referring to FIG. 16, the magnet 64 may be located inside a recess 118 of the segment 15*c*. The recess 118 may be located on a surface of the segment 15*c* facing the display panel 10. The recess 118 may be located in the front surface of each segment 15*c*. Since the magnet 64 is accommodated inside the recess 118, the magnet 64 may not protrude from the segment 15*c*. The display panel 10 may be flat without being wrinkled even when it is in contact with the segment 15*c*. As the magnet 64 is received inside the recess 118, a thickness of the segment 15*c* may be reduced. Also, due to this, a thickness of the display device may be reduced.

Figure 17:
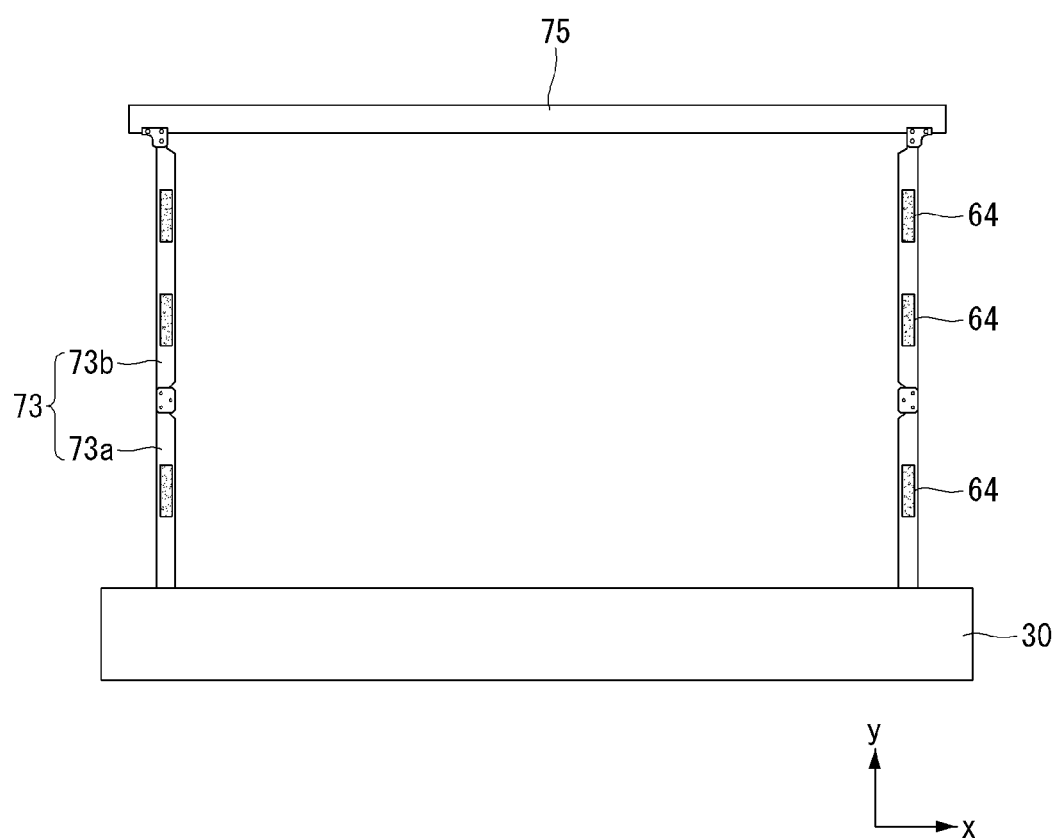

Referring to FIG. 17, a plurality of magnets 64 may be located on a link 73. For example, at least one magnet 64 may be located on a first arm 73*a* and at least one magnet 64 may be located on a second arm 73*b*. The plurality of magnets 64 may be spaced apart from each other.

The display unit may include a metal material. The display unit may be in close contact with the link 73 by the magnet 64. Even if the magnetic force of any one of the plurality of magnets 64 is weakened, the display panel and the module cover may be maintained to be in close contact with the link 73 due to the magnetic force of the other magnets 64.

Figure 18:
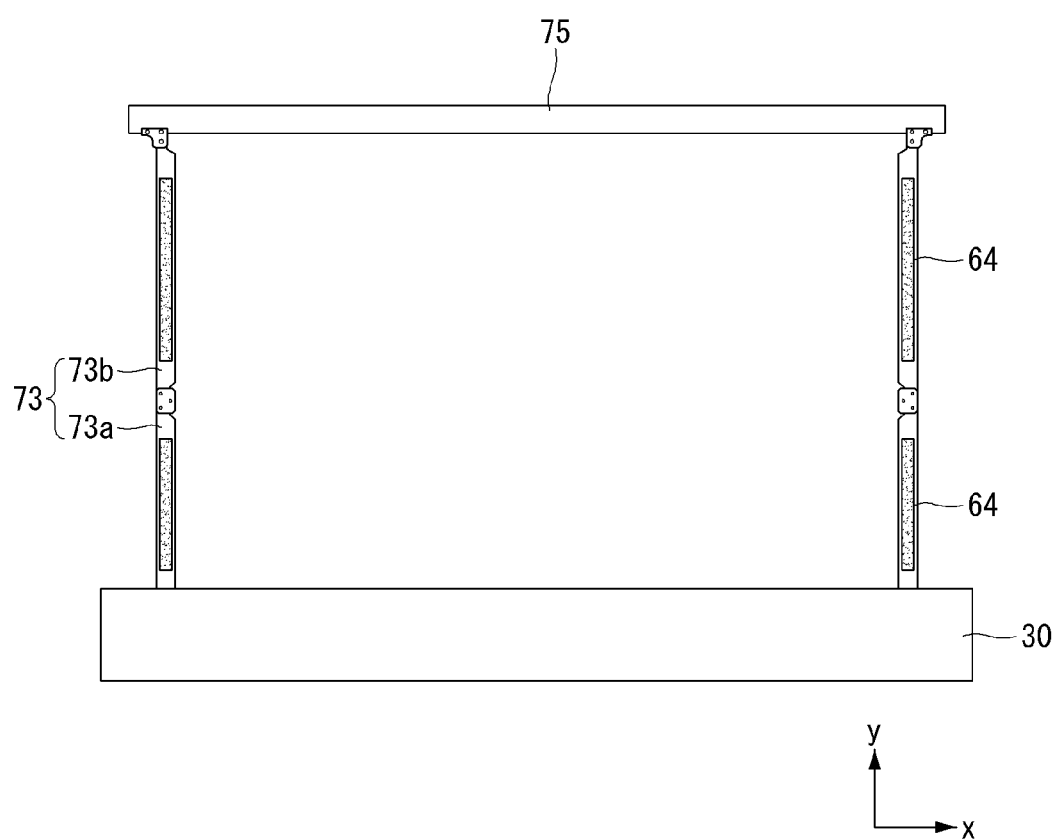

Referring to FIG. 18, one magnet 64 may be located on each of the first arm 73*a* and the second arm 73*b*. In this case, the magnet 64 may have a shape elongated in a long side direction of the first arm 73*a* and the second arm 73*b*.

Since the magnet 64 has a shape elongated in the long side direction of the first arm 73*a* and the second arm 73*b*, the area of the portion where the link 73 is in close contact with the display panel and the module cover may be increased. Accordingly, the adhesion between the link 73 and the display panel and the module cover may be strengthened.

Figure 19:
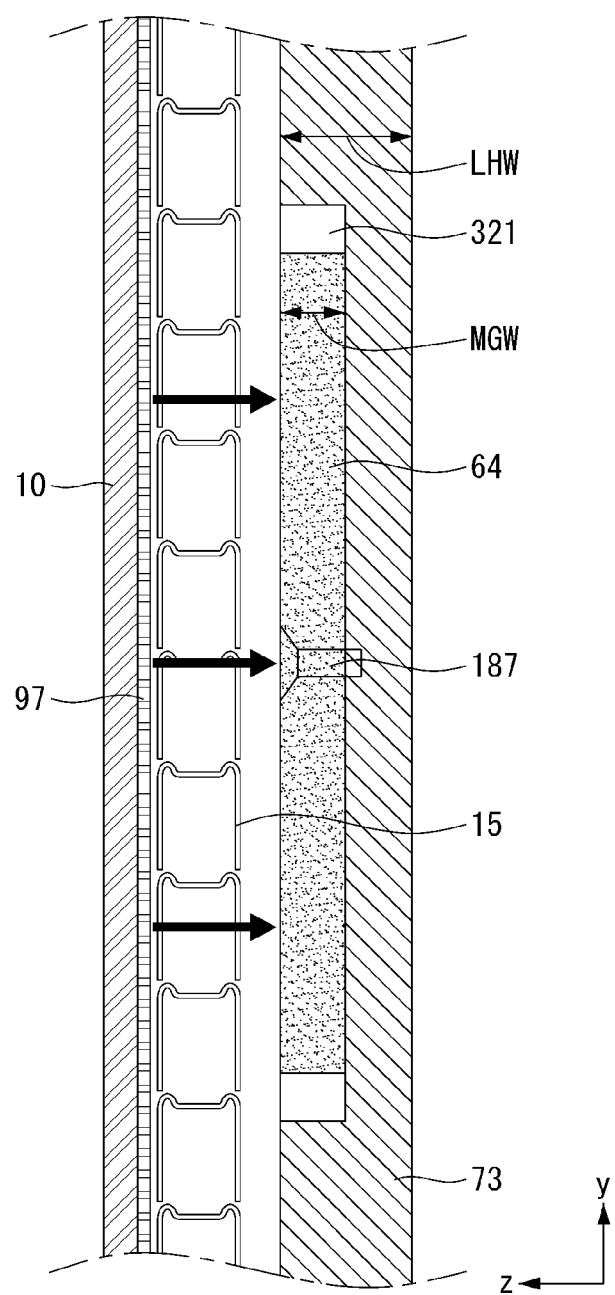

Referring to FIG. 19, the magnet 64 may be located in a depression 321 formed in the link 73. The depression 321 may have a shape recessed inward of the link 73. The magnet 64 may be coupled to the link 73 through at least one screw 187.

A width LHW in which the depression 321 is recessed inwardly of the link 73 may be equal to or greater than the thickness MGW of the magnet 64. If the thickness MGW of the magnet 64 is greater than the width LHW of the depression 321, the display panel 10 and the module cover 15 may not be in close contact with the link 73. In this case, the display panel 10 may be wrinkled or may not be flat.

A panel protector 97 may be disposed in the rear surface of the display panel 10. The panel protector 97 may prevent the display panel 10 from being shocked due to friction with the module cover 15. The panel protector 97 may include a metal material. The panel protector 97 may have a very thin thickness. For example, the panel protector 97 may have a thickness of about 0.1 mm.

Since the panel protector 97 contains a metal material, magnetic attraction between the panel protector 97 and the magnet 64 may occur. The module cover 15 located between the panel protector 97 and the link 73 may be in close contact with the magnet 64 even if it does not contain a metal material.

Figure 20:
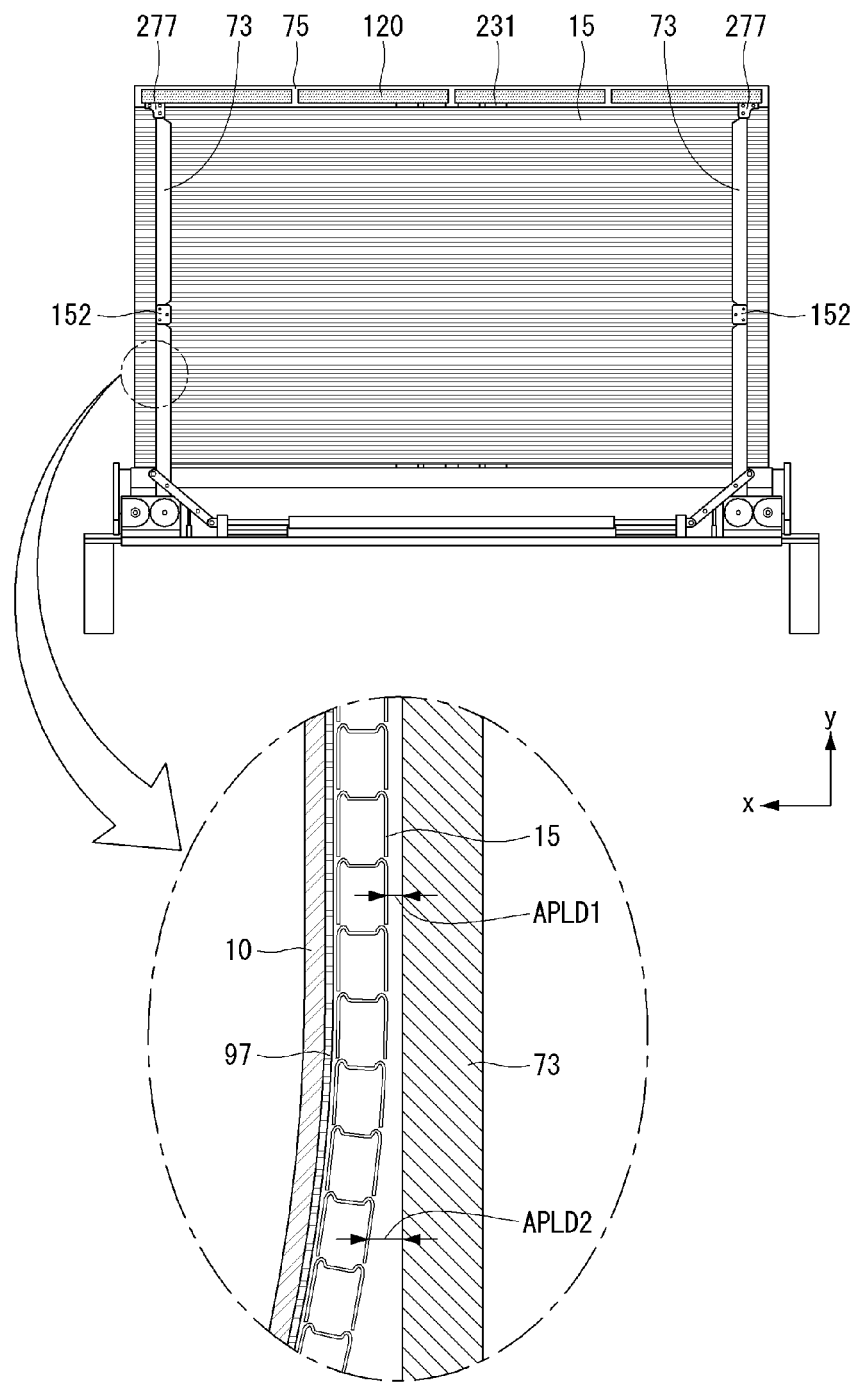

Referring to FIG. 20, when the magnet is not provided on the link 73, the module cover 15 may be in close contact with the link 73 by an upper bar 75 of the upper side and a guide bar 234 (234 of FIG. 10) of the lower side. A portion between the upper bar 75 and the guide bar 234 of the link 73 may not be in close contact with the module cover 15. Alternatively, the central portion of the link 73 may not be in close contact with the module cover 15. The central portion of the link 73 may be near an arm joint 152. In this case, the distance APRD1, APLD2 between the module cover 15 and the link 73 may not be constant. In this case, the display panel 10 may be bent or twisted.

Figure 21:
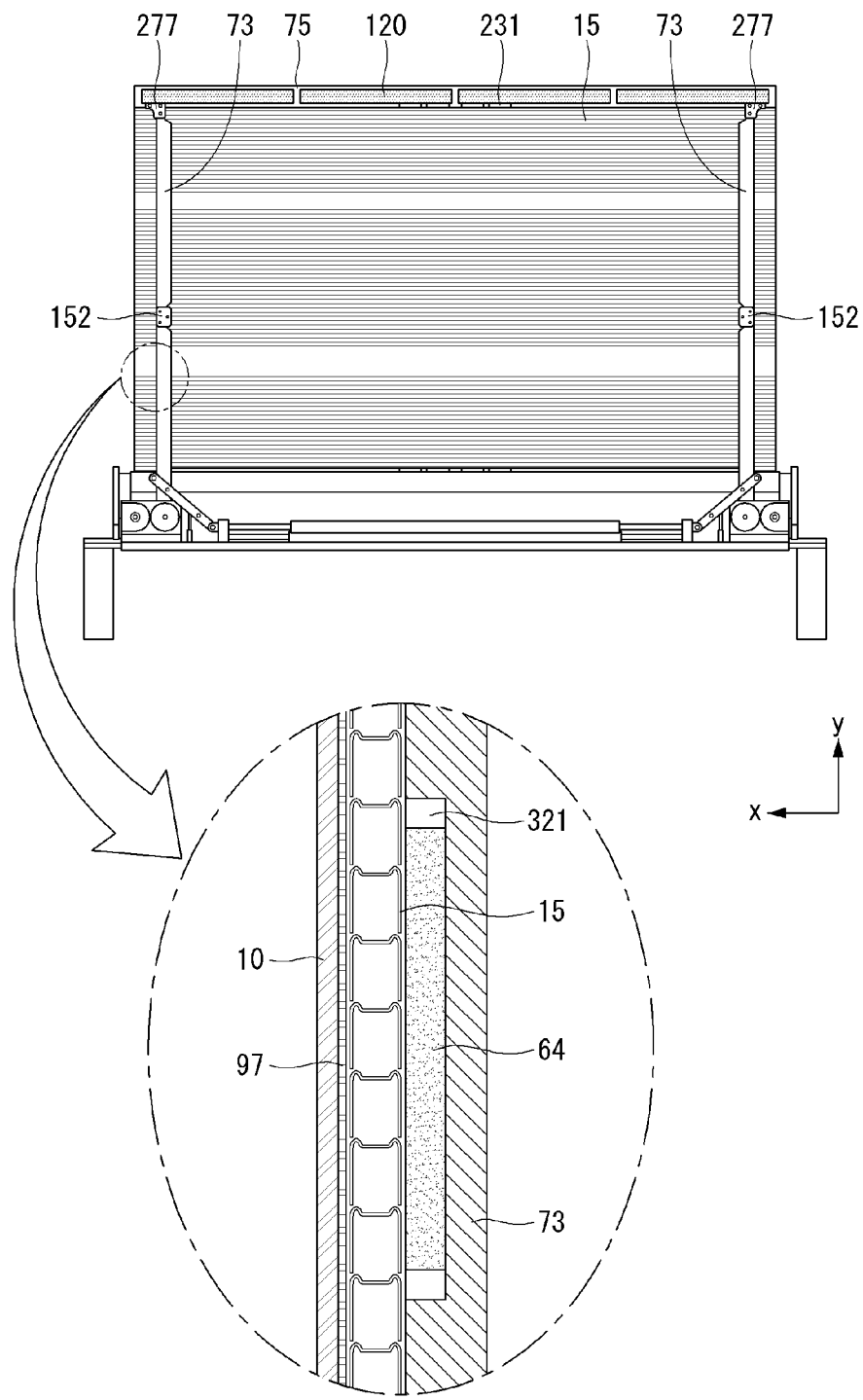

Referring to FIG. 21, when the magnet 64 is located in the depression 321 of the link 73, the magnet 64 attracts the panel protector 97, so that the module cover 15 may also be in close contact with the magnet at the same time. That is, the central portion of the link 73 may be in close contact with the module cover 15.

Figure 22:
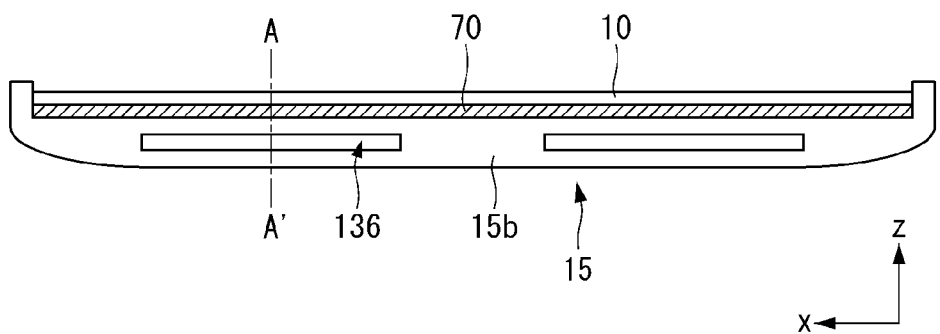
Figure 22:
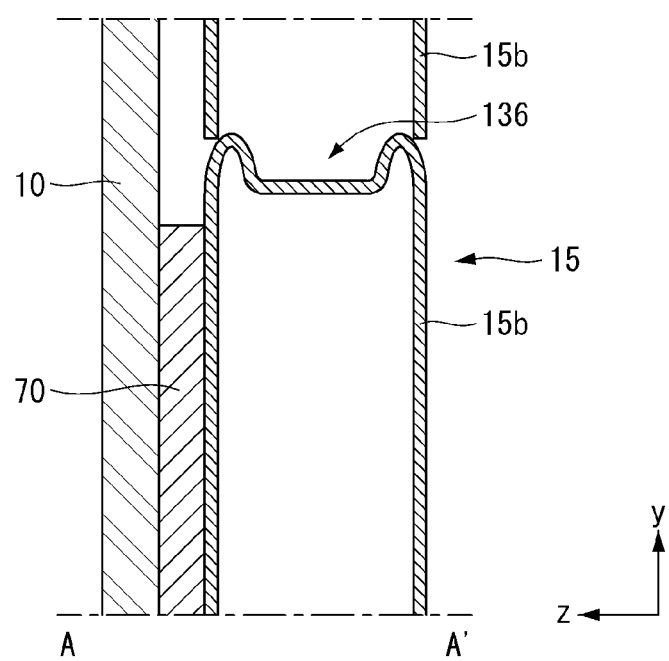

Referring to FIG. 22, a bead 136 may be formed in the upper surface of the segment 15b. The bead 136 may have a shape recessed inwardly of segment 15b. The bead 136 may have a shape recessed in the ?y axis direction. A plurality of beads 136 may be formed on the segment 15b. The plurality of beads 136 may be spaced apart from each other. The bead 136 may enhance the rigidity of segment 15b. For example, the bead 136 may prevent the shape of the segment 15b from being deformed due to an external impact.

Figure 23:
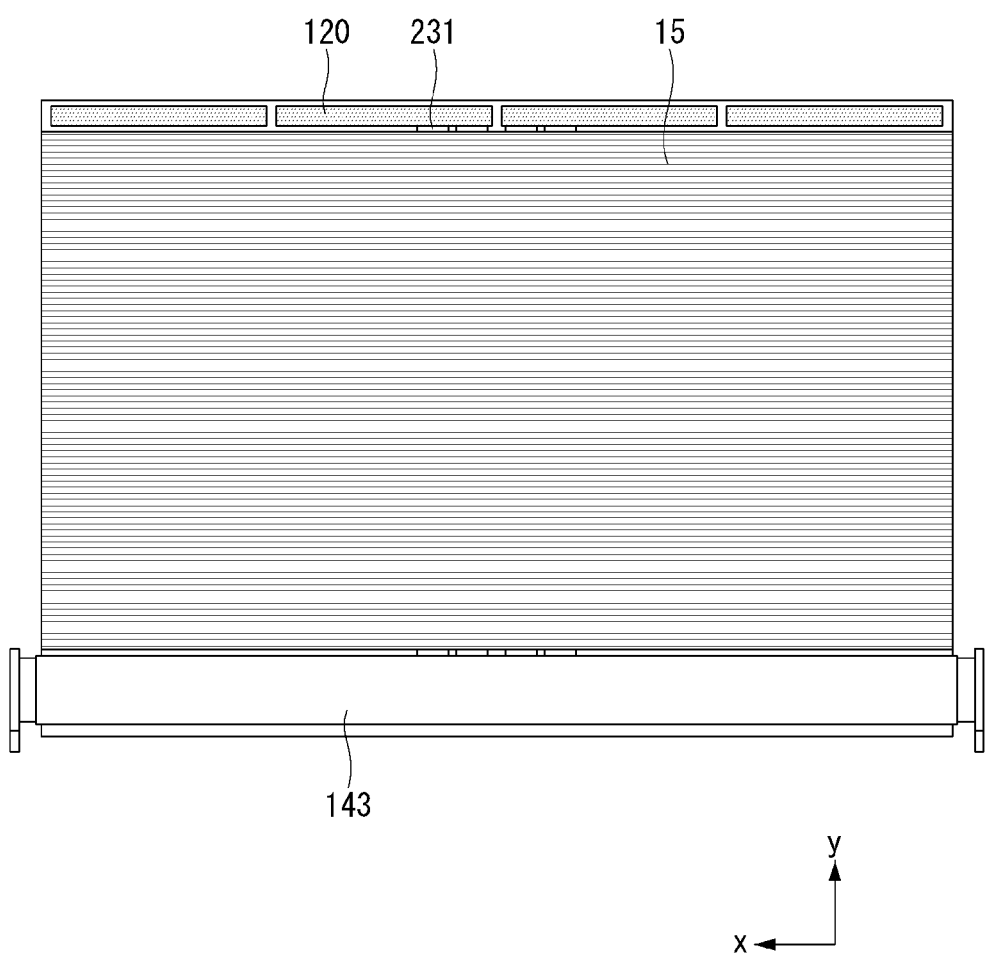

Referring to FIG. 23, the source PCB 120 may be located above the module cover 15. When the source PCB 120 changes from the first state to the second state, a position may change with the movement of the module cover 15.

A FFC cable 231 may be located in the central portion of the module cover 15 based on the first direction. The FFC cable 231 may be located in both ends of the module cover 15 based on the first direction.

Figure 24:
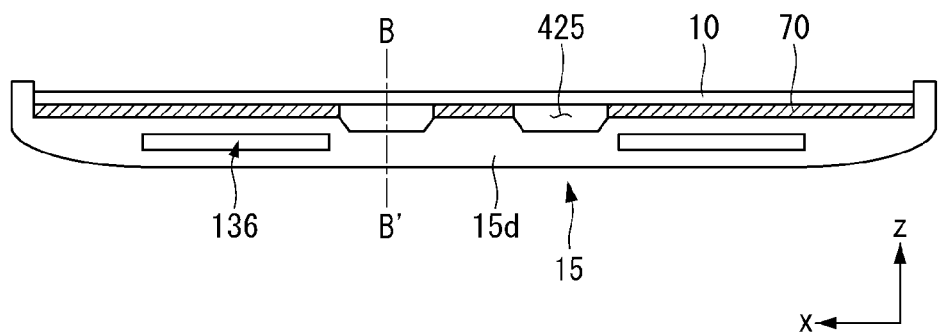
Figure 24:
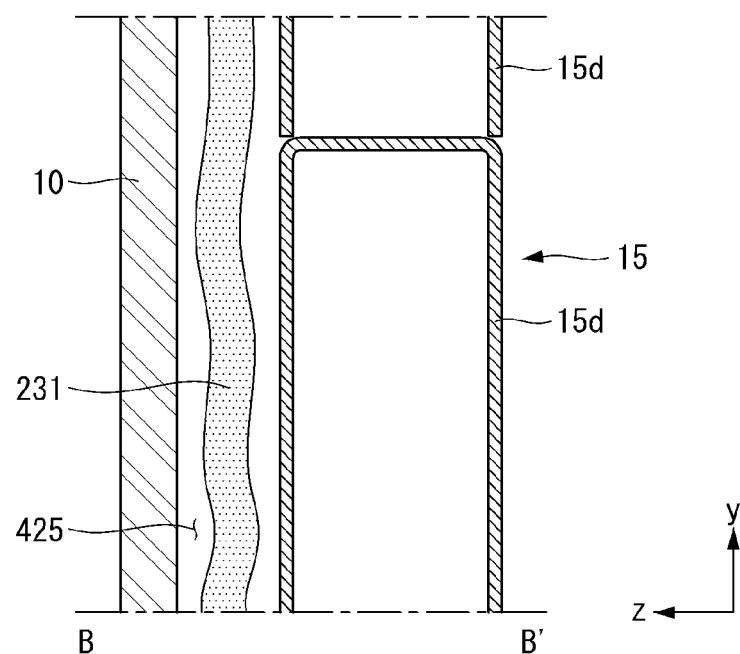

Referring to FIG. 24, the segment 15d may include a depression 425 recessed in the −z axis direction. The depression 425 may form a space between the display panel 10 and the module cover 15. The FFC cable 231 may be accommodated in a space formed by the depression 425. In addition, the depression 425 may improve the rigidity of the segment 15d.

The bead 136 may be located on the segment 15d excluding a portion where the depression 425 is located. The bead 136 may not be located in the portion where the depression 425 is located because the thickness of the segment 15d in the third direction becomes thinner. However, the present disclosure is not limited thereto, and the bead 136 may be located in the portion where the depression 425 is located.

Figure 25:
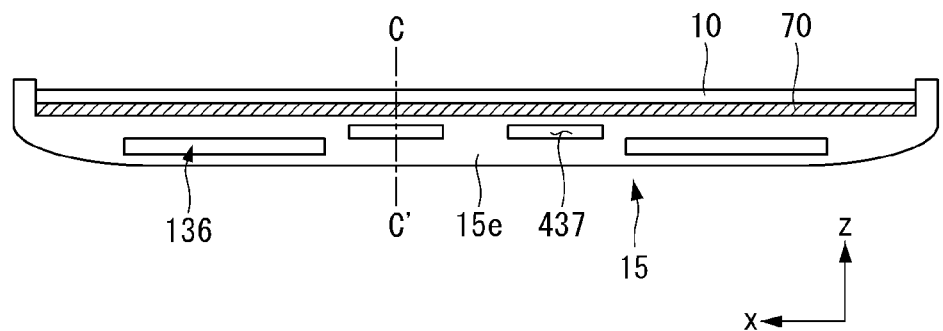
Figure 25:
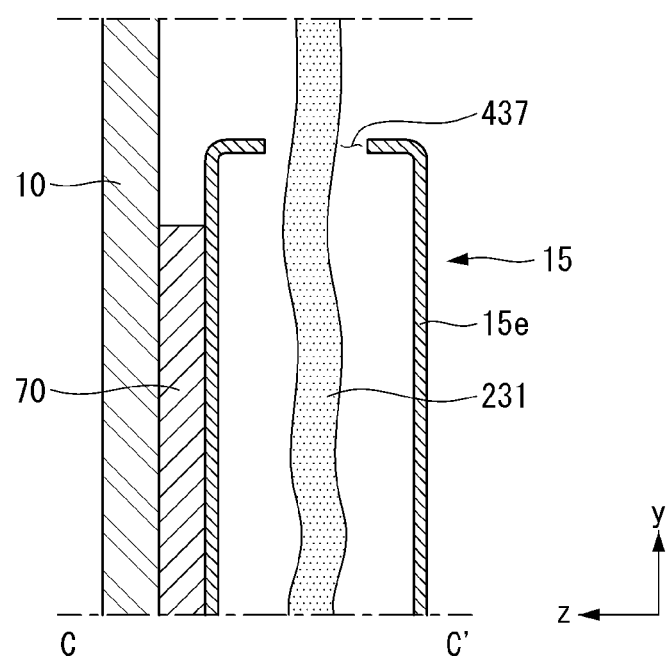

Referring to FIG. 25, a penetrating portion 437 may be located in the central portion of the segment 15e based on the first direction. The penetrating portion 437 may penetrate the central portion of the segment 15e in the second direction. That is, the penetrating portion 437 may be a hole located in the segment 15e. The penetrating portion 437 may be a portion where the FFC cable 231 is located. Since the penetrating portion 437 is formed in the segment 15e, the thickness of the segment 15e may be reduced in comparison with the case where the FFC cable 231 is located in the depression 425.

The bead 136 may be located on the segment 15e excluding a portion where the penetrating portion 437 is located. In the portion where the penetrating portion 437 is located, the bead 136 may not be located because the thickness of the segment 15e in the third direction becomes thinner. However, the present disclosure is not limited thereto, and the bead 136 may be located at a portion where the penetrating portion 437 is located.

Figure 26:
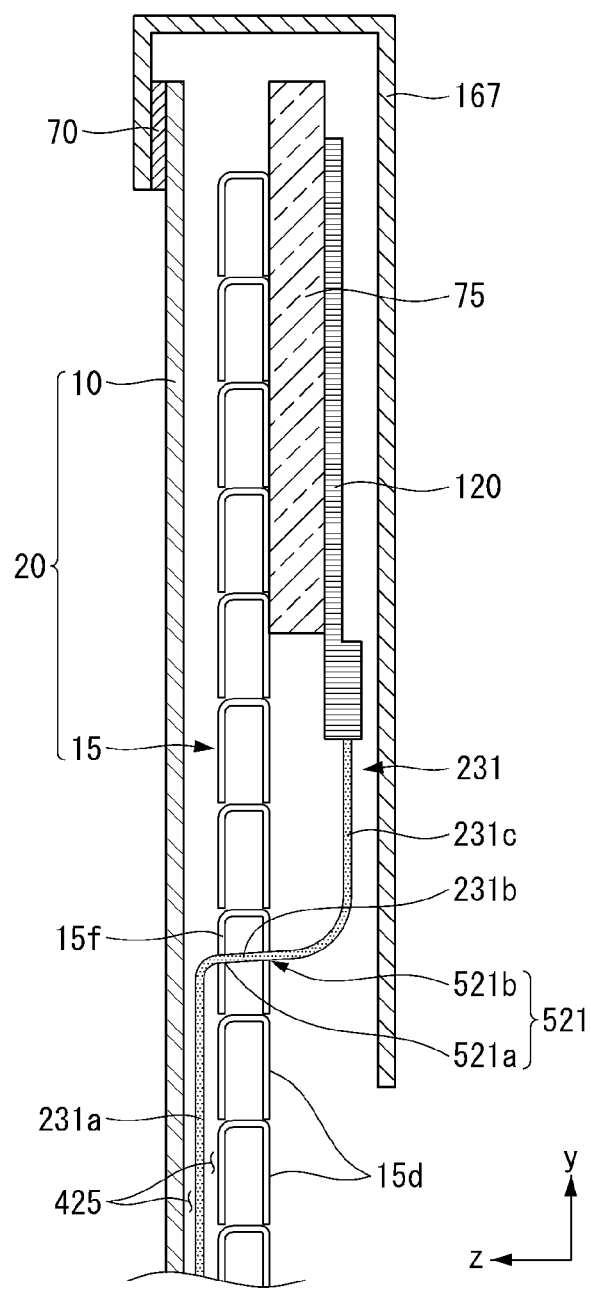

Referring to FIG. 26, the top case 167 may cover the source PCB 120 and the upper bar 75 as well as the display panel 10 and the module cover 15. One surface of the upper bar 75 may be coupled to the rear surface of the module cover 15, and the other surface thereof may be coupled to the source PCB 120. The upper bar 75 may be fixed to the module cover 15 to support the source PCB 120.

Figure 27:
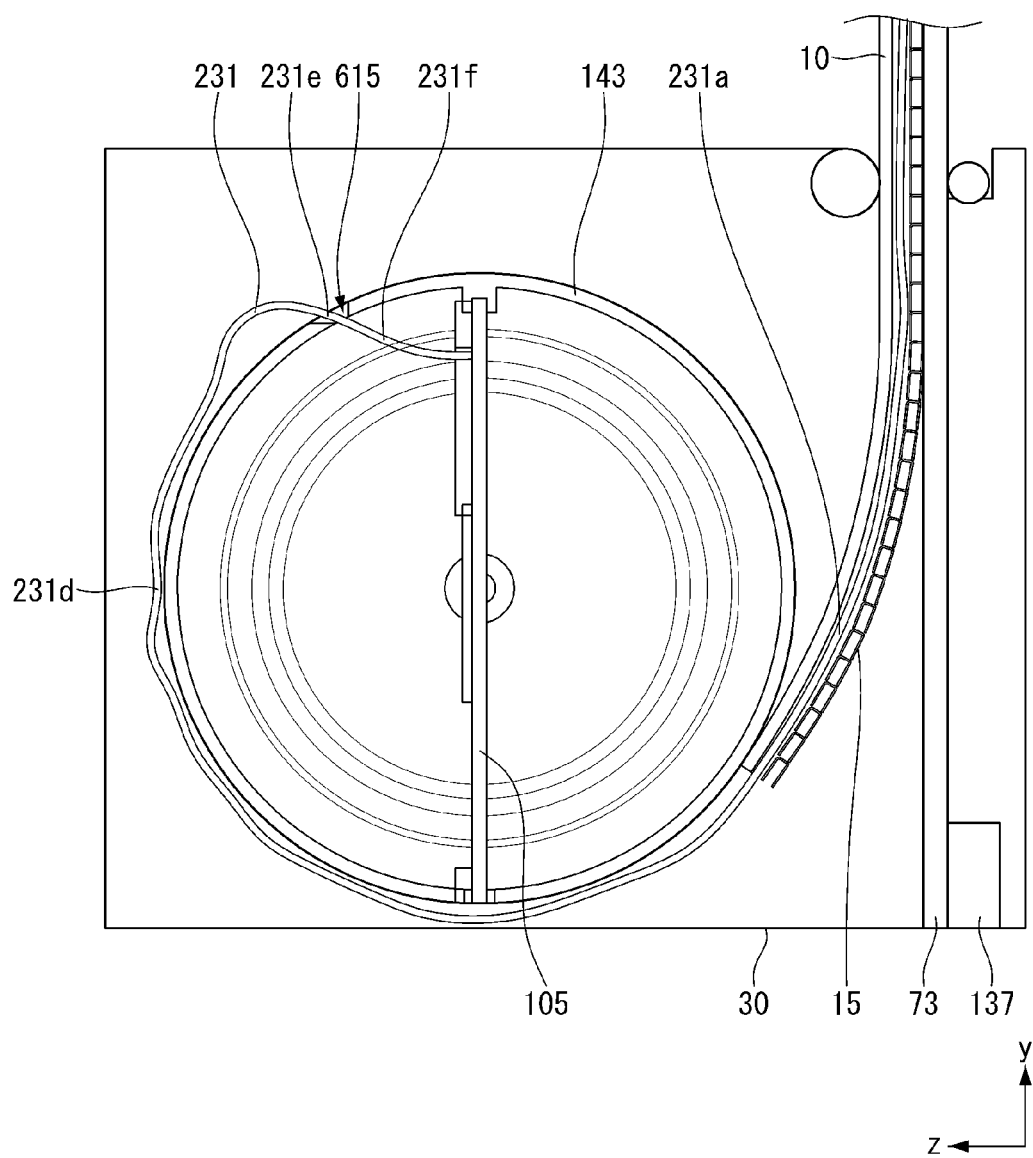

The lower end of the FFC cable 231 may be connected to a timing controller board 105 (see FIG. 27) inside a panel roller 143 (see FIG. 27). The FFC cable 231 may be wound around or unwound from the panel roller 143 together with the display unit 20.

A portion of the FFC cable 231 may be located between the display panel 10 and the module cover 15. A portion of the FFC cable 231 located between the display panel 10 and the module cover 15 may be referred to as a first portion 231a. The first portion 231a may be located in the depression 425 formed by the plurality of segments 15d. Alternatively, the first portion 231a may be accommodated in the depression 425 formed by the plurality of segments 15d.

A portion of the FFC cable 231 may penetrate the segment 15f. A portion of the FFC cable 231 that passes through the segment 15f may be referred to as a second portion 231b. The segment 15f may include a first hole 521a formed in the front surface and a second hole 521b formed in the rear surface. The first hole 521a and the second hole 521b may be connected to each other to form a single hole 521. The hole 521 may penetrate the segment 15f in the third direction. The second portion 231b may penetrate the hole 521. The hole 521 may be referred to as a connection hole 521.

The upper end of the FFC cable 231 may be electrically connected to the source PCB 120. A portion of the FFC cable 231 may be located in the rear surface of the module cover 15. A portion of the FFC cable 231 located in the rear surface of the module cover 15 may be referred to as a third portion 231c. The third portion 231c may be electrically connected to the source PCB 120.

The third portion 231c may be shielded by the top case 167. Accordingly, the third portion 231c may not be exposed to the outside.

Referring to FIG. 27, the FFC cable 231 may be connected to the timing controller board 105 mounted in the panel roller 143. A penetrating hole 615 may be positioned on the panel roller 143, and the FFC cable 231 may be connected to the timing controller board 105 through the penetrating hole 615.

The penetrating hole 615 may be located in one side of the panel roller 143 and may penetrate an outer circumferential portion of the panel roller 143. The FFC cable 231 may be connected to one side of the timing controller board 105 through the penetrating hole 615.

Even when the FFC cable 231 is located in the outer circumference of the panel roller 143, it may maintain the connection with the timing controller board 105 due to the penetrating hole 615. Accordingly, the FFC cable 231 may rotate together with the panel roller 143 to prevent twisting.

A portion of the FFC cable 231 may be wound around the panel roller 143. A portion of the FFC cable 231 wound around the panel roller 143 may be referred to as a fourth portion 231d. The fourth portion 231d may be in contact with the outer circumferential surface of the panel roller 143.

A portion of the FFC cable 231 may pass through the penetrating hole 615. A portion of the FFC cable 231 passing through the penetrating hole 615 may be referred to as a fifth portion 231e.

The lower end of the FFC cable 231 may be electrically connected to the timing controller board 105. A portion of the FFC cable 231 may be located inside the panel roller 143. A portion of the FFC cable 231 located inside the panel roller 143 may be referred to as a sixth portion 231f. The sixth portion 231f may be electrically connected to the timing controller board 105.

Figure 28:
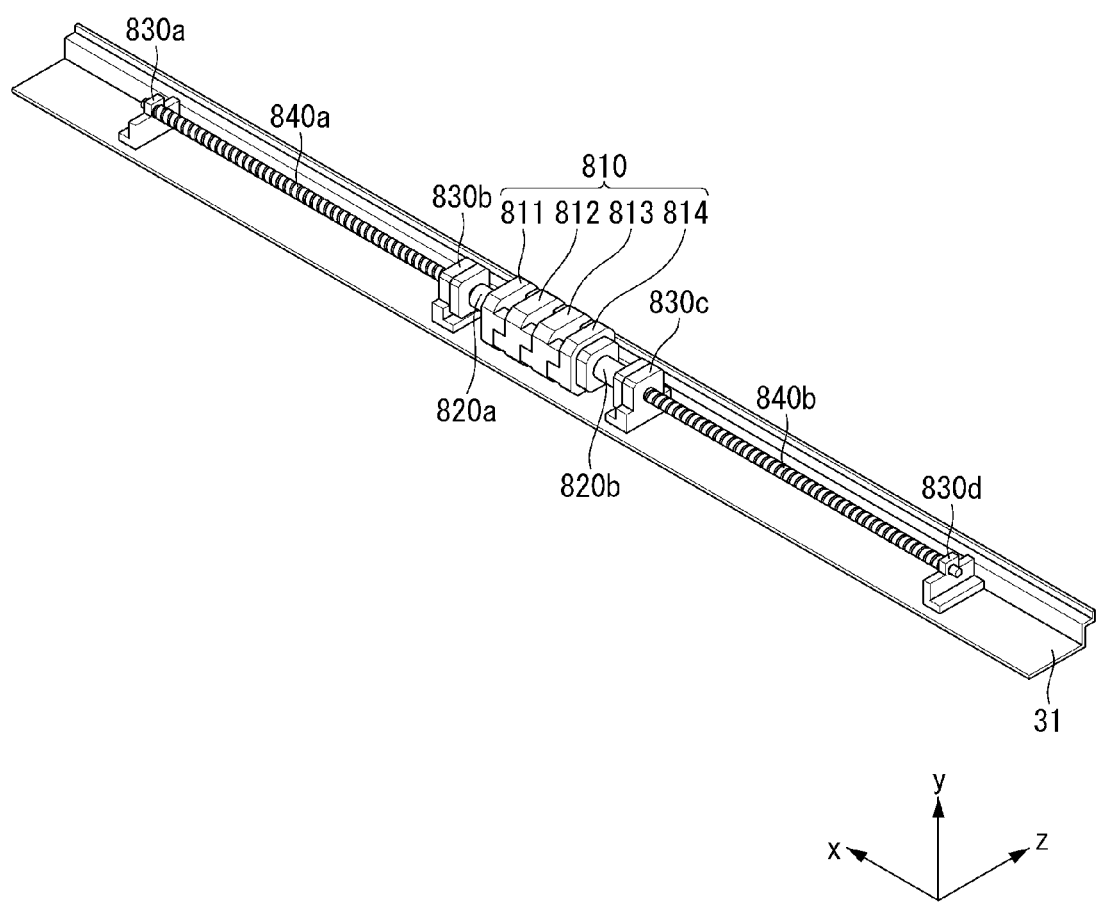

Referring to FIG. 28, the motor assembly 810 may be installed on the base 31. The base 31 may be a lower surface of the housing 30 (refer to FIG. 19). A driving shaft of the motor assembly 810 may be formed on both sides. A right driving shaft and a left driving shaft of the motor assembly 810 may rotate in the same direction. Alternatively, the right driving shaft and the left driving shaft of the motor assembly 810 may rotate in opposite directions.

The motor assembly 810 may include a plurality of motors. A plurality of motors may be connected in series with each other. The plurality of motors may be sequentially disposed in order of a first motor 811, a second motor 812, a third motor 813, and a fourth motor 814 in a right-to-left direction. The right driving shaft of the motor assembly 810 may be formed in the first motor 811. In addition, the left driving shaft of the motor assembly 810 may be formed in the fourth motor 814. As a plurality of motors are connected in series, the motor assembly 810 may output a high torque.

The motor assembly 810 may be connected to lead screws 840a and 840b. The lead screws 840a and 840b may include a right lead screw 840a connected to the right side of the motor assembly 810 and a left lead screw 840b connected to the left side of the motor assembly 810. The right lead screw 840a may be referred to as a first lead screw 840a. The left lead screw 840b may be referred to as a second lead screw 840b.

The right driving shaft of the motor assembly 810 may be connected to the right lead screw 840a. Alternatively, the right driving shaft of the motor assembly 810 and the right lead screw 840a may be connected through a right coupling 820a. Alternatively, the driving shaft of the first motor 811 may be connected to the right lead screw 840a. Alternatively, the driving shaft of the first motor 811 and the right lead screw 840a may be connected through a right coupling 820a. The right driving shaft may be referred to as a first driving shaft. The left driving shaft may be referred to as a second driving shaft.

The left driving shaft of the motor assembly 810 may be connected to the left lead screw 840b. Alternatively, the left driving shaft of the motor assembly 810 and the left lead screw 840b may be connected through a left coupling 820b. Alternatively, the driving shaft of the fourth motor 814 may be connected to the left lead screw 840b. Alternatively, the driving shaft of the fourth motor 814 and the left lead screw 840b may be connected through the left coupling 820b.

The couplings 820a and 820b may include a right coupling 820a connecting the right driving shaft of the motor assembly 810 and the right lead screw 840a and a left coupling 820b connecting the left driving shaft of the motor assembly 810 and the left lead screw 840b to each other.

The lead screws 840a and 840b may be threaded along a longitudinal direction. A direction of the thread formed on the right lead screw 840a and a direction of the thread formed on the left lead screw 840b may be opposite to each other. Alternatively, the direction of the thread formed on the right lead screw 840a and the direction of the thread formed on the left lead screw 840b may be the same.

Bearings 830a, 830b, 830c, and 830d may be installed on the base 31. A plurality of bearings 830a, 830b, 830c, and 830d may be formed in the longitudinal direction of the base 31. The bearings 830a, 830b, 830c, and 830d include right bearings 830a, 830b, 830c, and 830d disposed on the right side of the motor assembly 810 and left bearings 830a, 830b, 830c, and 830d disposed on the left side of the motor assembly 810.

The bearings 830a, 830b, 830c, and 830d may support the lead screws 840a and 840b. The lead screws 840a and 840b may be connected to a driving shaft of the motor assembly 810 to rotate. The bearings 830a, 830b, 830c, and 830d may support the lead screws 840a and 840b without interfering with the rotation of the lead screws 840a and 840b.

The right bearings 830a, 830b, 830c, and 830d may support the right lead screw 840a. The right bearings 830a, 830b, 830c, and 830d may include a first right bearing 830a supporting the right side of the right lead screw 840a and a second right bearing 830b supporting the left side of the right lead screw 840a. The first right bearing 830a may be referred to as a first bearing 830a. The second right bearing 830b may be referred to as a second bearing 830b.

The left bearings 830a, 830b, 830c, and 830d may support the left lead screw 840b. The left bearings 830a, 830b, 830c, and 830d may include a first left bearing 830c supporting the right side of the left lead screw 840b and a second left bearing 830d supporting the left side of the left lead screw 840b.

The bearings 830a, 830b, 830c, 830d, the couplings 820a, 820b, and the motor assembly 810 may be disposed in order of the first right bearing 830a, the second right bearing 830b, the right coupling 820a, the motor assembly 810, the left coupling 820b, the first left bearing 830c, and the second left bearing 830d in a right-to-left direction.

Figure 29:
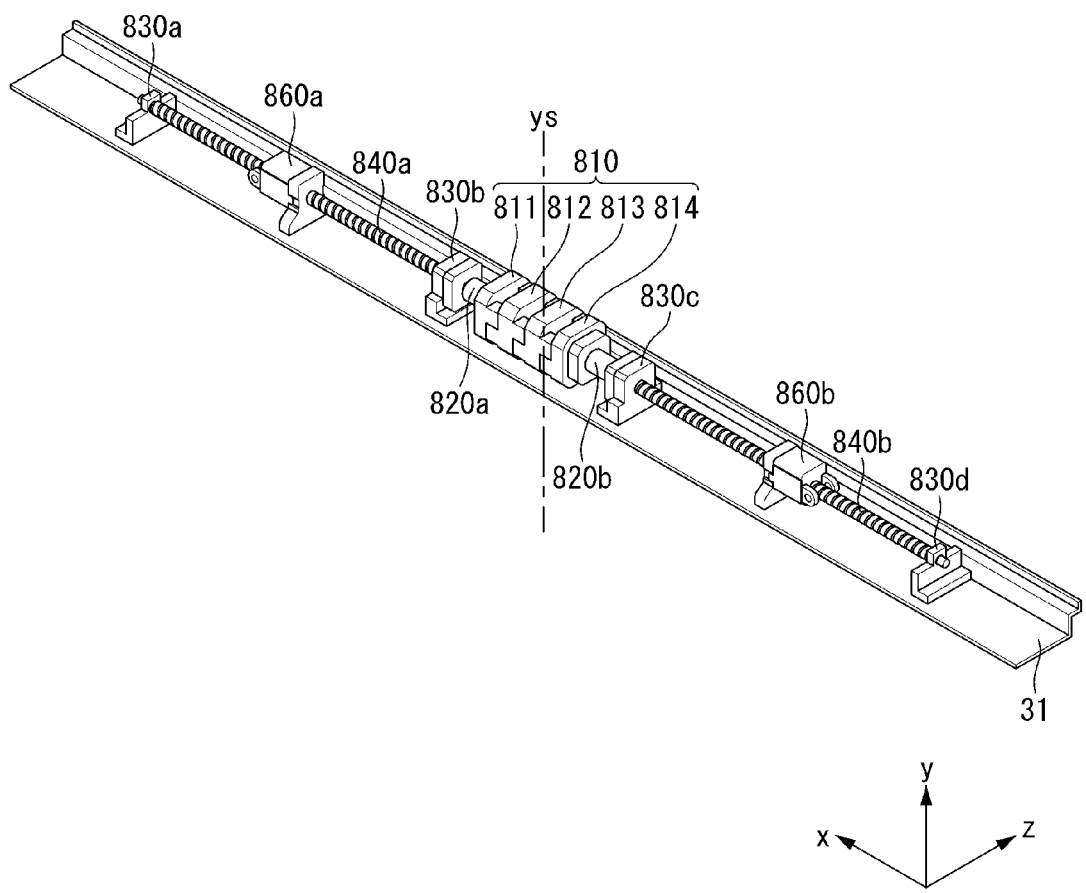
Figure 30:
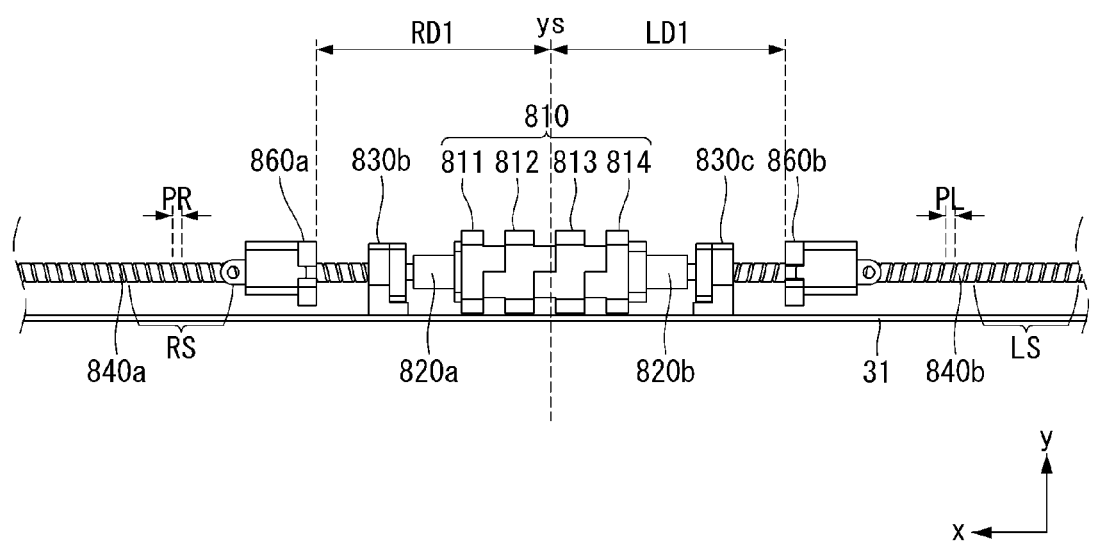

Referring to FIGS. 29 and 30, the display device may further include sliders 860a and 860b. The sliders 860a and 860b may be coupled to the lead screws 840a and 840b, and the lead screws 840a and 840b may be disposed to pass through the sliders 860a and 860b. The sliders 860a and 860b may be formed in plurality. The sliders 860a and 860b may include a right slider 860a coupled to the right lead screw 840a and a left slider 860b coupled to the left lead screw 840b. The right slider 860a may be referred to as a first slider 860a. The left slider 860b may be referred to as a second slider 860b.

The sliders 860a and 860b may have a thread (SS, see FIG. 43) formed on an inner circumferential surface. The threads SS formed on the inner circumferential surface of the sliders 860a and 860b and the threads RS and LS formed on the lead screws 840a and 840b may be engaged with each other. The sliders 860a and 860b may move forward and backward in the longitudinal direction of the lead screws 840a and 840b according to the rotation of the lead screws 840a and 840b.

The right slider 860a may be engaged with the right lead screw 840a. The right slider 860a may move forward and backward between the first right bearing 830a and the second right bearing 830b according to the rotation of the right lead screw 840a.

The left slider 860b may be engaged with the left lead screw 840b. The left slider 860b may move forward and backward between the first left bearing 830c and the second left bearing 830d according to the rotation of the left lead screw 840b.

The right slider 860a may be spaced apart from the axis of symmetry ys of the motor assembly 810 by a distance RD1. The left slider 860b may be spaced apart from the axis of symmetry ys of the motor assembly 810 by a distance LD1. The distance RD1 and the distance LD1 may be formed to have the same length. That is, the right slider 860a and the left slider 860b may be symmetrical with respect to the axis of symmetry ys of the motor assembly 810.

The motor assembly 810 may output a rotation direction of the right driving shaft and a rotation direction of the left driving shaft to be identical to each other. In addition, the direction of the thread RS of the right lead screw 840a and the direction of the thread LS of the left lead screw 840b may be opposite to each other. For this reason, when the right slider 860a moves in the +x-axis direction according to the rotation of the right driving shaft, the left slider 860b may move in the −x-axis direction according to the rotation of the left driving shaft. Alternatively, when the right slider 860a moves in the −x-axis direction according to the rotation of the right driving shaft, the left slider 860*b* may move in the +x-axis direction according to the rotation of the left driving shaft.

Figure 31:
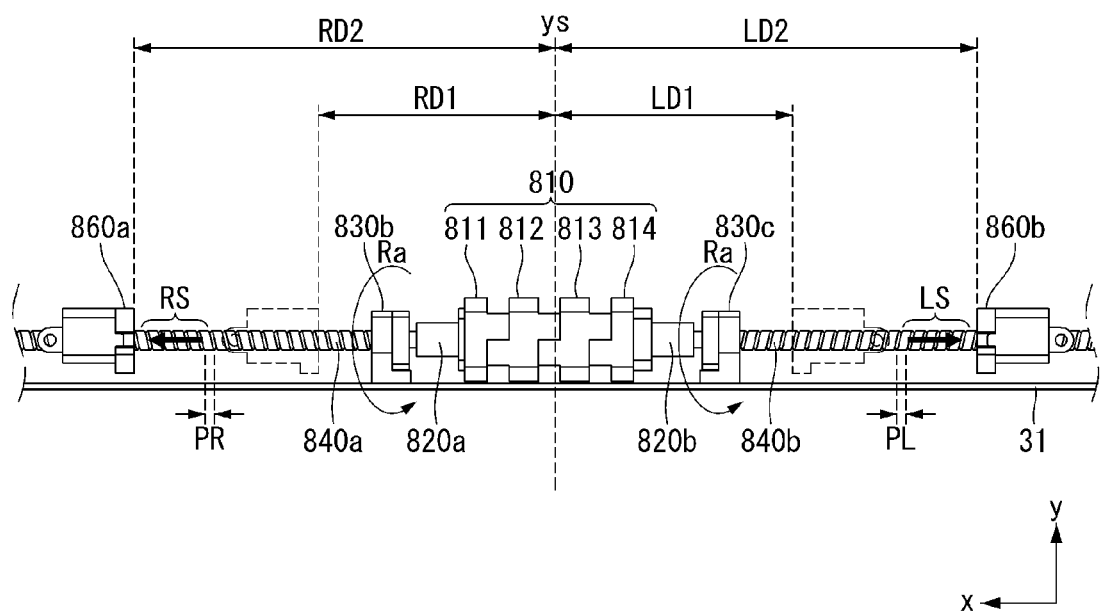

Referring to FIG. 31, the direction of the thread RS of the right lead screw 840*a* and the direction of the thread LS of the left lead screw 840*b* may be opposite to each other. The right lead screw 840*a* may have a pitch PL, and the left lead screw 840*b* may have a pitch PR. The pitch PL of the right lead screw 840*a* and the pitch PR of the left lead screw 840*b* may be formed to have the same length.

The motor assembly 810 may output the output the right driving shaft and the output of the left driving shaft to be the same. The rotation direction Ra of the right driving shaft and the rotation direction Ra of the left driving shaft may be the same as each other. Also, the number of rotations per unit time of the right driving shaft and the number of rotations per unit time of the left driving shaft may be the same. Also, a direction of the torque of the right driving shaft and a direction of a torque of the left driving shaft may be the same. Also, a magnitude of the torque of the right driving shaft and a magnitude of the torque of the left driving shaft may be equal to each other.

The right slider 860*a* may be moved along the +x axis according to the rotation of the right driving shaft at a position spaced apart by the distance RD1 from the axis of symmetry ys of the motor assembly 810. When the right driving shaft rotates n times, the right slider 860*a* may be spaced apart from the axis of symmetry ys of the motor assembly 810 by the distance LD2. In this case, a difference between the distance RD1 and the distance LD2 by (number of rotations n)×(pitch PL of the right slider 860*a*) may occur.

The left slider 860*b* may move along the −x axis according to the rotation of the left driving shaft at a position spaced apart by the distance LD1 from the axis of symmetry ys of the motor assembly 810. When the left driving shaft rotates n times, the left slider 860*b* may be spaced apart from the axis of symmetry ys of the motor assembly 810 by the distance RD2. In this case, a distance difference between the distance LD1 and the distance RD2 by (number of rotations n)×(pitch PR of the left slider 860*b*) may occur.

That is, when the pitch PL of the right slider 860*a* and the pitch PR of the left slider 860*b* are the same, displacement of the right slider 860*a* and displacement of the left slider 860*b* may have the same magnitude and opposite directions.

In addition, when initial positions of the right slider 860*a* and the left slider 860*b* are symmetrical from the axis of symmetry ys of the motor assembly 810, the right slider 860*a* and the left slider 860*b* may be moved away from each other, while maintaining symmetry from the axis of symmetry ys.

Figure 32:
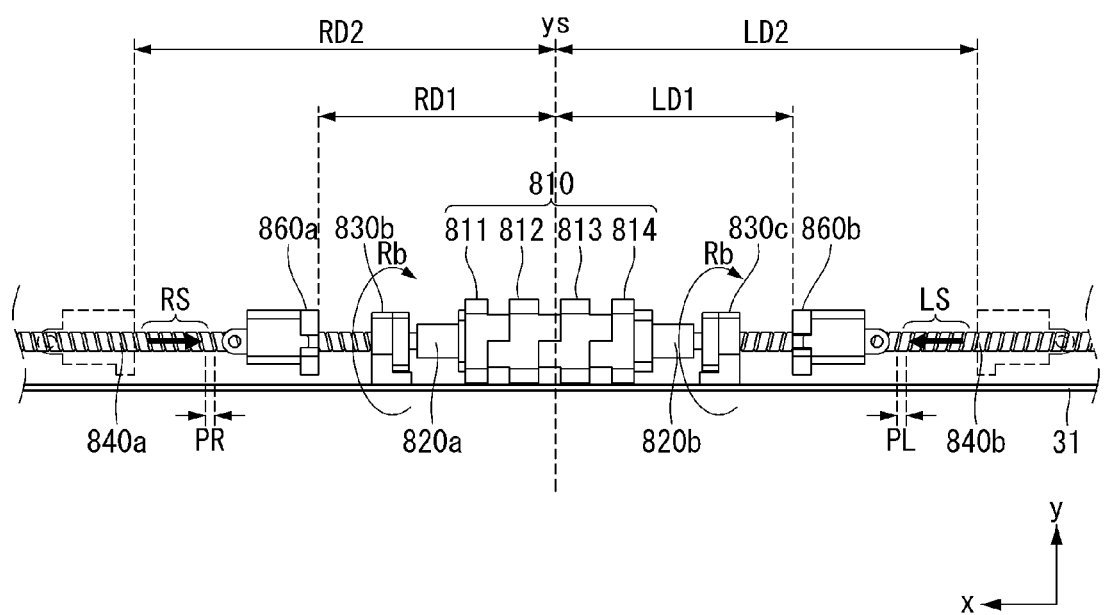

Referring to FIG. 32, the right slider 860*a* may move along the −x axis according to the rotation of the right driving shaft at a position spaced apart from the axis of symmetry ys of the motor assembly 810 by the distance LD2. The rotation direction Rb of the right driving shaft and the rotation direction Rb of the left driving shaft may be the same. When the right driving shaft rotates n times, the right slider 860*a* may be spaced apart from the axis of symmetry ys of the motor assembly 810 by the distance RD1. In this case, a difference between the distance RD1 and the distance LD2 by (number of rotations n)×(pitch PL of the right slider 860*a*) may occur.

The left slider 860*b* may move along the +x axis according to the rotation of the left driving shaft at a position spaced apart from the axis of symmetry ys of the motor assembly 810 by the distance RD2. When the left driving shaft rotates n times, the left slider 860*b* may be spaced apart from the axis of symmetry ys of the motor assembly 810 by the distance LD1. In this case, a distance difference between the distance LD1 and the distance RD2 by (number of rotations n)×(pitch PR of the left slider 860*b*) may occur.

That is, when the pitch PL of the right slider 860*a* and the pitch PR of the left slider 860*b* are the same, the displacement of the right slider 860*a* and the displacement of the left slider 860*b* may have the same magnitude and opposite directions.

In addition, when initial positions of the right slider 860*a* and the left slider 860*b* are symmetrical from the axis of symmetry ys of the motor assembly 810, the right slider 860*a* and the left slider 860*b* may become close to each other, while maintaining symmetry from the axis of symmetry ys.

Figure 33:
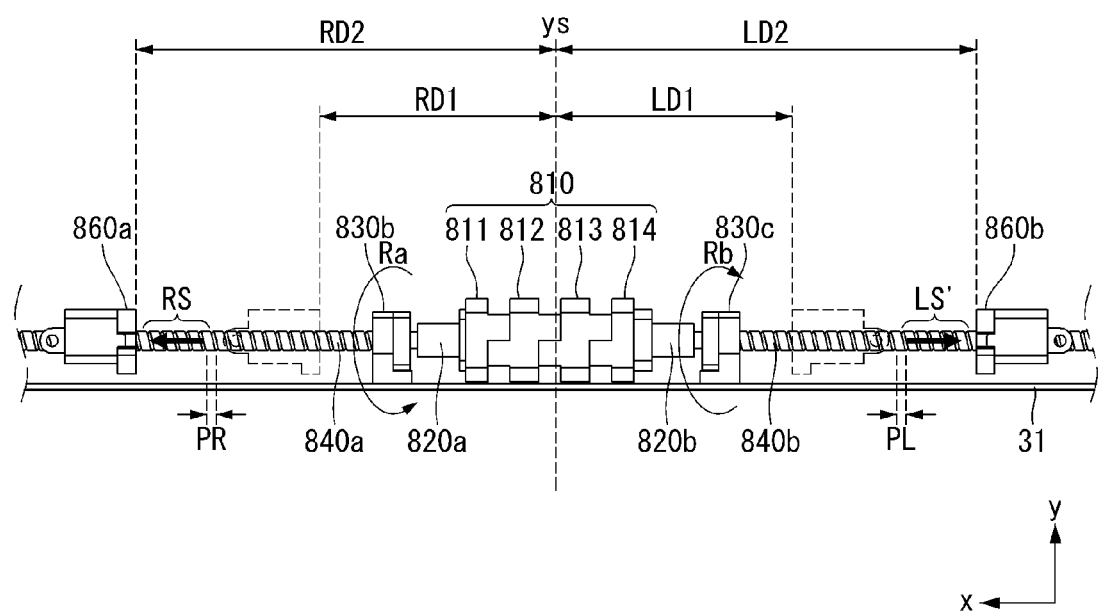

Referring to FIG. 33, the motor assembly 810 may output the rotation direction Ra of the right driving shaft and the rotation direction Rb of the left driving shaft to be opposite to each other. The direction of the thread RS of the right lead screw 840*a* and the direction of the thread LS' of the left lead screw 840*b* may be the same. Accordingly, when the right slider 860*a* moves in the +x-axis direction according to the rotation of the right driving shaft, the left slider 860*b* may move in the −x-axis direction according to the rotation of the left driving shaft. Alternatively, when the right slider 860*a* moves in the +x-axis direction according to the rotation of the right driving shaft, the left slider 860*b* may move in the −x-axis direction according to the rotation of the left driving shaft.

The right lead screw 840*a* may have a pitch PL, and the left lead screw 840*b* may have a pitch PR. The pitch PL of the right lead screw 840*a* and the pitch PR of the left lead screw 840*b* may be formed to have the same length.

The motor assembly 810 may output the output of the right driving shaft and the output of the left driving shaft to be the same. The rotation direction of the right driving shaft and the rotation direction of the left driving shaft may be opposite to each other. Also, the number of rotations per unit time of the right driving shaft and the number of rotations per unit time of the left driving shaft may be the same. Also, the direction of the torque of the right driving shaft and the direction of the torque of the left driving shaft may be opposite to each other. Also, the magnitude of the torque of the right driving shaft and the magnitude of the torque of the left driving shaft may be equal to each other.

The right slider 860*a* may be moved along the +x axis according to the rotation of the right driving shaft at a position spaced apart from the axis of symmetry ys of the motor assembly 810 by the distance RD1. When the right driving shaft rotates n times, the right slider 860*a* may be spaced apart from the axis of symmetry ys of the motor assembly 810 by the distance LD2. In this case, a distance difference between the distance RD1 and the distance LD2 by (number of rotations n)×(pitch PL of the right slider 860*a*) may occur.

The left slider 860*b* may move along the −x axis according to the rotation of the left driving shaft at a position spaced apart from the axis of symmetry ys of the motor assembly 810 by the distance LD1. When the left driving shaft rotates n times, the left slider 860*b* may be spaced apart from the axis of symmetry ys of the motor assembly 810 by the distance RD2. In this case, a distance difference between the distance LD1 and the distance RD2 by (number of rotations n)×(pitch PR of the left slider 860*b*) may occur.

That is, when the pitch PL of the right slider 860*a* and the pitch PR of the left slider 860*b* are the same, the displacement of the right slider 860a and the displacement of the left slider 860b may have the same magnitude and opposite directions.

In addition, when the initial positions of the right slider 860a and the left slider 860b are symmetrical from the axis of symmetry ys of the motor assembly 810, the right slider 860a and the left slider 860b may be moved away from each other, while maintaining symmetry from the axis of symmetry ys.

Figure 34:
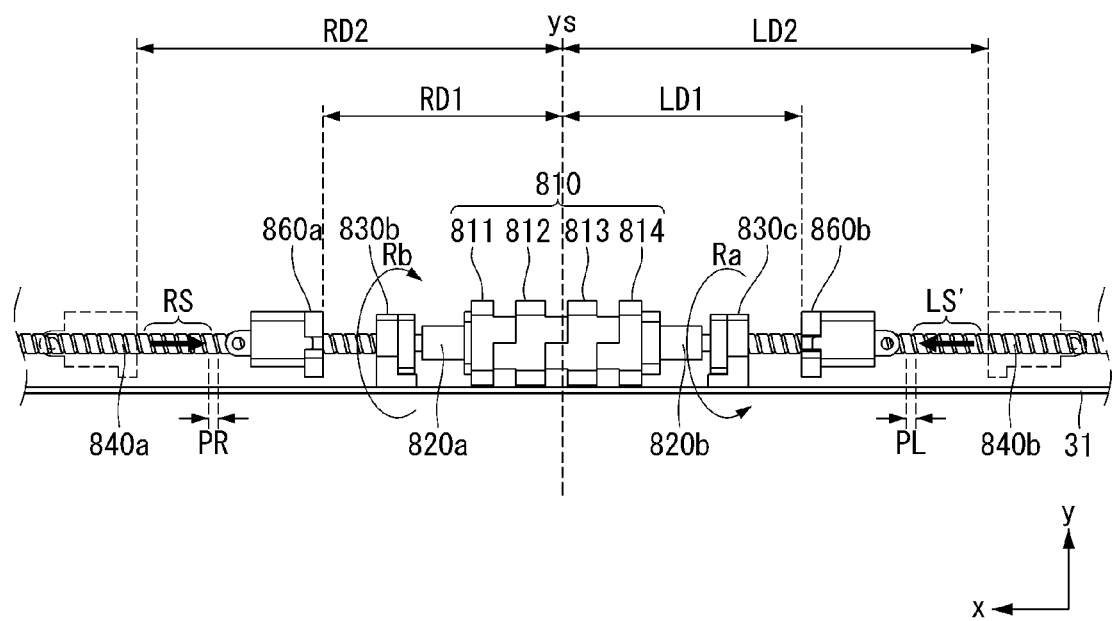
Figure 35:
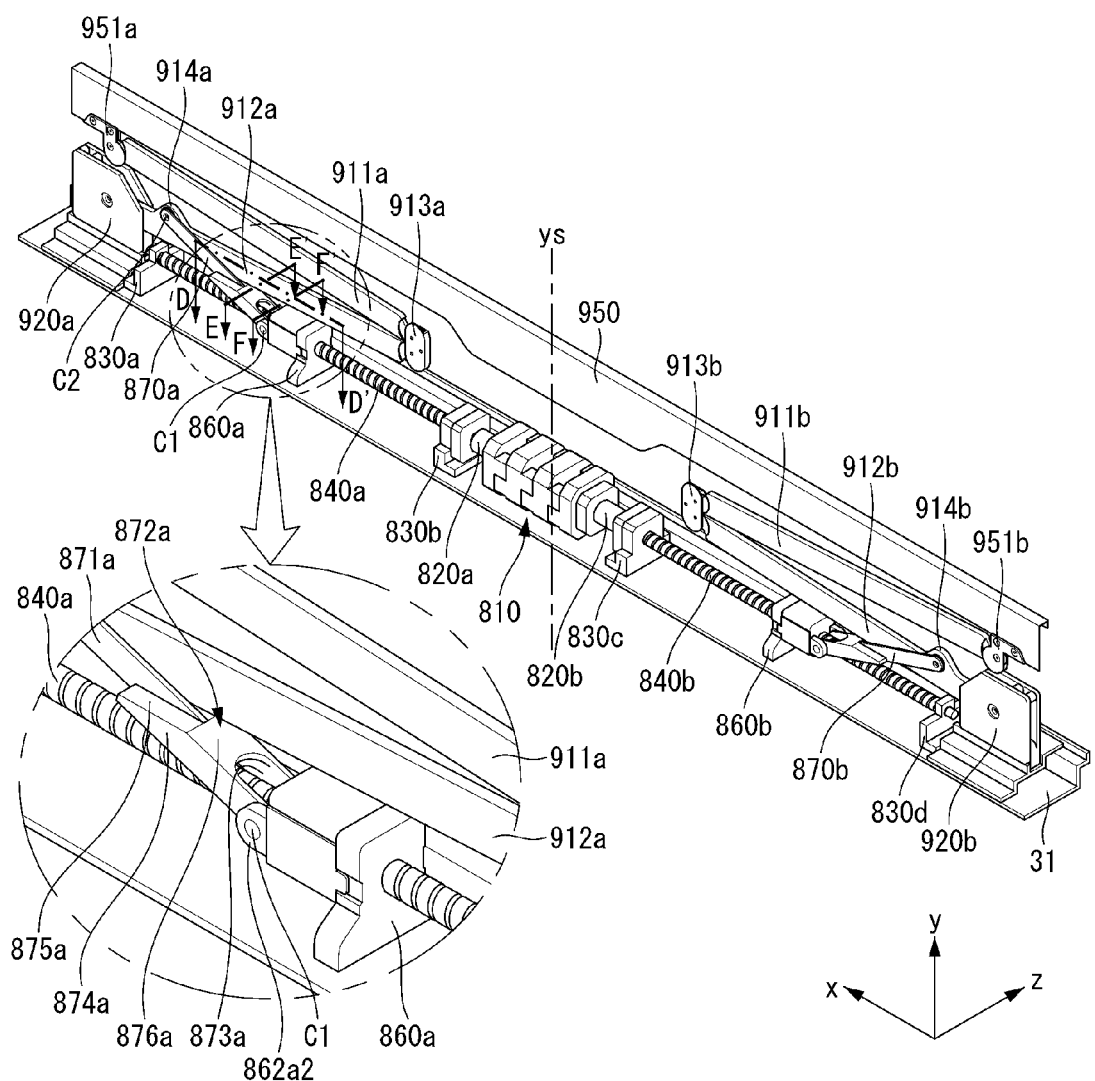
Figure 36:
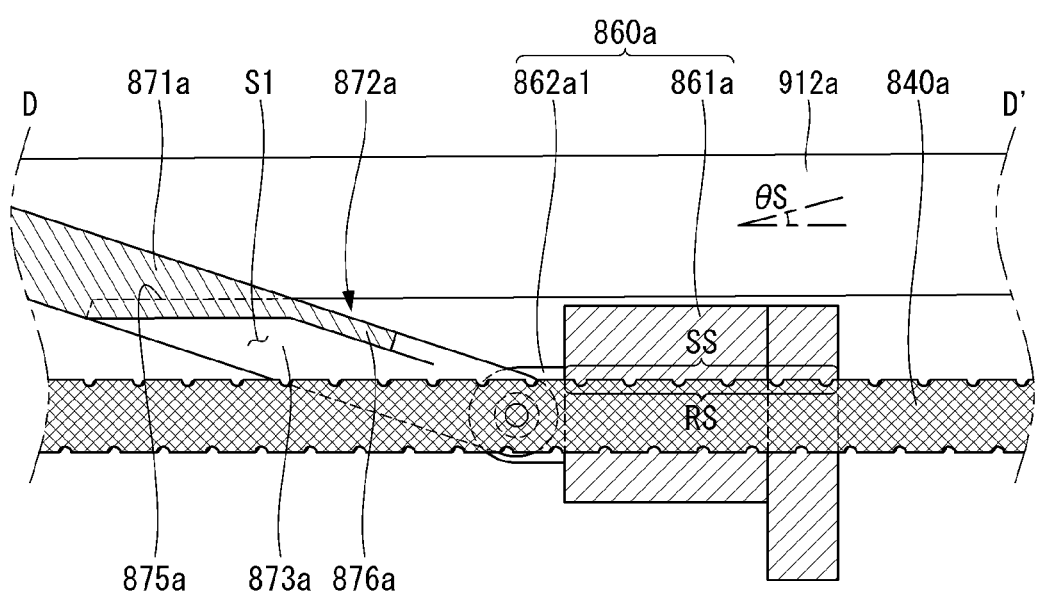
Figure 37:
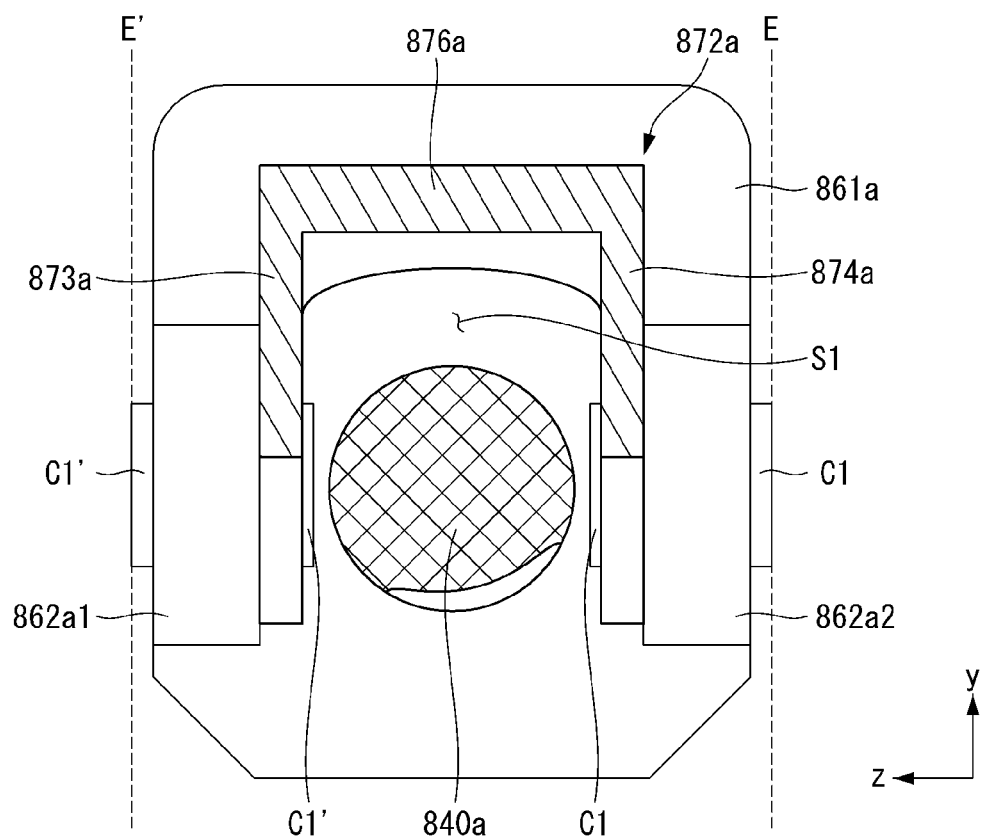
Figure 38:
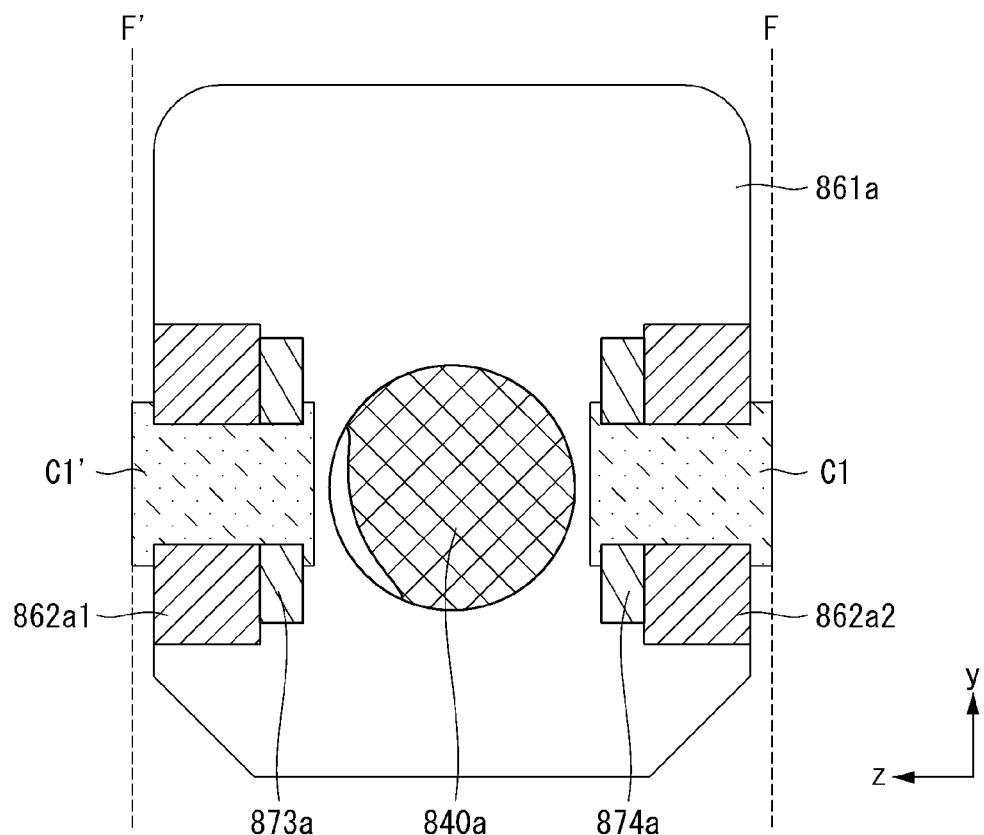

Referring to FIG. 34, the motor assembly 810 may output the rotation direction Rb of the right driving shaft and the rotation direction Ra of the left driving shaft to be opposite to each other. The right slider 860a may move along the −x axis according to the rotation of the right driving shaft at a position spaced apart from the axis of symmetry ys of the motor assembly 810 by the distance LD2. When the right driving shaft rotates n times, the right slider 860a may be spaced apart from the axis of symmetry ys of the motor assembly 810 by the distance RD1. In this case, a distance difference between the distance RD1 and the distance LD2 by (number of rotations n)×(pitch PL of the right slider 860a) may occur.

The left slider 860b may move along the +x axis according to the rotation of the left driving shaft at a position spaced apart from the axis of symmetry ys of the motor assembly 810 by the distance RD2. When the left driving shaft rotates n times, the left slider 860b may be spaced apart from the axis of symmetry ys of the motor assembly 810 by the distance LD1. In this case, a distance difference between the distance LD1 and the distance RD2 by (number of rotations n)×(pitch PR of the left slider 860b) may occur.

That is, when the pitch PL of the right slider 860a and the pitch PR of the left slider 860b are the same, the displacement of the right slider 860a and the displacement of the left slider 860b may have the same magnitude and opposite directions.

In addition, when the initial positions of the right slider 860a and the left slider 860b are symmetrical from the axis of symmetry ys of the motor assembly 810, the right slider 860a and the left slider 860b may be close to each other, while maintaining symmetry from the axis of symmetry ys.

Referring to FIGS. 35 to 38, a link mount 920a, 920b may be installed in the base 31. The link mount 920a, 920b may include a right link mount 920a spaced to the right from a first right bearing 830a and a left link mount 920b spaced to the left from a second left bearing 830d.

The link 910a, 910b may be connected to the link mount 920a, 920b. The link 910a, 910b may include a right link 910a connected to the right link mount 920a and a left link 910b connected to the left link mount 920b.

The right link 910a may be referred to as a first link. The left link 910b may be referred to as a second link. The right link mount 920a may be referred to as a first link mount 920a. The left link mount 920b may be referred to as a second link mount 920b.

The link 910a, 910b may include a first arm 911a, 911b, a second arm 912a, 912b, and an arm joint 913a, 913b. One side of the second arm 912a, 912b may be rotatably connected to the link mount 920a, 920b. The other side of the second arm 912a, 912b may be rotatably connected to the arm joint 913a, 913b. One side of the first arm 911a, 911b may be rotatably connected to the arm joint 913a, 913b. The other side of the first arm 911a, 911b may be rotatably connected to the link bracket 951a, 951b.

The link bracket 951a, 951b may include a right link bracket 951a connected to the first arm 911a of the right link 910a and a left link bracket 951b connected to the first arm 911b of the left link 910b. The link bracket 951a, 951b may be connected to the upper bar 950.

The upper bar 950 may connect the right link bracket 951a and the left link bracket 951b.

A rod 870a, 870b may connect a slider 860a, 860b to the link 910a, 910b. One side of the rod 870a, 870b may be rotatably connected to the slider 860a, 860b. The other side of the rod 870a, 870b may be rotatably connected to the second arm 912a, 912b. The rod 870a, 870b may include a right rod 870a connecting the right slider 860a and the second arm 912a of the right link 910a and a left rod 870b connecting the left slider 860b and the second arm 912b of the left link 910b. The right rod 870a may be referred to as a first rod 870a. The left rod 870b may be referred to as a second rod 870b.

Specifically, a structure formed by a right lead screw 840a, the right slider 860a, the right rod 870a, and the right link 910a will be described. The right slider 860a may include a body 861a and a rod mount 862a. The body 861a may have a thread SS formed on an inner circumferential surface thereof. The thread formed in the body 861a may be engaged with the thread RS of the right lead screw 840a. The right lead screw 840a may penetrate the body 861a.

The rod mount 862a may be formed in the right side of the body 861a. The rod mount 862a may be rotatably connected to one side of the right rod 870a. The rod mount 862a may include a first rod mount 862a1 and a second rod mount 862a2. The first rod mount 862a1 may be disposed in front of the right lead screw 840a. The second rod mount 862a2 may be disposed behind the right lead screw 840a. The first rod mount 862a1 and the second rod mount 862a2 may be spaced apart from each other. The second rod mount 862a2 may be spaced apart from the first rod mount 862a1 in the −z axis direction. The right lead screw 840a may be located between the first rod mount 862a1 and the second rod mount 862a2.

The rod mount 862a may be rotatably connected to one side of the rod 870a through a connecting member C1. The connecting member C1 may penetrate the rod mount 862a and the right rod 870a.

The right rod 870a may be rotatably connected to a second arm 912a through a connecting member C2. The connecting member C2 may penetrate the second arm 912a and the right rod 870a.

The right rod 870a may include a transmission portion 871a connected to the second arm 912a of the right link 910a and a cover 872a connected to the rod mount 862a of the right slider 860a. The transmission portion 871a may transmit a force, which is generated as the right slider 860a moves forward or rearward along the right lead screw 840a, to the right link 910a.

The cover 872a may include a first plate 873a disposed in front of the right lead screw 840a. The first plate 873a may be disposed perpendicular to the base 31. Alternatively, the first plate 873a may face the right lead screw 840a.

The cover 872a may include a second plate 874a disposed behind the right lead screw 840a. The second plate 874a may be disposed perpendicular to the base 31. Alternatively, the second plate 874a may face the right lead screw 840a. Alternatively, the second plate 874a may be spaced apart from the first plate 873a. The right lead screw 840a may be located between the first plate 873a and the second plate 874a.

The cover 872a may include a third plate 875a connecting the first plate 873a and the second plate 874a. The third plate 875a may be connected to the transmission portion. The third plate 875a may be located above the right lead screw 840a.

The cover 872a may include a fourth plate 876a connecting the first plate 873a and the second plate 874a. The fourth plate 876a may be connected to the third plate 875a. The fourth plate 876a may be located above the right lead screw 840a.

One side of the first plate 873a may be connected to the first rod mount 862a1. The first plate 873a and the first rod mount 862a1 may be connected through the connecting member. The other side of the first plate 873a may be connected to the third plate 875a.

One side of the second plate 874a may be connected to the second rod mount 862a2. The second plate 874a and the second rod mount 862a2 may be connected through the connecting member C1. The other side of the second plate 874a may be connected to the third plate 875a.

When the right slider 860a is moved closer to the motor assembly 810, the right lead screw 840a and the right rod 870a may be in contact with each other. When the right lead screw 840a and the right rod 870a contact each other, mutual interference may occur and the movement of the right slider 860a may be restricted.

The cover 872a may provide a space S1 therein. The first plate 873a, the second plate 874a, the third plate 875a, and the fourth plate 876a may form the space S1. When the right slider 860a is moved closer to the motor assembly 810, the right lead screw 840a may be accommodated or escaped into the space S1 provided by the cover 872a. The right slider 860a may move closer to the motor assembly 810 than a case of not having the cover 872a, due to the space S1 provided by the cover 872a. That is, the cover 872a may expand the operating range of the right slider 860a by providing the space S1 therein. In addition, since the right lead screw 840a is accommodated in the cover 872a, the size of the housing 30 (see FIG. 2) may be reduced.

In addition, the cover 872a may limit the minimum value of the angle theta S formed between the second arm 912a and the base 31. The third plate 875a of the cover 872a may contact the second arm 912a and may support the second arm 912a, when theta S is sufficiently small. By supporting the second arm 912a, the third plate 875a may limit the minimum value of theta S and prevent sagging of the second arm 912a. That is, the cover 872a may serve as a stopper for preventing sagging of the second arm 912a. In addition, the third plate 875a may reduce the initial load for standing the second arm 912a by limiting the minimum value of theta S.

The lead screw 840a, 840b may be driven by a single motor assembly 810. The lead screw 840a, 840b is driven by a single motor assembly 810, so that the second arm 912a, 912b may stand up in symmetry. However, when driving the lead screw 840a, 840b by a single motor assembly 810, the load on the motor assembly 810 to stand the second arm 912a, 912b may be excessively increased. At this time, the third plate 875a may reduce the load on the motor assembly 810 to stand the second arm 912a, 912b, by limiting the minimum value of theta S.

The structure formed by the left lead screw 840b, the left slider 860b, the left rod 870b, and the left link 910b may be symmetric with the structure formed by the right lead screw 840a, the right slider 860a, the right rod 870a, and the right link 910a. In this case, the axis of symmetry may be the axis of symmetry ys of the motor assembly 810.

Figure 39:
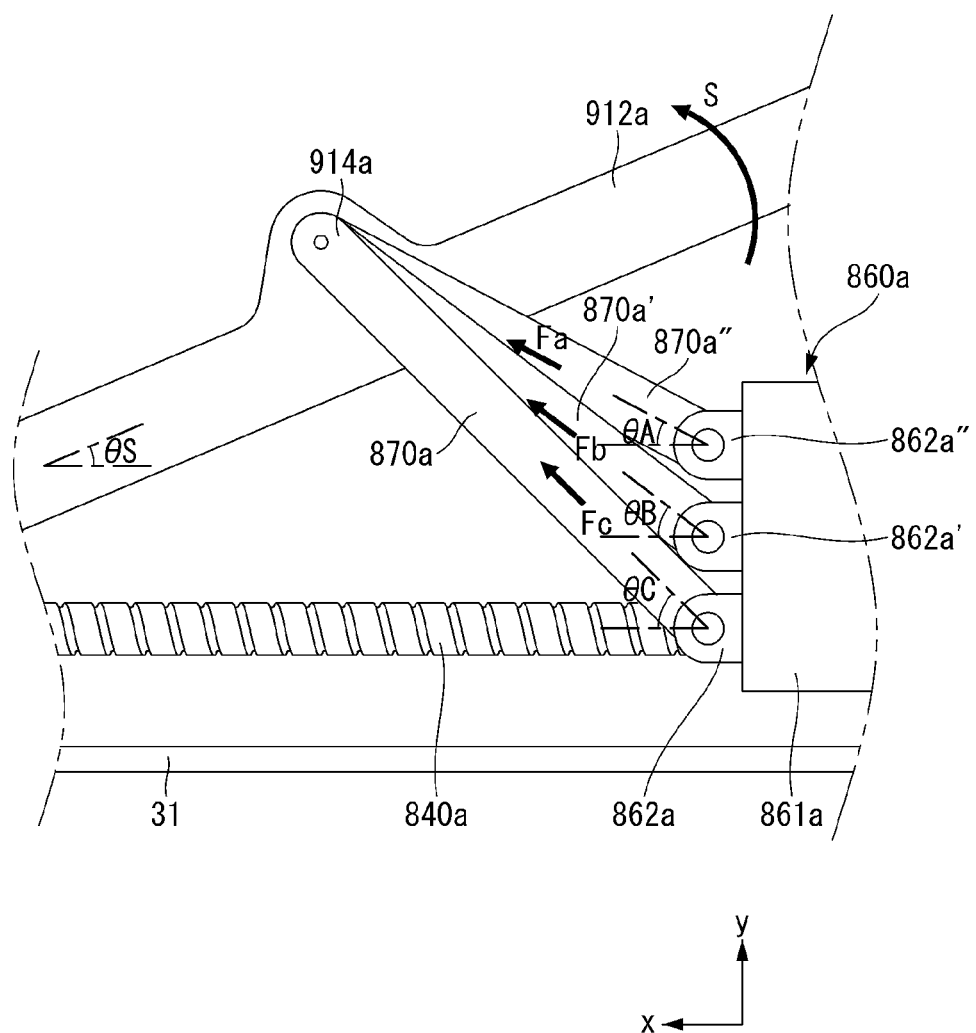
Figure 40:
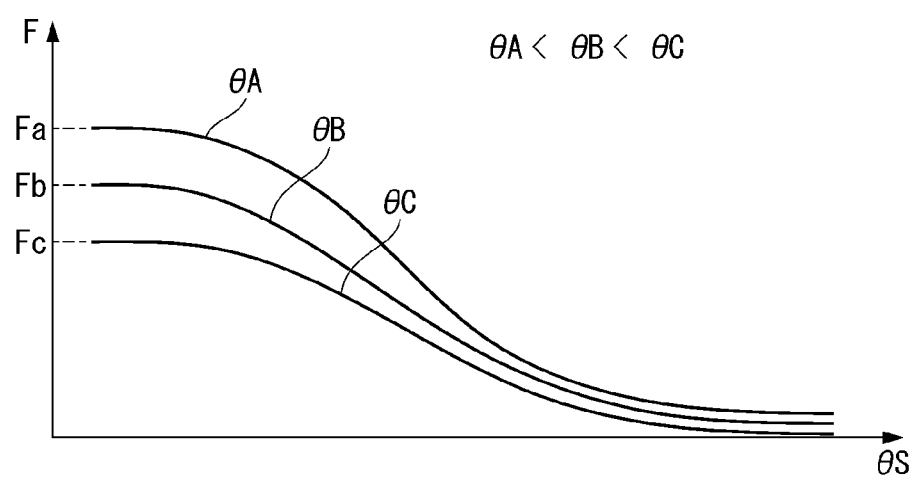

Referring to FIGS. 39 and 40, it is illustrated that the right rod 870a is connected to the protrusion 914a. The protrusion 914a may also be referred to as a connection portion 914a.

An angle between the right rod 870a and the base 31 may vary depending on the location of the connection portion. An angle between the second arm 912a and the base 31 may be referred to as an angle theta S. When the right slider 860a is located closest to the motor assembly 810 within an operating range, the second arm 912a may be considered to be fully lying with respect to the base 31. When the second arm 912a is fully lying with respect to the base 31, the angle theta S may have a minimum value. For example, when the second arm 912a is fully lying with respect to the base 31, the angle theta S may have a value close to 0 degrees.

When the right slider 860a moves in the +x-axis direction, the angle theta S may gradually increase. Alternatively, when the right slider 860a moves in the +x-axis direction, the second arm 912a may be considered to stand up with respect to the base 31. Alternatively, when the angle theta S gradually increases, the second arm 912a may be considered to stand up with respect to the base 31.

When the right slider 860a is located furthest from the motor assembly 810 within the operating range, the second arm 912a may be considered to fully stand up with respect to the base 31. When the second arm 912a fully stands up with respect to the base 31, the angle theta S may have a maximum value. For example, when the second arm 912a fully stands with respect to the base 31, the second arm 912a may be located perpendicular to the base 31. Alternatively, when the second arm 912a fully stands with respect to the base 31, the angle formed by the base 31 may have a value close to 90 degrees.

A direction in which an angle (angle theta S) formed between the second arm 912a of the right link 910a and the base 31 increases may be referred to as a standing direction S. Alternatively, the direction in which the angle between the second arm 912a of the left link 910b and the base 31 increases may be referred to as the standing direction S.

When a rod mount 862a" is located on an upper side of the body 861a, an angle between the right rod 820a" and the base 31 may be referred to as theta A and a minimum force for the right rod 870a' to erect the second arm 912a may be referred to as Fb.

When the rod mount 862a' is located at the middle height of the body 861a, an angle between the right rod 870a' and the base 31 may be referred to as theta B and a minimum force for the right rod 870a to erect the second arm 912a may be referred to as Fb.

When the rod mount 862a is located on a lower side of the body 861a, an angle between the right rod 870a and the base 31 may be referred to as theta C and a minimum force for the right rod 870a to erect the second arm 912a may be referred to as Fc.

In this case, for the same angle theta S, a relationship of theta A<theta B<theta B may be established. Also, for the same angle theta S, a relationship of Fc<Fb<Fa may be established.

That is, if the angle between the second arm 912a and the base 31 is the same, the force required to erect the second arm 912a may decrease as the angle between the right rod 870a and the base 31 increases.

The cover 872a (see FIG. 43) of the right rod 870a may provide a space (S1, see FIG. 43) in which the right lead screw 840a may be accommodated, so that the rod mount 862a may be coupled to be close to the lower side of the body 861b or the right lead screw 840a.

The lead screws 840a and 840b may be driven by one motor assembly 810. The lead screws 840a and 840b are driven by one motor assembly 810, so that the second arms 912a and 912b may stand symmetrically. However, when the lead screws 840*a* and 840*b* are driven by one motor assembly 810, a load applied to the motor assembly 810 in order to erect the second arms 912*a* and 912*b* may be excessively large. In this case, by increasing the angle between the right rod 870*a* and the base 31, the load applied to the motor assembly 810 to stand the second arm 912*a* may be reduced.

The structure formed by the left lead screw 840*b*, the left slider 860*b*, the left rod 870*b*, and the second arm 912*b* may be symmetrical with the structure formed by the right lead screw 840*a*, the right slider 860*a*, the right rod 870*a*, and the second arm 912*b*. In this case, an axis of symmetry may be the axis of symmetry ys of the motor assembly 810.

Figure 41:
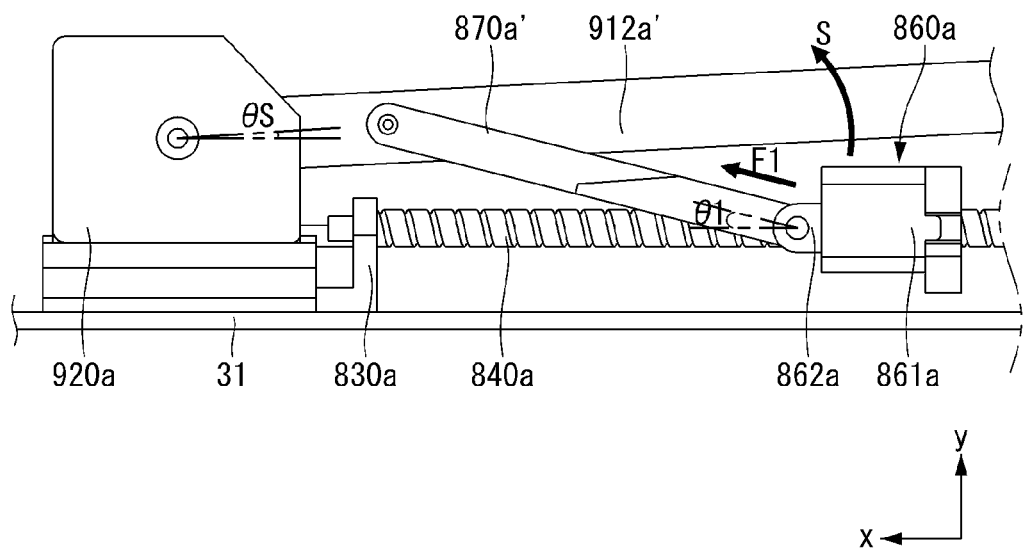
Figure 42:
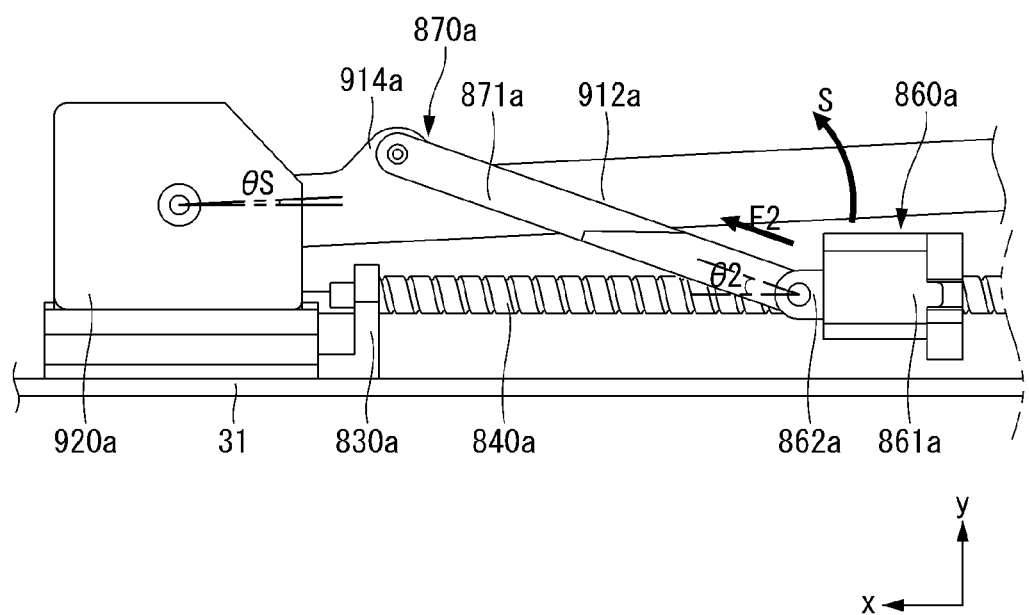
Figure 43:
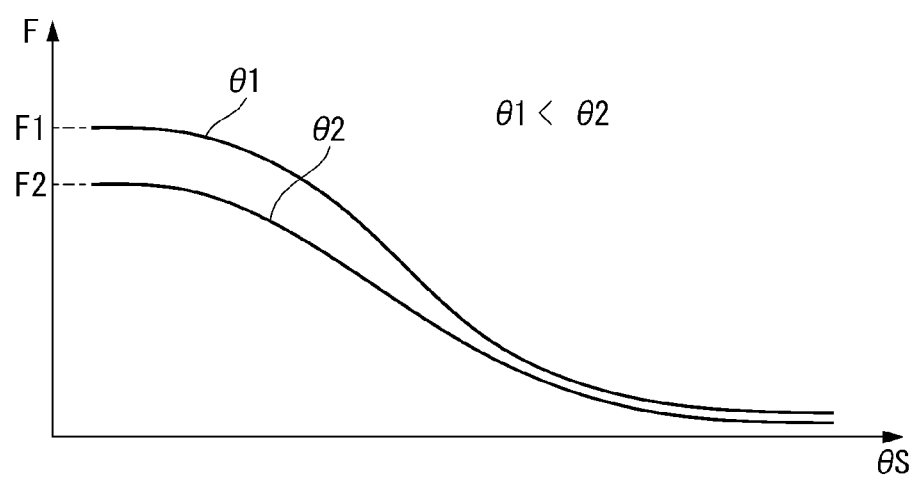

Referring to FIGS. 41 to 43, the second arm 912*a* may include a bar 915*a* and a protrusion 914*a*. FIG. FIG. 41 is a diagram illustrating that the right rod 870*a* is connected to the bar 915*a*, and FIG. 42 is a diagram illustrating that the right rod 870*a* is connected to the protrusion 914*a*. The protrusion 914*a* may also be referred to as a connection portion 914*a*.

An angle between the second arm 912*a* and the base 31 may be referred to as an angle theta S. When the right slider 860*a* is located closest to the motor assembly 810 within an operating range, the second arm 912*a* may be considered to be fully lying with respect to the base 31. When the second arm 912*a* is fully lying with respect to the base 31, the angle theta S may have a minimum value. For example, when the second arm 912*a* is fully lying with respect to the base 31, the angle theta S may have a value close to 0 degrees.

When the right slider 860*a* moves in the +x-axis direction, the angle theta S may gradually increase. Alternatively, when the right slider 860*a* moves in the +x-axis direction, the second arm 912*a* may be considered to stand up with respect to the base 31. Alternatively, when the angle theta S gradually increases, the second arm 912*a* may be considered to stand up with respect to the base 31.

When the right slider 860*a* is located furthest from the motor assembly 810 within the operating range, the second arm 912*a* may be considered to fully stand up with respect to the base 31. When the second arm 912*a* fully stands up with respect to the base 31, the angle theta S may have a maximum value. For example, when the second arm 912*a* fully stands with respect to the base 31, the second arm 912*a* may be located perpendicular to the base 31. Alternatively, when the second arm 912*a* fully stands with respect to the base 31, the angle formed by the base 31 may have a value close to 90 degrees.

A direction in which an angle (angle theta S) formed between the second arm 912*a* of the right link 910*a* and the base 31 increases may be referred to as a standing direction S. Alternatively, the direction in which the angle between the second arm 912*a* of the left link 910*b* and the base 31 increases may be referred to as the standing direction S.

Referring to FIG. 41, an angle formed between the right rod 870*a* and the right lead screw 840*a* may be referred to as an angle theta 1. When the second arm 912*a* is fully lying with respect to the base 31, the angle theta 1 may have a minimum value.

In order to erect the second arm 912*a*, the motor assembly 810 may rotate the driving shaft. When the driving shaft rotates, the right slider 860*a* may move in the +x-axis direction. The right slider 860*a* may apply a force to the right rod 870*a*, and the rod 870*a* may transmit a force to the bar 915*a* of the second arm 912*a*. The second arm 912*a* may be rotated in the standing direction S upon receiving a force from the right rod 870*a*. When the right link 910*a* stands up, the angle theta S and the angle theta 1 may increase.

When the second arm 912*a* is fully lying with respect to the base 31, a minimum force for erecting the second arm 912*a* may be referred to as F1. That is, F1 may refer to the minimum force for the right rod 870*a* to transmit to the bar 915*a* of the second arm 912*a* in order to erect the second arm 912*a*.

Referring to FIG. 42, an angle between the right rod 870*a* and the right lead screw 840*a* may be referred to as an angle theta 2. When the second arm 912*a* is fully lying with respect to the base 31, the angle theta 2 may have a minimum value.

In order to erect the second arm 912*a*, the motor assembly 810 may rotate the driving shaft. When the driving shaft rotates, the right slider 860*a* may move in the +x-axis direction and the left slider 860*b* may move in the −x-axis direction. The slider 860*a*, 860*b* may apply a force to the rod 870*a*, 870*b*, and the rod 870*a*, 870*b* may transmit a force to the bar 915*a* of the second arm 912*a*. The second arm 912*a* may be rotated in the standing direction S upon receiving force from the rod 870*a*, 870*b*. When the link 910*a*, 910*b* stand up, the angle theta S and the angle theta 2 may increase.

When the second arm 912*a* is fully lying with respect to the base 31, a minimum force for erecting the second arm 912*a* may be referred to as F2. That is, F2 may refer to the minimum force for the right rod 870*a* to transmit to the bar 915*a* of the second arm 912*a* in order to erect the second arm 912*a*.

Referring to FIGS. 41 and 42, when a case in which the right rod 870*a* is connected to the bar 915*a* of the second arm 912*a* and a case in which the right rod 870*a* is connected to the protrusion 914*a* of the second arm 912*a* are compared, if the angle theta S formed between the second arm 912*a* and the base 31 is the same, the angle theta 2 formed by the right rod 870*a* connected to the protrusion 914*a* of the second arm 912*a* and the right lead screw 840*a* may be greater than the angle theta 1 formed by the right rod 870*a* connected to the bar 915*a* of the second arm 912*a* and the right lead screw 840*a*.

In addition, if the angle theta S formed between the second arm 912*a* and the base 31 is the same, in the case of the force required to erect the second arm 912*a*, the force F1 required when the right rod 870*a* is connected to the bar 915*a* of the second arm 912*a* may be greater than the force F2 required when the right rod 870*a* is connected to the protrusion 914*a* of the second arm 912*a*.

That is, if the angle formed between the second arm 912*a* and the base 31 is the same, the for required for erecting the second arm 912*a* may decrease as the angle formed between the right rod 870*a* and the right lead screw 840*a* increases. Alternatively, by connecting the right rod 870*a* to the protrusion 914*a*, the second arm 912*a* may be erected with a smaller force than when the right rod 870*a* is connected to the bar 915*a*.

The lead screws 840*a* and 840*b* may be driven by one motor assembly 810. As the lead screws 840*a* and 840*b* are driven by one motor assembly 810, the second arms 912*a* and 912*b* may stand symmetrically. However, when the lead screws 840*a* and 840*b* are driven by one motor assembly 810, a load applied to the motor assembly 810 to erect the second arms 912*a* and 912*b* may be excessively large. At this time, the right rod 870*a* may be connected to the protrusion 914*a* of the second arm 912*a*, so that the angle between the right rod 870*a* and the base 31 may be increased and the load applied to the motor assembly 810 for erecting the second arm 912*a* may be reduced.

The structure formed by the left lead screw 840*b*, the left slider 860*b*, the left rod 870*b*, and the second arm 912*b* may be symmetrical with the structure formed by the right lead screw 840*a*, the right slider 860*a*, the right rod 870*a*, and the second arm 912*b*. In this case, an axis of symmetry may be the axis of symmetry ys of the motor assembly 810.

Figure 44:
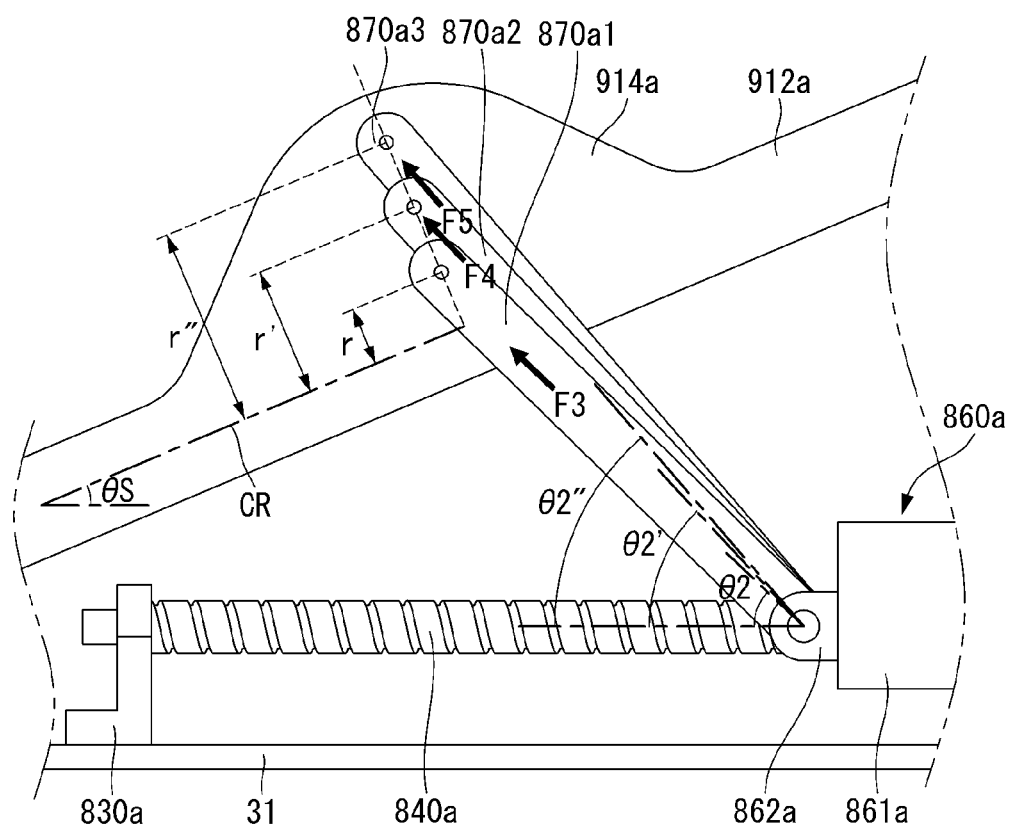
Figure 45:
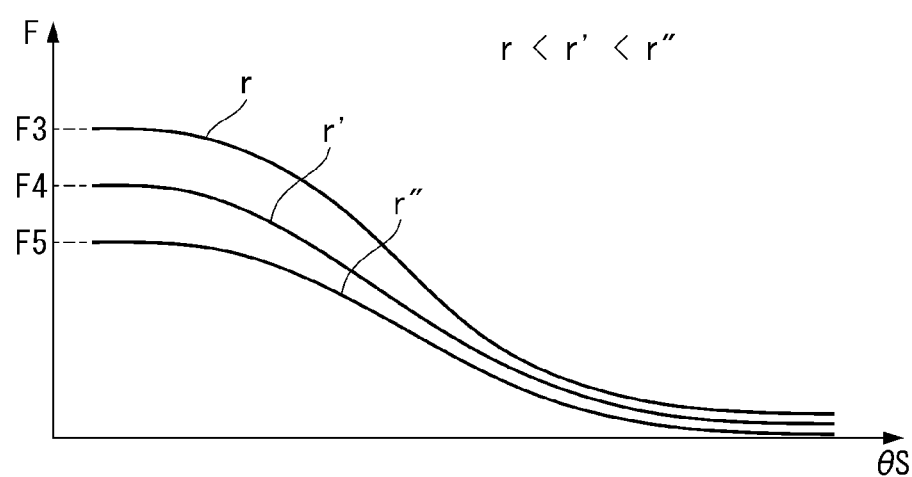

Referring to FIGS. 44 and 45, it is illustrating that the right rod 870*a* is connected to the protrusion 914*a*. The protrusion 914*a* may also be referred to as a connection portion 914*a*.

An angle between the right rod 870*a* and the base 31 may vary depending on a position where the protrusion 914*a* and the right rod 870*a* are connected. An angle between the second arm 912*a* and the base 31 may be referred to as an angle theta S. When the right slider 860*a* is located closest to the motor assembly 810 within an operating range, the second arm 912*a* may be considered to be fully lying with respect to the base 31. When the second arm 912*a* is fully lying with respect to the base 31, the angle theta S may have a minimum value. For example, when the second arm 912*a* is fully lying with respect to the base 31, the angle theta S may have a value close to 0 degrees.

When the right slider 860*a* moves in the +x-axis direction, the angle theta S may gradually increase. Alternatively, when the right slider 860*a* moves in the +x-axis direction, the second arm 912*a* may be considered to stand up with respect to the base 31. Alternatively, when the angle theta S gradually increases, the second arm 912*a* may be considered to stand up with respect to the base 31.

When the right slider 860*a* is located furthest from the motor assembly 810 within the operating range, the second arm 912*a* may be considered to fully stand up with respect to the base 31. When the second arm 912*a* fully stands up with respect to the base 31, the angle theta S may have a maximum value. For example, when the second arm 912*a* fully stands with respect to the base 31, the second arm 912*a* may be located perpendicular to the base 31. Alternatively, when the second arm 912*a* fully stands with respect to the base 31, the angle formed by the base 31 may have a value close to 90 degrees.

A direction in which an angle (angle theta S) formed between the second arm 912*a* of the right link 910*a* and the base 31 increases may be referred to as a standing direction S. Alternatively, the direction in which the angle between the second arm 912*a* of the left link 910*b* and the base 31 increases may be referred to as the standing direction S.

When the right rod 870*a*1 and the protrusion 914*a* are fastened to be apart from a central axis CR of the second arm 912*a* by a distance r, an angle between the right rod 870*a* and the base 31 may be referred to as theta 2 and a force for the right rod 870*a* to erect the second arm 912*a* may be referred to as F3.

When the right rod 870*a*1 and the protrusion 914*a* are fastened to be apart from a central axis CR of the second arm 912*a* by a distance r', an angle between the right rod 870*a* and the base 31 may be referred to as theta 2' and a force for the right rod 870*a* to erect the second arm 912*a* may be referred to as F4.

When the right rod 870*a*1 and the protrusion 914*a* are fastened to be apart from a central axis CR of the second arm 912*a* by a distance r", an angle between the right rod 870*a* and the base 31 may be referred to as theta 2" and a force for the right rod 870*a* to erect the second arm 912*a* may be referred to as F5.

At this time, for the same angle theta S, a relationship of theta 2<theta 2'<theta 2" may be established. Also, for the same angle theta S, a relationship of F5<F4<F3 may be established.

That is, when the angle between the second arm 912*a* and the base 31 is the same, the force required to erect the second arm 912*a* may decrease as the angle between the right rod 870*a* and the base 31 increases.

The structure formed by the left lead screw 840*b*, the left slider 860*b*, the left rod 870*b*, and the second arm 912*b* may be symmetrical with the structure formed by the right lead screw 840*a*, the right slider 860*a*, the right rod 870*a*, and the second arm 912*b*. In this case, an axis of symmetry may be the axis of symmetry ys of the motor assembly 810.

Figure 46:
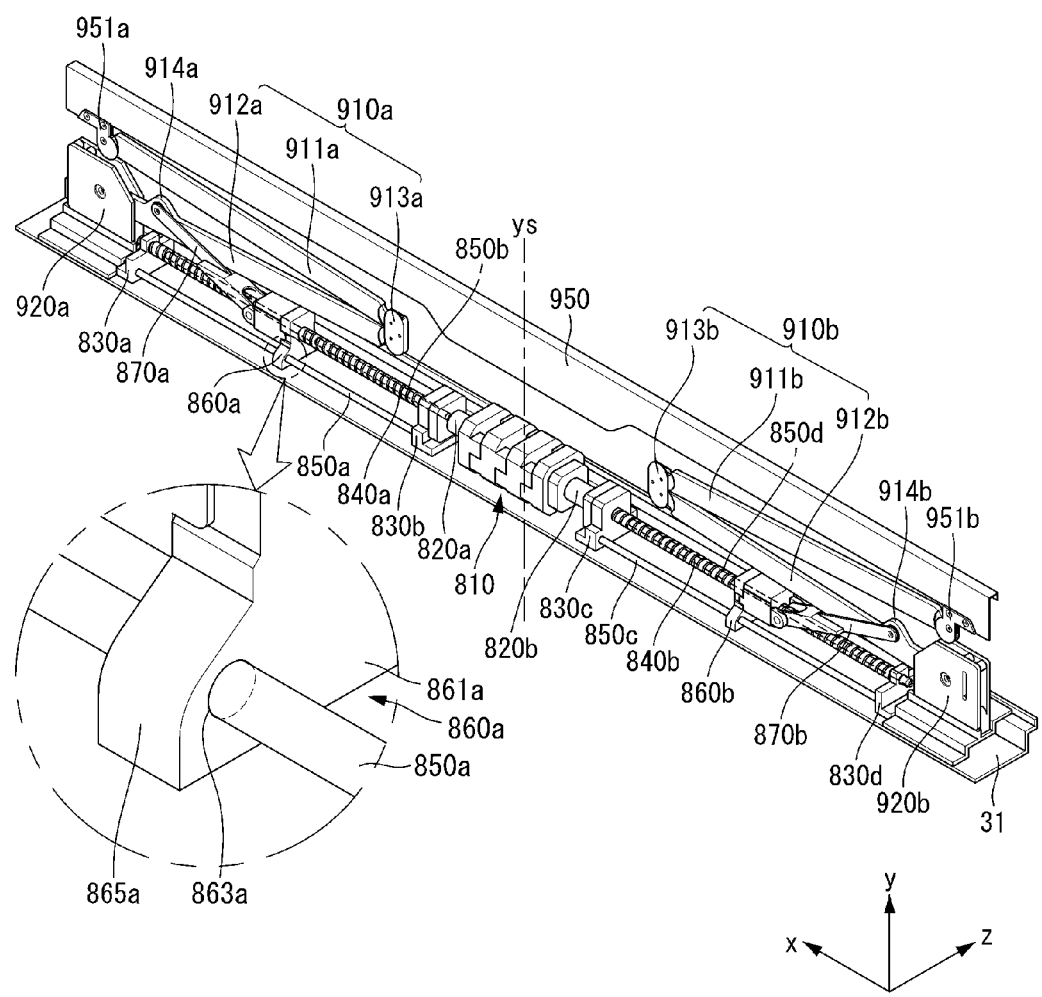

Referring to FIG. 46, a guide 850*a*, 850*b*, 850*c*, 850*d* may be connected to the bearing 830*a*, 830*b*, 830*c*, and 830*d*. The guide 850*a*, 850*b*, 850*c*, 850*d* may include a right guide 850*a*, 850*b* disposed in the right side of the motor assembly 810 and a left guide 850*c*, 850*d* disposed in the left side of the motor assembly 810.

The right guide 850*a*, 850*b* may have one side connected to a first right bearing 830*a* and the other side connected to a second right bearing 830*b*. The right guide 850*a*, 850*b* may be located in parallel with the right lead screw 840*a*. Alternatively, the right guide 850*a*, 850*b* may be spaced apart from the right lead screw 840*a*.

The right guide 850*a*, 850*b* may include a first right guide 850*a* and a second right guide 850*b*. The first right guide 850*a* and the second right guide 850*b* may be spaced apart from each other. The right lead screw 840*a* may be located between the first right guide 850*a* and the second right guide 850*b*.

The right slider 860*a* may include a protrusion. Alternatively, the display device may include a protrusion formed in the right slider 860*a*. The protrusion may be formed in the body of the slider. The protrusion may include a front protrusion (not shown) protruded in the +z-axis direction from the body 861*a* of the right slider 860*a* and a rear protrusion 865*a* protruded in the −z-axis direction from the body of the slider.

The first right guide 850*a* may penetrate the rear protrusion 865*a*. Alternatively, it may include a first hole 863*a* formed in the rear protrusion, and the first right guide 850*a* may penetrate the first hole 863*a*. The first hole 863*a* may be formed in the x-axis direction. The first hole 863*a* may be referred to as a hole 863*a*.

The second right guide (not shown) may penetrate the front protrusion (not shown). Alternatively, it may include a second hole (not shown) formed in the front protrusion, and the second right guide may penetrate the second hole.

The second hole may be formed in the x-axis direction. The right guide 850*a*, 850*b* may guide the right slider 860*a* to move more stably when the right slider 860*a* moves forward or rearward along the right lead screw 840*a*. As the right guide 850*a*, 850*b* stably guides the right slider 860*a*, the right slider 860*a* may move forward or rearward along the right lead screw 840*a* while not rotating with respect to the right lead screw 840*a*.

The structure formed by the left guide 850*c*, 850*d*, the left bearing 830*a*, 830*b*, 830*c*, and 830*d*, the left slider 860*b*, and the left lead screw 840*b* may be symmetrical with the structure formed by the right guide 850*a*, 850*b*, the right bearing 830*a*, 830*b*, 830*c*, and 830*d*, the right slider 860*a*, and the right lead screw 840*a*. In this case, the axis of symmetry may be the axis of symmetry ys of the motor assembly 810.

Figure 47:
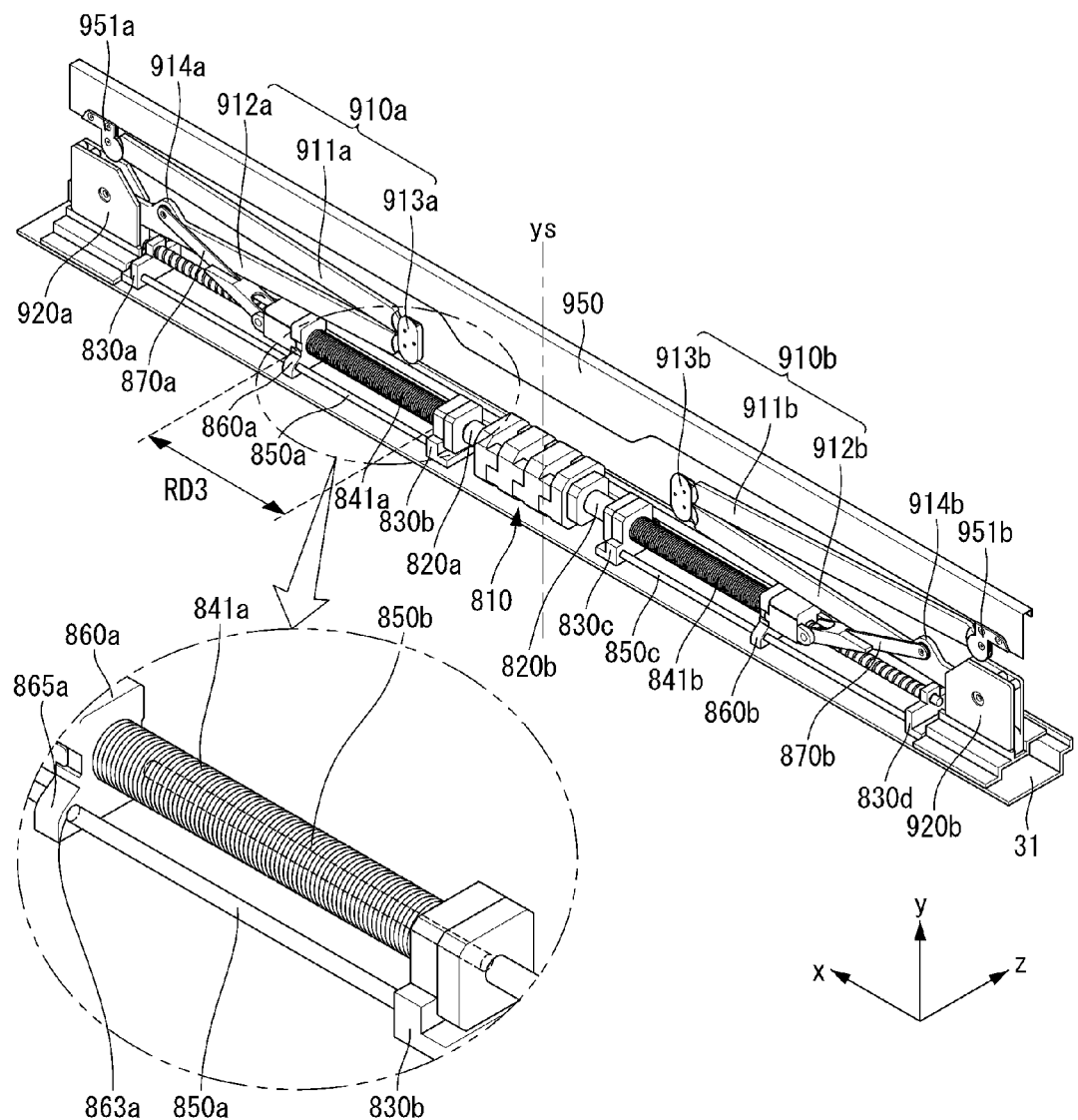

Referring to FIG. 47, a first spring 841a, 841b may be inserted into the lead screw 840a, 840b. Alternatively, the lead screw 840a, 840b may penetrate the first spring 841a, 841b. The first spring 841a, 841b may include a first right spring 841a disposed in the right side of the motor assembly 810 and a first left spring 841b disposed in the left side of the motor assembly 810.

The first right spring 841a may be disposed between the right slider 860a and the second right bearing 830b. One end of the first right spring 841a may be in contact with or separated from the right slider 860a. The other end of the first right spring 841a may be in contact with or separated from the second right bearing 830b.

When the second arm 912a is fully laid with respect to the base 31, the distance between the right slider 860a and the second right bearing 830b may be a distance RD3. The first right spring 841a may have a length greater than the distance RD3 in the state of not being compressed or tensioned. Thus, when the second arm 912a is fully laid with respect to the base 31, the first right spring 841a may be compressed between the right slider 860a and the second right bearing 830b. Then, the first right spring 841a may provide a restoring force to the right slider 860a in the +x axis direction.

When the second arm 912a changes from a fully laid state to a standing state with respect to the base 31, the restoring force provided by the first right spring 841a may assist the second arm 912a to stand up. As the first right spring 841a assists the second arm 912a to stand up, the load on the motor assembly 810 may be reduced.

The lead screw 840a, 840b may be driven by a single motor assembly 810. As the lead screw 840a, 840b is driven by a single motor assembly 810, the second arm 912a, 912b may stand up in symmetry. However, when the lead screw 840a, 840b is driven by a single motor assembly 810, the load on the motor assembly 810 to stand the second arm 912a, 912b may be excessively increased. At this time, the first right spring 841a assists the second arm 912a to stand up, so that the load on the motor assembly 810 may be decreased, and the load on the motor assembly 810 to stand the second arm 912a may be reduced.

Alternatively, when the second arm 912a changes from the standing state to the fully laid state with respect to the base 31, the restoring force provided by the first right spring 841a may alleviate the shock that occurs when the second arm 912a is laid with respect to the base 31. That is, the first right spring 841a may serve as a damper when the second arm 912a is laid with respect to the base 31. As the first right spring 841a serves as a damper, the load of the motor assembly 810 may be reduced.

The structure formed by the first left spring 841b, the left bearing 830a, 830b, 830c, and 830d, the left slider 860b, the left lead screw 840b, and the second arm 912a may be symmetrical with the structure formed by the first right spring 841a, the right bearing 830a, 830b, 830c, and 830d, the right slider 860a, the right lead screw 840a, and the second arm 912a. In this case, the axis of symmetry may be the axis of symmetry ys of the motor assembly 810.

Figure 48:
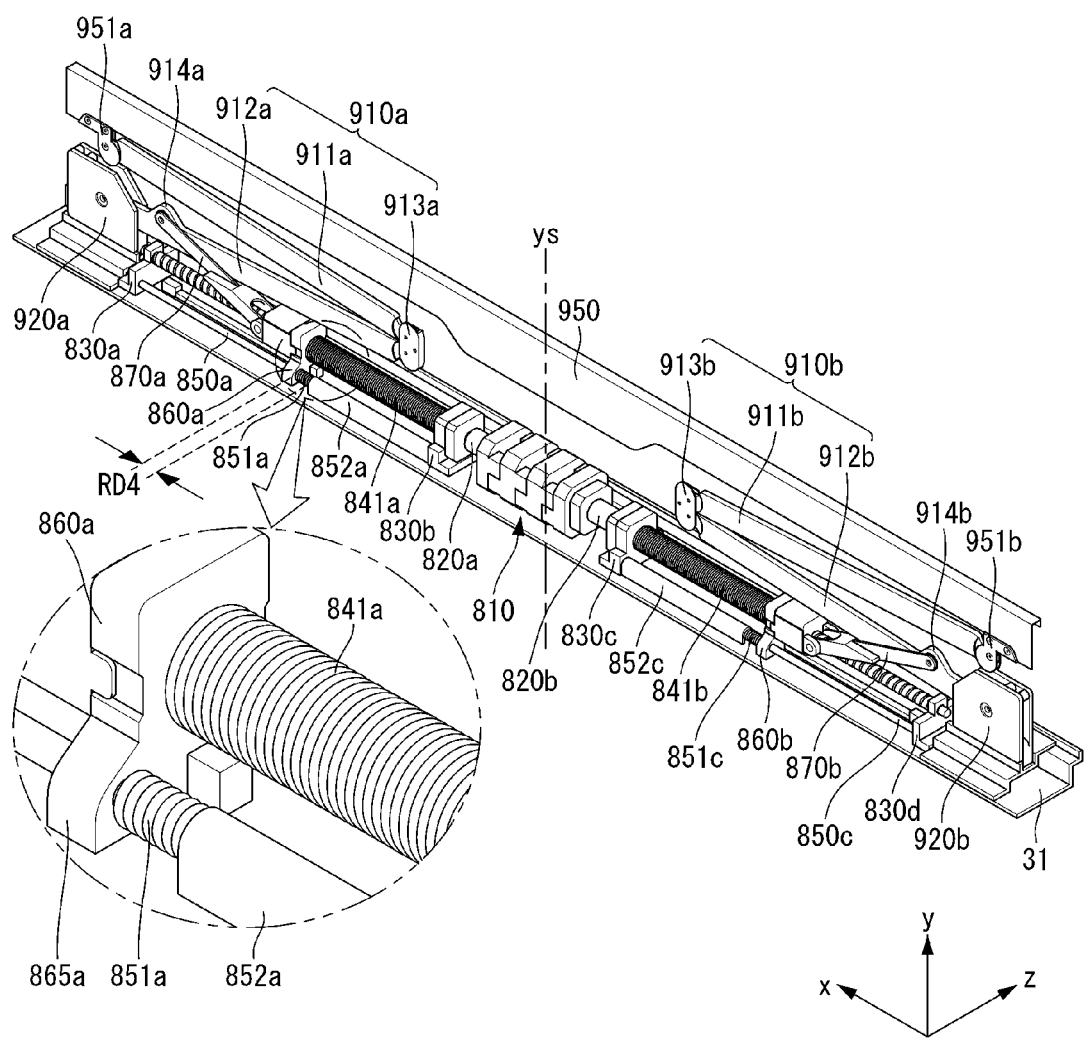

Referring to FIG. 48, the second spring 851a, 851b may be inserted into the guide 850a, 850b, 850c, 850d. Alternatively, the guide 850a, 850b, 850c, 850d may penetrate the second spring 851a, 851b. The second spring 851a, 851b may include a second right spring 851a disposed in the right side of the motor assembly 810 and a second left spring 851b disposed in the left side of the motor assembly 810.

A plurality of second right springs 851a may be formed. The second right spring 851a may include a spring 940a, 940b inserted into the first right guide 850a and a spring 940a, 940b inserted into the second right guide 850b. Alternatively, the second right spring 851a may include a spring 940a, 940b through which the first right guide 850a passes and a spring 940a, 940b through which the second right guide 850b passes.

The guide 850a, 850b, 850c, 850d may include a locking jaw 852a, 852b. The locking jaw 852a, 852b may include a right locking jaw 852a disposed in the right side of the motor assembly 810 and a left locking jaw 852b disposed in the left side of the motor assembly 810.

The right locking jaw 852a may be disposed between the right slider 860a and the second right bearing 830b. The second right spring 851a may be disposed between the right slider 860a and the second right bearing 830b. One end of the second right spring 851a may be in contact with or separated from the right slider 860a. The other end of the second right spring 851a may be in contact with or separated from the right locking jaw 852a.

When the second arm 912a is fully laid with respect to the base 31, the distance between the right slider 860a and the right locking jaw 852a may be a distance RD4. The second right spring 851a may have a length greater than the distance RD4 in the state of being not compressed or tensioned. Thus, when the second arm 912a is fully laid with respect to the base 31, the second right spring 851a may be compressed between the right slider 860a and the right locking jaw 852a. The second right spring 851a may provide a restoring force to the right slider 860a in the +x axis direction.

When the second arm 912a changes from the fully laid state to the standing state with respect to the base 31, the restoring force provided by the second right spring 851a may assist the second arm 912a to stand up. As the second right spring 851a assists the second arm 912a to stand, the load on the motor assembly 810 may be reduced.

The lead screw 840a, 840b may be driven by a single motor assembly 810. As the lead screw 840a, 840b is driven by a single motor assembly 810, the second arm 912a, 912b may stand up in symmetry. However, when the lead screw 840a, 840b is driven by a single motor assembly 810, the load on the motor assembly 810 to stand the second arm 912a, 912b may be excessively increased. At this time, the second right spring 851a may assist the second arm 912a to stand up so that the load on the motor assembly 810 may be decreased, thereby reducing the load on the motor assembly 810 to stand the second arm 912a.

Alternatively, when the second arm 912a changes from the standing state to the fully laid state with respect to the base 31, the restoring force provided by the second right spring 851a may alleviate the shock that occurs when the second arm 912a is laid with respect to the base 31. That is, the second right spring 851a may serve as a damper when the second arm 912a is laid with respect to the base 31. As the second right spring 851a serves as a damper, the load of the motor assembly 810 may be reduced.

The structure formed by the second left spring 851b, the left locking jaw 852b, the left slider 860b, the left guide 850c, 850d, and the second arm 912a may be symmetric with the structure formed by the above-described second right spring 851a, the right locking jaw 852a, the right slider 860a, the right guide 850a, 850b, and the second arm 912a. In this case, the axis of symmetry may be the axis of symmetry ys of the motor assembly 810.

Figure 49:
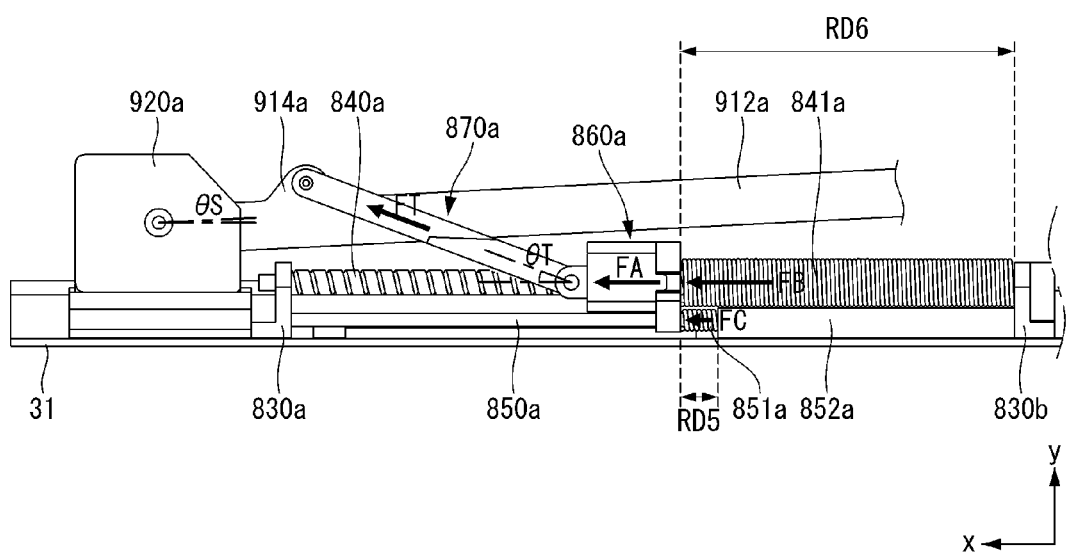
Figure 50:
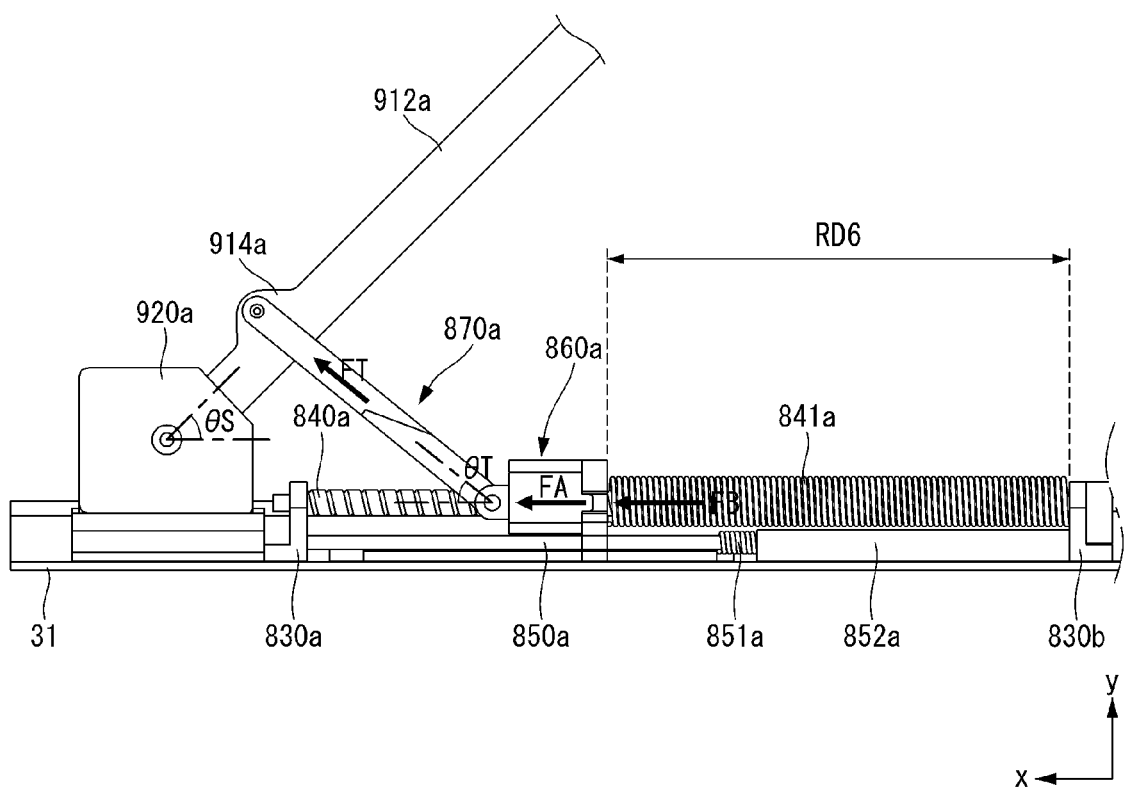
Figure 51:
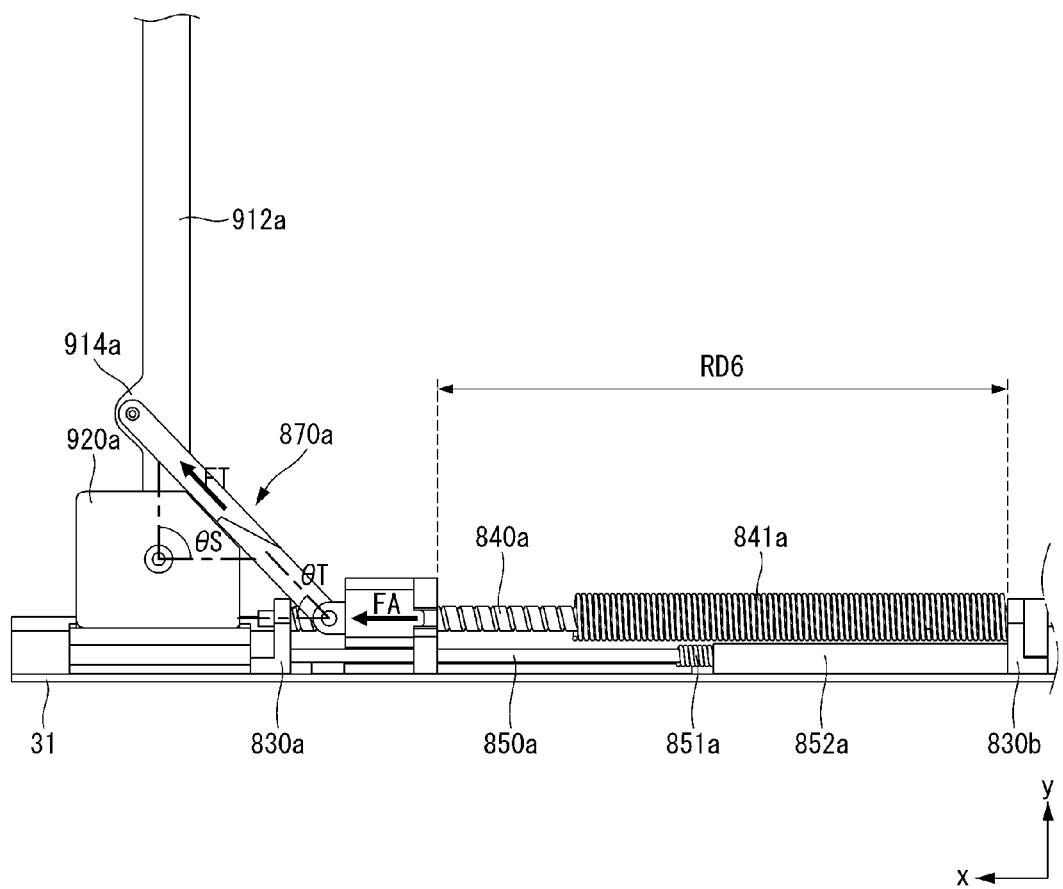

Referring to FIGS. 49 to 51, the second arm 912a may stand up by receiving a restoring force from the first right spring 841a and the second right spring 851a.

An angle formed by the second arm 912a with respect to the base 31 may be referred to as an angle theta S. The angle formed by the right rod 870a with respect to the base 31 may be referred to as an angle theta T. The force applied by the motor assembly 810 for moving the right slider 860a in the +x-axis direction may be referred to as FA. The force exerted on the right slider 860a by the first right spring 841a may be referred to as FB. The force exerted on the right slider 860a by the second right spring 851a may be referred to as FC. The force transmitted by the right rod 870a to the second arm 912a may be referred to as FT.

When the second arm 912a is fully laid with respect to the base 31, the angle theta S and the angle theta T may have minimum values. When the second arm 912a changes from the fully laid state to the standing state with respect to the second base 31, the angle theta S and the angle theta T may be gradually increased.

When the second arm 912a is fully laid with respect to the base 31, the first right spring 841a may be compressed. The compressed first right spring 841a may provide restoring force FB to the right slider 860a. The restoring force FB may act in the +x direction. When the second arm 912a is fully laid with respect to the base 31, the compression displacement amount of the first right spring 841a may be maximized, and the magnitude of the restoring force FB may have a maximum value. When the second arm 912a changes from the fully laid state to the standing state with respect to the base 31, the compression displacement amount of the first right spring 841a may be gradually decreased, and the magnitude of the restoring force FB may be gradually decreased.

When the second arm 912a is fully laid with respect to the base 31, the second right spring 851a may be compressed. The compressed second right spring 851a may provide restoring force FC to the right slider 860a. The restoring force FC may act in the +x direction. When the second arm 912a is fully laid with respect to the base 31, the compression displacement amount of the second right spring 851a may be maximized, and the magnitude of the restoring force FC may have a maximum value. When the second arm 912a changes from the fully laid state to the standing state with respect to the base 31, the compression displacement amount of the second right spring 851a may be gradually decreased, and the magnitude of the restoring force FC may be gradually decreased.

The force FT that the right rod 870a transmits to the second arm 912a may be a summed force of the force FA applied by the motor assembly 810 for moving the right slider 860a in the +x-axis direction, the restoring force FB of the first right spring 841a, and the restoring force FC of the second right spring 851a.

When the second arm 912a starts to stand up in the state where the second arm 912a is fully laid with respect to the base 31, the load of the motor assembly 810 may be maximized. At this time, the magnitude of the restoring force FB provided by the first right spring 841a may be maximized. In addition, the magnitude of the restoring force FC provided by the second spring 851a, 851b may be maximized.

When the second arm 912a changes from the fully laid state to the standing state with respect to the base 31, the restoring force provided by the first right spring 841a and the second right spring 851a may assist to stand the second arm 912a. As the first right spring 841a and the second right spring 851a assist the second arm 912a to stand, the load of the motor assembly 810 may be reduced.

The first right spring 841a and the second right spring 851a may simultaneously provide the restoring force (the summed force of the restoring force FB and the restoring force FC) to the right slider 860a. The restoring force (the summed force of the restoring force FB and the restoring force FC) may be provided to the right slider 860a until the distance RD5 between the right slider 860a and the right locking jaw 852a becomes equal to the length of the second right spring 851a.

When the distance RD5 between the right slider 860a and the right locking jaw 852a is equal to the length of the second right spring 851a, the compression displacement amount of the second right spring 851a may become zero. When the compression displacement amount of the second right spring 851a is zero, the restoring force FC provided by the second right spring 851a to the right slider 860a may be zero.

When the distance RD5 between the right slider 860a and the right locking jaw 852a is greater than the length of the second right spring 851a, only the first right spring 841a may provide the restoring force FB to the right slider 860a. The restoring force FB may be provided to the right slider 860a until the distance RD6 between the right slider 860a and the second right bearing 830b becomes equal to the length of the first right spring 841a.

When the distance RD6 between the right slider 860a and the second right bearing 830b is equal to the length of the first right spring 841a, the compression displacement amount of the first right spring 841a may be zero. When the compression displacement amount of the first right spring 841a becomes zero, the restoring force FB provided by the first right spring 841a to the right slider 860a may be zero.

When the distance RD6 between the right slider 860a and the second right bearing 830b is greater than the length of the first right spring 841a, the motor assembly 810 may stand the second arm 912a without receiving the restoring force from the first right spring 841a or the second right spring 851a.

The structure formed by the first left spring 841b, the second left spring 851b, the left locking jaw 852b, the left slider 860b, the left guide 850c, 850d, the left lead screw 840b, the left rod 870b, and the second arm 912a may be symmetrical with the structure formed by the first right spring 841a, the second right spring 851a, the right locking jaw 852a, the right slider 860a, the right guide 850a, 850b, the right lead screw 840a, the right rod 870a, and the second arm 912a. In this case, the axis of symmetry may be the axis of symmetry ys of the motor assembly 810.

Figure 52:
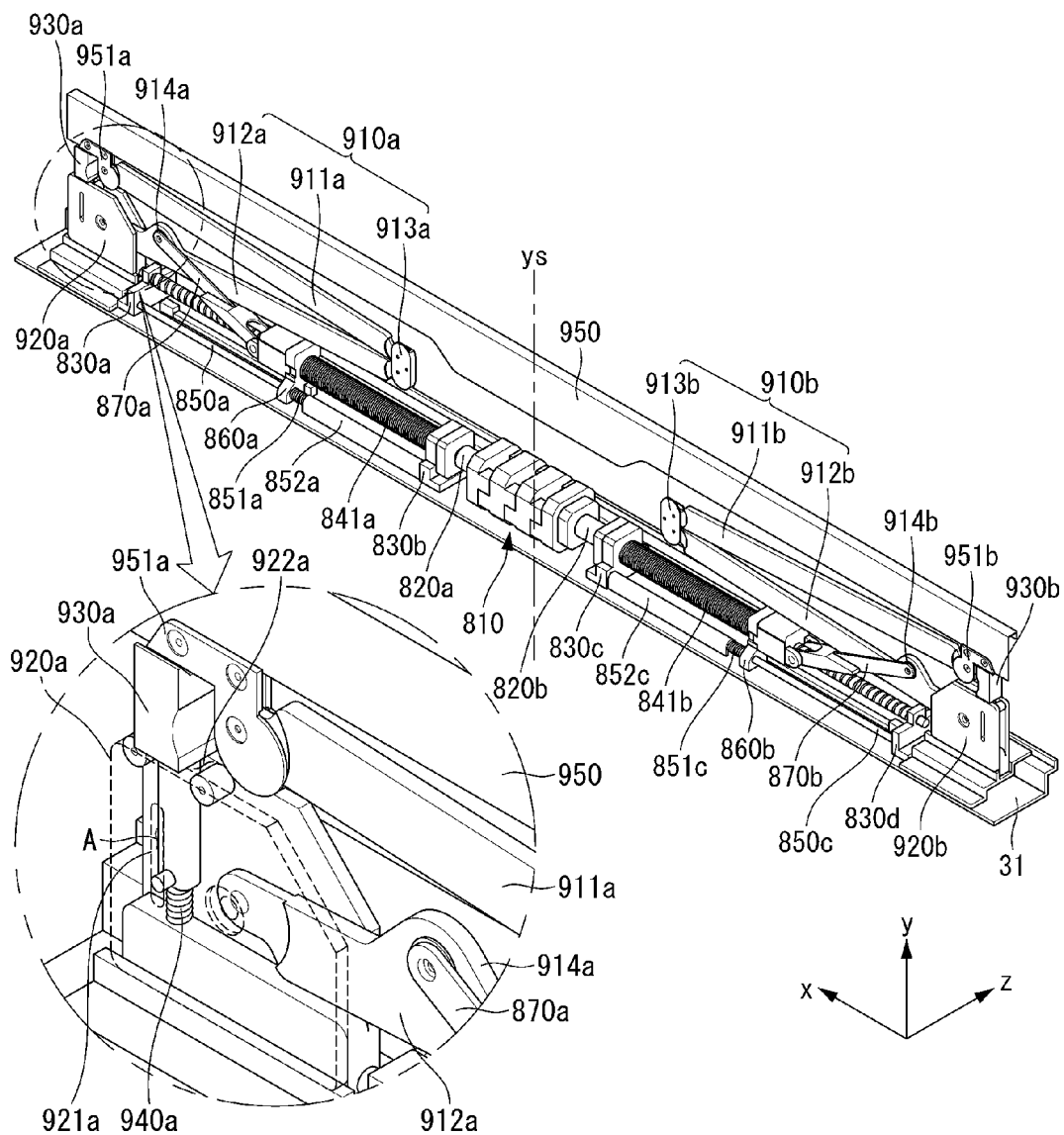

Referring to FIG. 52, the pusher 930a, 930b may be connected to the link mount 920a, 920b. The pusher 930a, 930b may include a right pusher 930a disposed in the right side of the motor assembly 810 and a left pusher 930b disposed in the left side of the motor assembly 810.

The link mount 920a, 920b may form an accommodation space A. The accommodation space A may accommodate the spring 940a, 940b and the pusher 930a, 930b. The spring 940a, 940b may include a right spring 940a disposed in the right side of the motor assembly 810 and a left spring 940b disposed in the left side of the motor assembly 810. The accommodation space A may be referred to as an internal space A.

The link mount 920a, 920b may include a first hole 922a connecting the accommodation space A and an external space (the first hole corresponding to 920b is not shown). The first hole 922a may be formed in the upper surface of the link mount 920a, 920b. The first hole 922a may be referred to as a hole 922a.

The pusher 930a, 930b may be located perpendicular to the base 31. Alternatively, the pusher 930a, 930b may be disposed parallel to the y axis. The spring 940a, 940b may be located perpendicular to the base 31. Alternatively, the spring 940a, 940b may be disposed parallel to the y axis.

The pusher 930a, 930b may include a first part 931a, 931b and a second part 932a, 932b. The second part 932a, 932b may be connected to the lower side of the first part 931a, 931b. The lower end of the second part 932a, 932b may be connected to the spring 940a, 940b. All or part of the second part 932a, 932b may be accommodated in the accommodation space A formed by the link mount 920a, 920b. The second part 932a, 932b may have a diameter equal to the diameter of the first hole 922a or may have a diameter less than the diameter of the first hole 922a. The second part 932a, 932b may penetrate the first hole 922a.

The first part 931a, 931b may be located outside the link mount 920a, 920b. Alternatively, the first part 931a, 931b may be located outside the accommodation space A of the link mount 920a, 920b. The first part 931a, 931b may have a diameter greater than the diameter of the first hole 922a.

The first part 931a, 931b may be in contact with or spaced apart from the link bracket 951a, 951b. For example, when the second arm 912a, 912b is fully laid with respect to the base 31, the first part 931a, 931b may be in contact with the link bracket 951a, 951b. Alternatively, when the second arm 912a, 912b fully stands up with respect to the base 31, the first part 931a, 931b may be spaced apart from the link bracket 951a, 951b.

When the first part 931a, 931b is in contact with the link bracket 951a, 951b, the pusher 930a, 930b may receive a force from the link bracket 951a, 951b. The force applied to the pusher 930a, 930b may be in a downward direction. Alternatively, the force applied to the pusher 930a, 930b may be in the −y axis direction. Alternatively, the link bracket 951a, 951b may press the pusher 930a, 930b. The direction in which the link bracket 951a, 951b presses the pusher 930a, 930b may be downward. Alternatively, the direction in which the link bracket 951a, 951b presses the pusher 930a, 930b may be in the −y axis direction.

When the first part 931a, 931b is applied with a force, the spring 940a, 940b may be compressed. The compressed spring 940a, 940b may provide restoring force to the pusher 930a, 930b. The direction of the restoring force may be opposite to the direction of the force applied to the first part 931a, 931b. Alternatively, the restoring force may act in the +y-axis direction.

The link mount 920a, 920b may include a second hole 921a (the second hole corresponding to 920b is not shown). The second hole 921a may connect the accommodation space A and the external space. All or part of the spring 940a, 940b may be exposed to the outside through the second hole 921a. All or part of the pusher 930a, 930b may be exposed to the outside through the second hole 921a. In the maintenance or repair of the display device, a service provider may check the operating state of the pusher 930a, 930b through the second hole 921a. The second hole 921a may provide a service provider with convenience of maintenance or repair.

Figure 53:
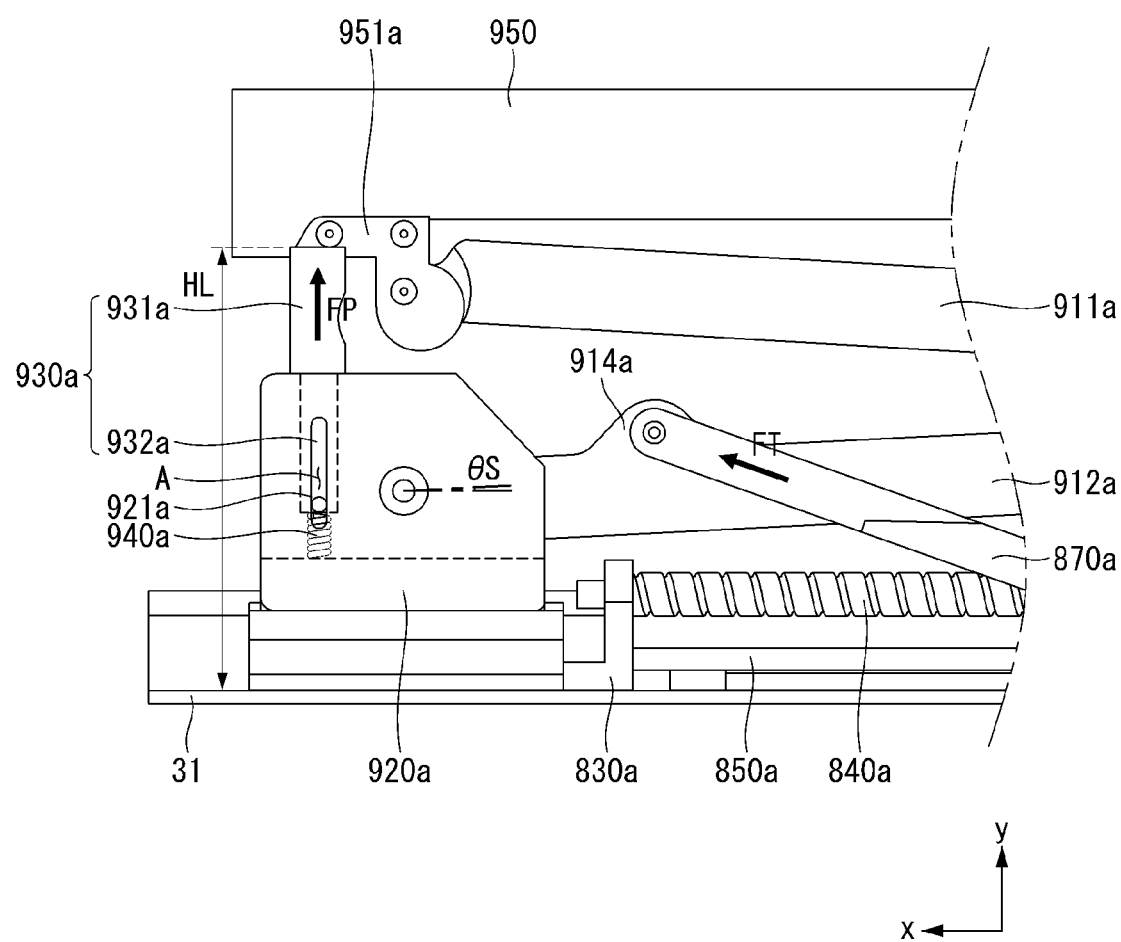
Figure 54:
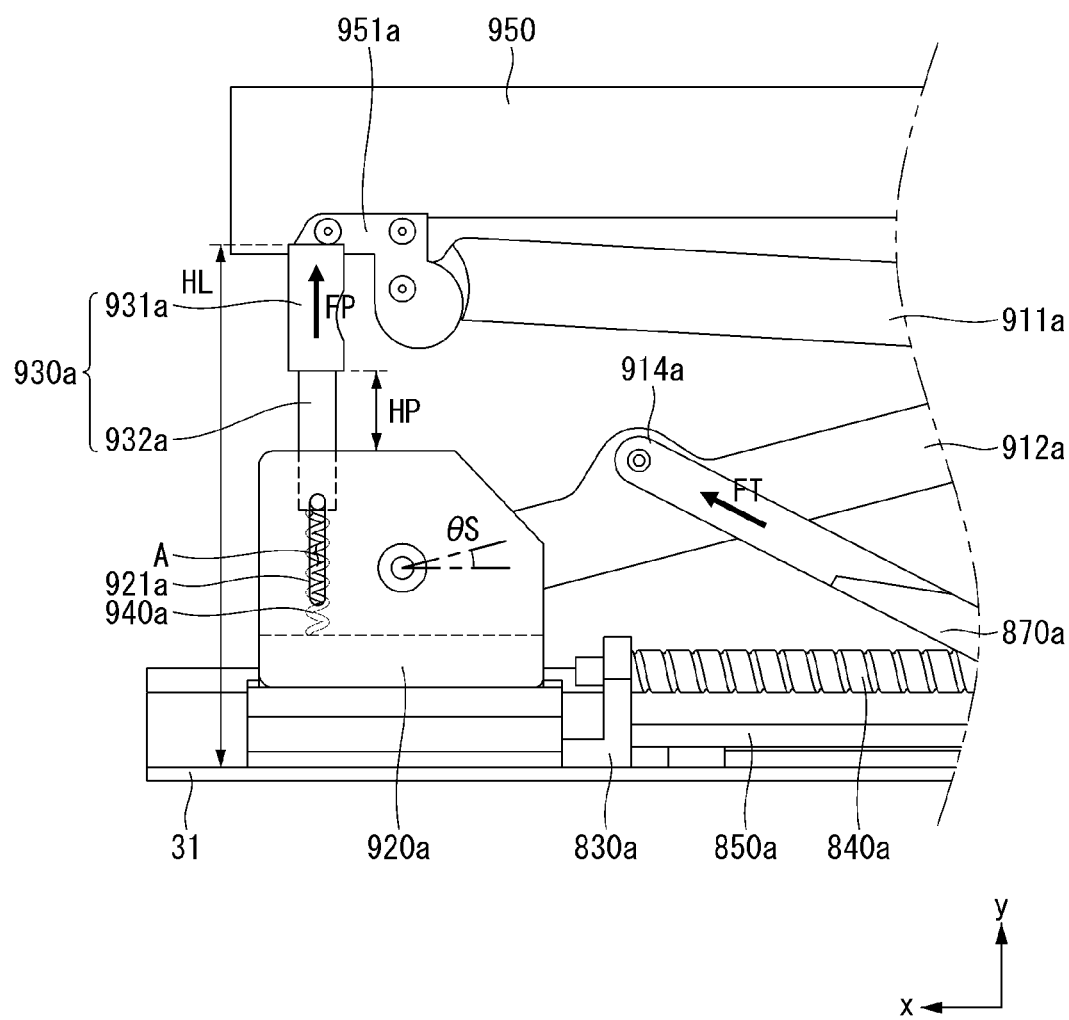
Figure 55:
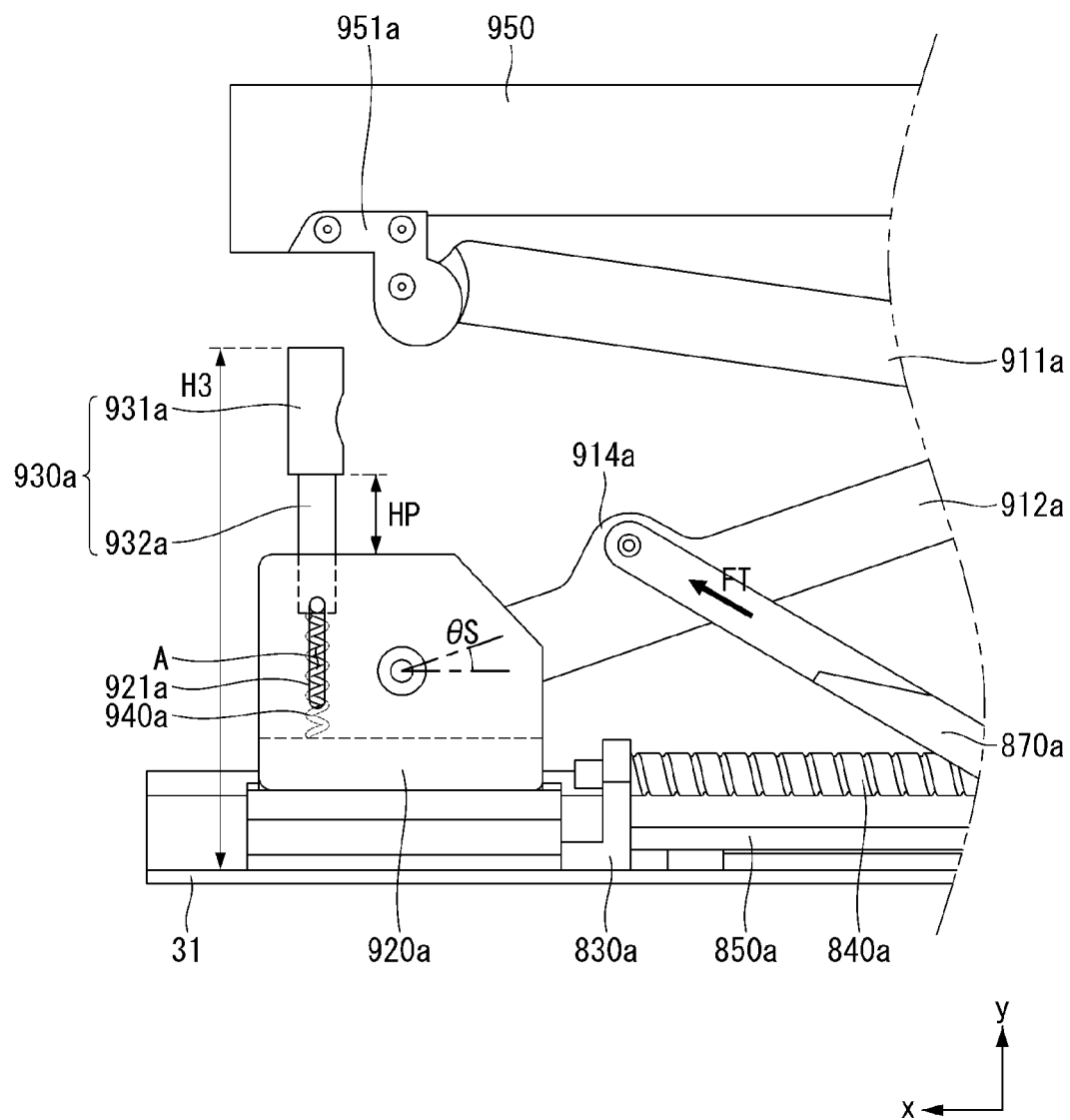

Referring to FIGS. 53 to 55, the right link 910a may stand up by receiving the restoring force from the right pusher 930a. It will be described based on the right link 910a.

An angle formed by the second arm 912a with respect to the base 31 may be referred to as an angle theta S. The force transmitted by the right rod 870a to the second arm 912a may be referred to as FT. The force transmitted by the right pusher 930a to the right link bracket 951a may be referred to as FP.

Figure 59:
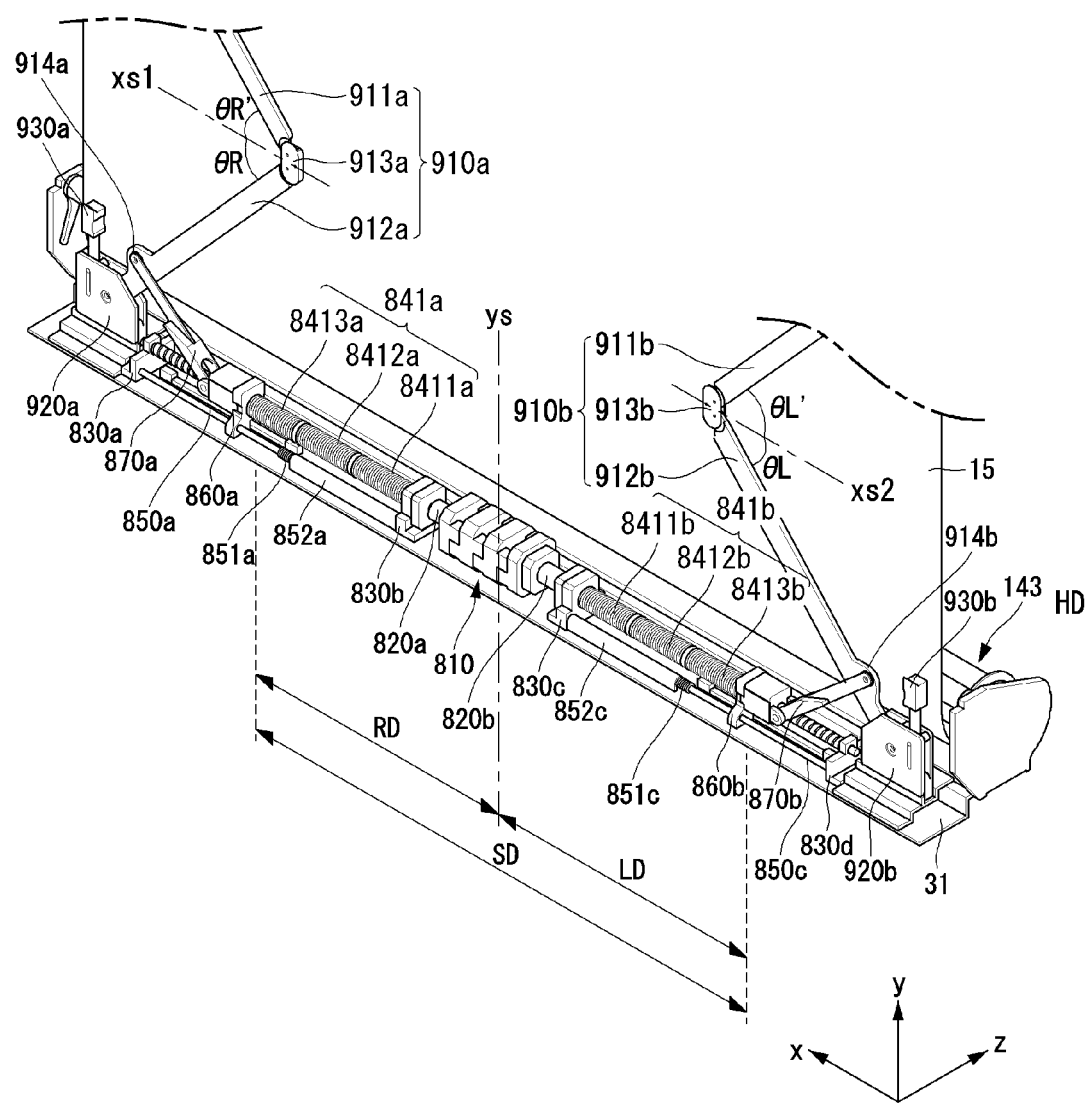

Referring to FIG. 59, when the second arm 912a is fully laid with respect to the base 31, the angle theta S may have a minimum value. The right spring 940a connected to the right pusher 930a may be compressed maximally, and the magnitude of the restoring force FP may have a maximum value. The compressed right spring 940a may provide restoring force FP to the right pusher 930a. The right pusher 930a may transmit the restoring force FP to the right link bracket 951a. The restoring force FP may act in the +y-axis direction.

If the second arm 912a is fully laid with respect to the base 31, the distance HL from the base 31 to the upper end of the right pusher 930a may have a minimum value. The first part 931a of the right pusher 930a may protrude to the outside of the right link mount 920a, and the second part 932a of the right pusher 930a may be fully accommodated in the accommodation space 923a of the right link mount 920a.

Referring to FIG. 54, when the second arm 912a changes from the fully laid state to the standing state with respect to the base 31, the angle theta S may gradually increase. The compression displacement amount of the right spring 940a may gradually decrease, and the magnitude of the restoring force FP may gradually decrease.

As the angle theta S gradually increases, at least a portion of the second part 932a of the right pusher 930a may protrude to the outside of the right link mount 920a. The length by which the second part 932a of the right pusher 930a protrudes to the outside of the right link mount 920a may be referred to as a length HP. The distance HL from the base 31 to the upper end of the right pusher 930a may increase by HP than a case where the second arm 912a is fully laid with respect to the base 31.

Referring to FIG. 55, when the second arm 912a stands up with respect to the base 31, the right pusher 930a and the right link bracket 951a may be separated from each other. The compression displacement amount of the right spring 940a may be zero. When the compression displacement amount of the right spring 940a becomes zero, the restoring force FP provided by the right pusher 930a to the right link bracket 951a may be zero.

In addition, the length HP by which the second part 932a of the right pusher 930a protrudes to the outside of the right link mount 920a may have a maximum value. The distance HL from the base 31 to the upper end of the right pusher 930a may have a maximum value.

That is, the right pusher 930a may assist the second arm 912a to stand and reduce the load of the motor assembly 810 by applying a restoring force to the right link bracket 951a, while the right pusher 930a and the right link bracket 951a are in contact with each other.

The lead screw 840a, 840b may be driven by a single motor assembly 810. As the lead screw 840a, 840b is driven by a single motor assembly 810, the second arm 912a, 912b may stand up in symmetry. However, when the lead screw 840a, 840b is driven by a single motor assembly 810, the load on the motor assembly 810 to stand the second arm 912a, 912b may be excessively increased. At this time, the right pusher 930a may apply the restoring force to the right link bracket 951a, thereby assisting the second arm 912a to stand up and reducing the load of the motor assembly 810.

Alternatively, when the second arm 912a changes from the standing state to the fully laid state with respect to the base 31, the restoring force that the right pusher 930a provides to the right link bracket 951a may alleviate the shock that occurs when the link 910a is laid with respect to the base 31. That is, the restoring force provided by the right pusher 930a to the right link bracket 951a may serve as a damper when the link 910a is laid with respect to the base 31. As the right pusher 930a serves as a damper, the load of the motor assembly 810 may be reduced.

The structure formed by the left pusher 930b, the left spring 940b, the left link bracket 951b, the left link mount 920b, and the left rod 870b may be symmetric with the structure formed by the right pusher 930a, the right spring 940a, the right link bracket 951a, the right link 910a mount, and the right rod 870a. In this case, the axis of symmetry may be the axis of symmetry of the motor assembly 810.

Figure 56:
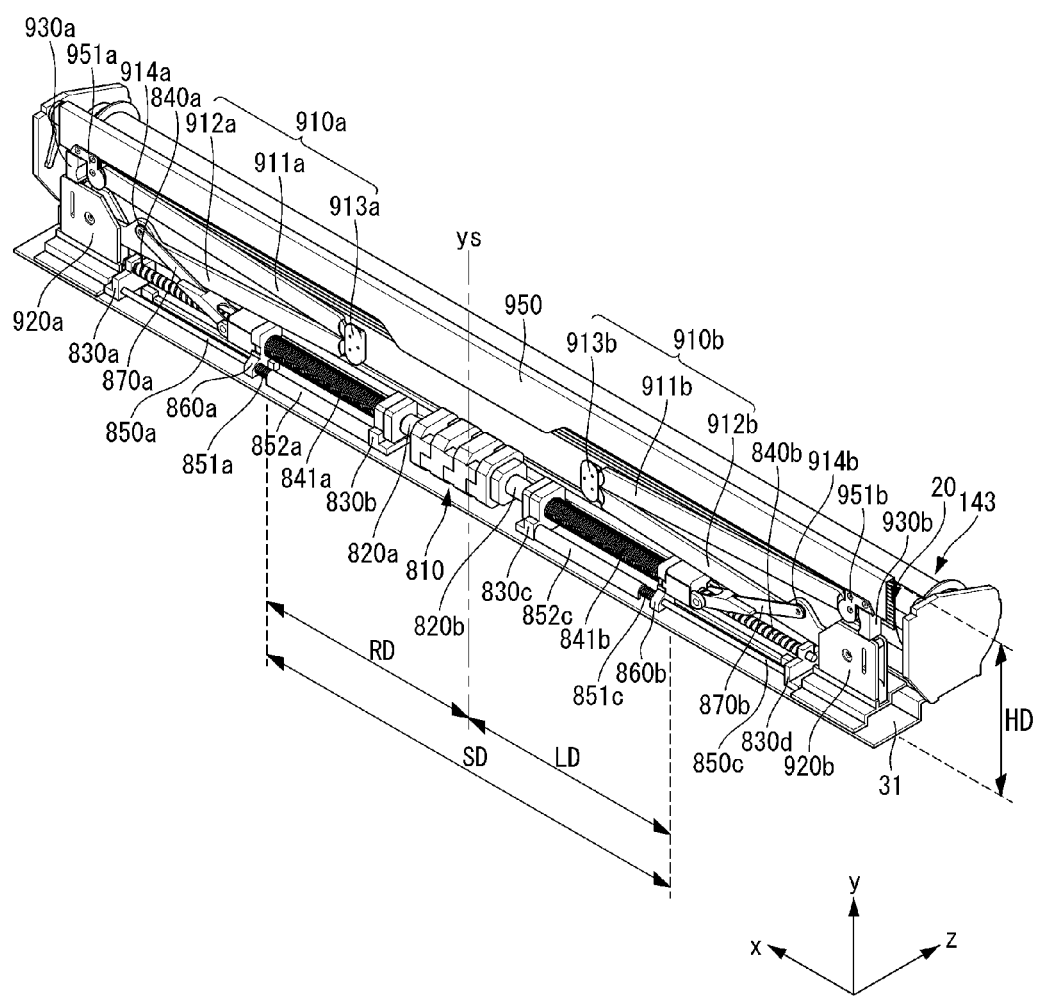
Figure 57:
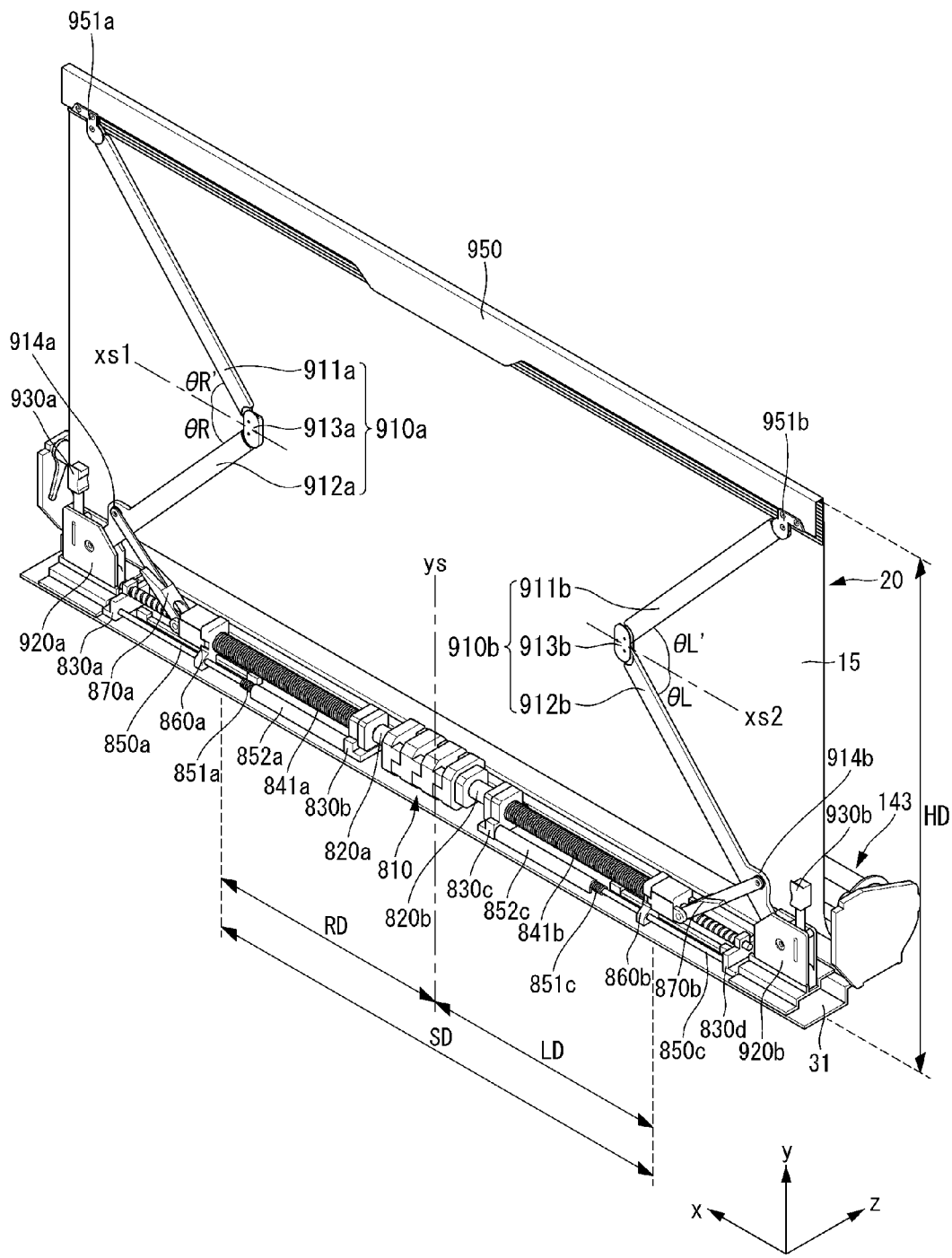
Figure 58:
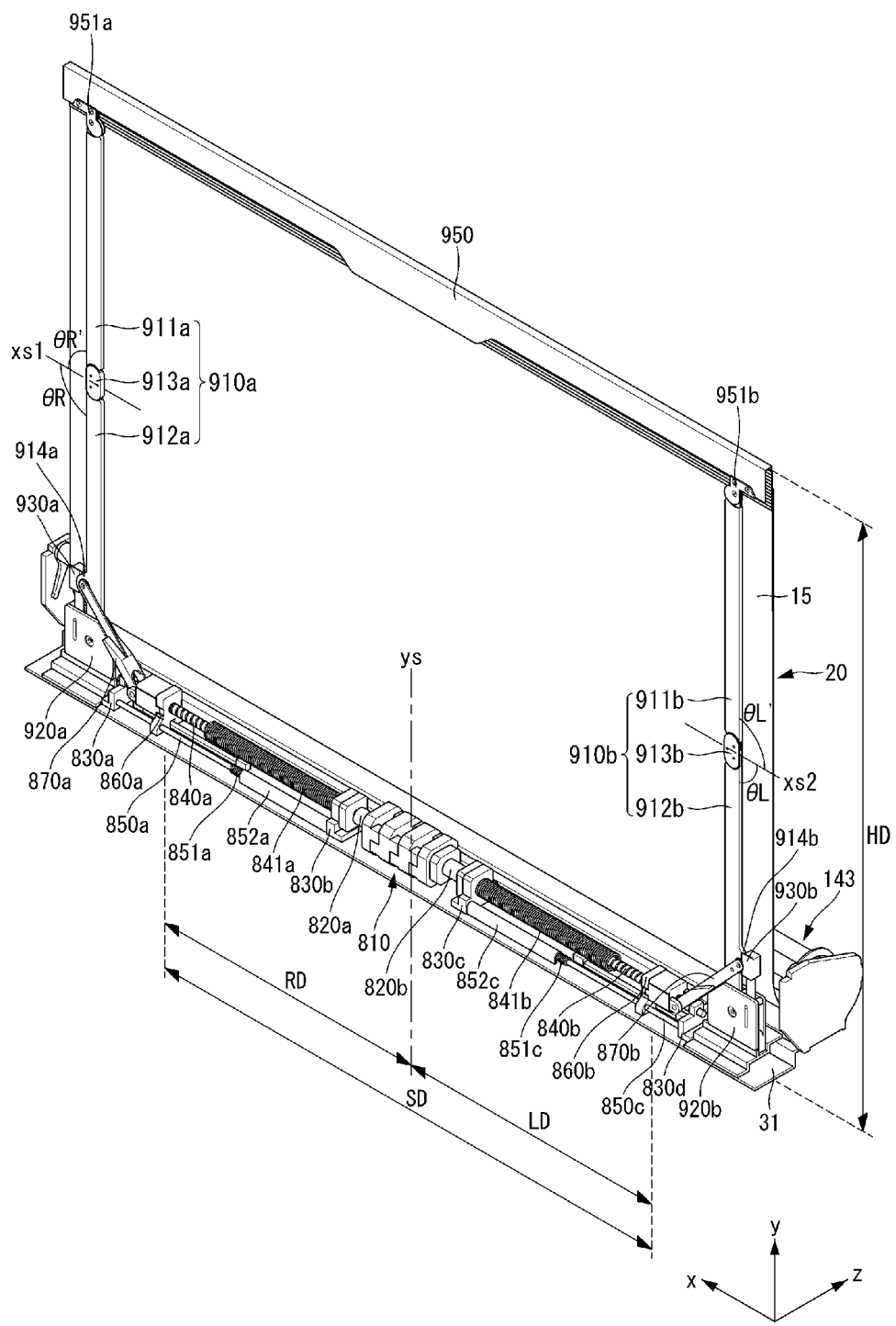

Referring to FIGS. 56 to 58, the panel roller 143 may be installed in the base 31. The panel roller 143 may be installed in front of the lead screw 840a, 840b. Alternatively, the panel roller 143 may be disposed in parallel with the length direction of the lead screw 840a, 840b. Alternatively, the panel roller 143 may be spaced apart from the lead screw 840a, 840b.

The display unit 20 may include a display panel 10 and a module cover 15. The lower side of the display unit 20 may be connected to the panel roller 143, and the upper side of the display unit 20 may be connected to the upper bar 75. The display unit 20 may be wound around or unwound from the panel roller 143.

The distance from the axis of symmetry ys of the motor assembly 810 to the right slider 860a may be referred to as a distance RD. The distance from the axis of symmetry ys of the motor assembly 810 to the left slider 860b may be referred to as a distance LD. The distance between the right slider 860a and the left slider 860b may be referred to as a distance SD. The distance SD may be the sum of the distance RD and the distance LD. The distance from the base 31 to the upper end of the display unit 20 may be referred to as a distance HD.

Referring to FIG. 56, when the second arm 912a, 912b is fully laid with respect to the base 31, the distance SD between the right slider 860a and the left slider 860b may have a minimum value. The distance RD from the axis of symmetry ys of the motor assembly 810 to the right slider 860a may be the same as the distance LD from the axis of symmetry ys of the motor assembly 810 to the left slider 860b.

When the second arm 912a, 912b is fully laid with respect to the base 31, the distance HD from the base 31 to the upper end of the display unit 20 may have a minimum value.

When the second arm 912a, 912b is fully laid with respect to the base 31, the first spring 841a, 841b may contact the slider 860a, 860b. In addition, the second spring 851a, 851b may contact the slider 860a, 860b. In addition, the pusher 930a, 930b may contact the link bracket 951a, 951b.

When the second arm 912a, 912b is fully laid with respect to the base 31, the amount of compression of the first spring 841a, 841b may have a maximum value, and the magnitude of the restoring force provided to the slider 860a, 860b by the first spring 841a, 841b may have a maximum value.

When the second arm 912a, 912b is fully laid with respect to the base 31, the amount of compression of the second spring 851a, 851b may have a maximum value, and the magnitude of the restoring force provided to the slider 860a, 860b by the second spring 851a, 851b may have a maximum value.

When the second arm 912a, 912b is fully laid with respect to the base 31, the amount of compression of the spring 940a, 940b may have a maximum value, and the magnitude of the restoring force provided to the pusher 930a, 930b by the spring 940a, 940b may have a maximum value.

When the second arm 912a, 912b start to stand with respect to the base 31, the second arm 912a, 912b may stand by receiving a restoring force from the first spring 841a, 841b, the second spring 851a, 851b, and the spring 940a, 940b. Thus, the load on the motor assembly 810 may be reduced.

Referring to FIG. 57, as the second arm 912a, 912b stands with respect to the base 31, the distance SD between the right slider 860a and the left slider 860b may gradually increase. Even if the distance SD increases, the distance LD and the distance RD may be equal to each other. That is, the right slider 860a and the left slider 860b may be symmetrically located with respect to the axis of symmetry ys of the motor assembly 810. In addition, the extent to which the second arm 912a, 912b of the right link 910a stands with respect to the base 31 and may be equal to the extent to which the second arm 912a, 912b of the left link 910b stands with respect to the base 31.

As the second arm 912a, 912b stands with respect to the base 31, the distance HD from the base 31 to the upper end of the display unit 20 may gradually increase. The display unit 20 may be unwound from the panel roller 143. Alternatively, the display unit 20 may be unfolded from the panel roller 143.

When the second arm 912a, 912b fully stands up with respect to the base 31, the first spring 841a, 841b may be separated from the slider 860a, 860b. In addition, when the second arm 912a, 912b fully stands up with respect to the base 31, the second spring 851a, 851b may be separated from the slider 860a, 860b. In addition, when the second arm 912a, 912b stands up with respect to the base 31, the pusher 930a, 930b may be separated from the link bracket 951a, 951b.

The separation of the first spring 841a, 841b from the slider 860a, 860b, the separation of the second spring 851a, 851b from the slider 860a, 860b, and the separation of the pusher 930a, 930b from the link bracket 951a, 951b may proceed independently of each other. That is, the order of the separation of the first spring 841a, 841b from the slider 860a, 860b, the separation of the second spring 851a, 851b from the slider 860a, 860b, and the separation of the pusher 930a, 930b from the link bracket 951a, 951b may be mutually variable.

The angle formed between the axis xs1 parallel to the base 31 and the second arm 912a may be referred to as theta R. The angle formed between the axis xs1 parallel to the base 31 and the first arm 911a may be referred to as theta R'. The axis xs1 and x-axis may be parallel.

When the second arm 912a is fully laid with respect to the base 31, or while the second arm 912a stands up with respect to the base 31, or when the standing of the second arm 912a with respect to the base 31 is completed, theta R and theta R' may be maintained to be the same.

The angle formed between the axis xs2 parallel to the base 31 and the second arm 912b may be referred to as theta L. The angle formed between the axis xs2 parallel to the base 31 and the first arm 911b may be referred to as theta L'. The axis xs2 and x-axis may be parallel.

When the second arm 912b is fully laid with respect to the base 31, or while the second arm 912b stands up with respect to the base 31, or when the standing of the second arm 912a with respect to the base 31 is completed, theta L and theta L' may be maintained to be the same.

The axis xs1 and the axis xs2 may be the same axis mutually.

Referring to FIG. 58, when the second arm 912*a*, 912*b* fully stands up with respect to the base 31, the distance SD between the right slider 860*a* and the left slider 860*b* may have a maximum value. Even when the distance SD is maximized, the distance LD and the distance RD may be equal to each other.

When the second arm 912*a*, 912*b* fully stands up with respect to the base 31, the distance HD from the base 31 to the upper end of the display unit 20 may have a maximum value.

When the display device described above with reference to FIGS. 56 to 58 is driven, noise due to torsion (buckling) may occur when the first spring 841*a*, 841*b* is compressed. Referring to FIG. 59, first springs 841*a*, 841*b* may include a first plurality of springs 841*a* and 841*b*. The first plurality of springs 841*a* and 841*b* may include a first part spring 8411*a*, 8411*b*, a second part spring 8412*a*, 8412*b*, and a third part spring 8413*a*, 8413*b*. The first part spring 8411*a*, 8411*b*, the second part spring 8412*a*, 8412*b*, and the third part spring 8413*a*, 8413*b* may be inserted into the lead screw 840*a*, 840*b*, and may be disposed in series with each other.

Accordingly, torsion (buckling) when the first springs 841*a* and 841*b* are compressed may be prevented.

Figure 60:
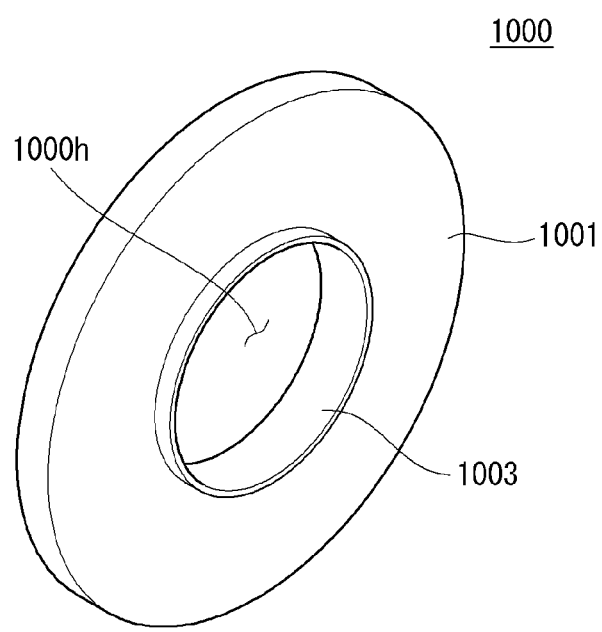
Figure 61:
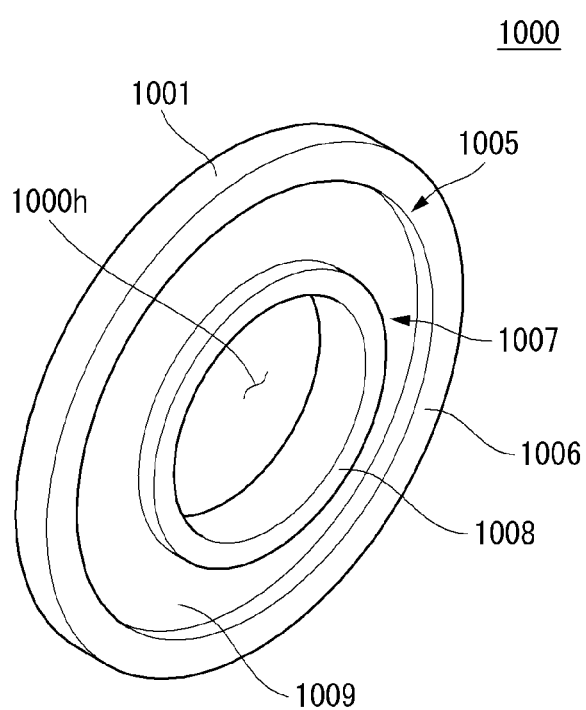
Figure 62:
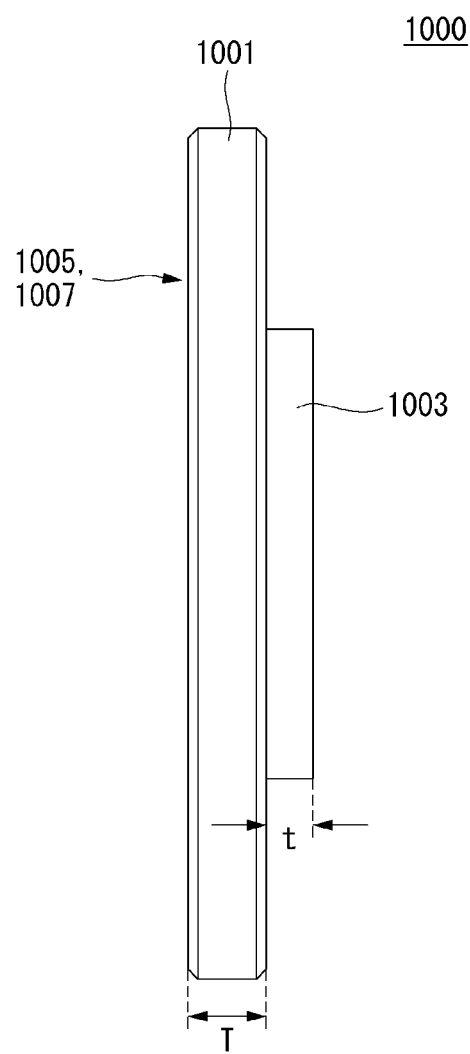

Referring to FIGS. 60 to 62, a spacer 1000 may include a body 1001, a support rib 1003, and friction ribs 1005 and 1007. The body 1001 may have a ring shape of a flat disk in a radial direction. A hole 1000*h* may be formed in the center of the body 1001. A diameter of the hole 1000*h* may be slightly larger than an outer diameter of the lead screws 840*a*, 840*b*. An outer diameter of the body 1001 may be substantially the same as or greater than an outer diameter of the first spring 841*a*, 841*b*.

The support rib 1003 may have a cylindrical shape. An outer diameter of the support rib 1003 may be substantially the same as an inner diameter of the hole 1000*h* in the center of the body 1001. The support rib 1003 may protrude from one surface of the body 1001. The support rib 1003 may form a wall with respect to one surface of the body 1001. A protrusion length t of the support rib 1003 may be about ½ of a thickness T of the body 1001.

The friction ribs 1005 and 1007 may include a first friction rib 1005 and a second friction rib 1007. The first friction rib 1005 may have a ring shape of a disk. The first friction rib 1005 may be elongated or protrude from the body 1001 in the central axis direction adjacent to the outer diameter of the body 1001, and may have an outer diameter substantially the same as the outer diameter. The second friction rib 1007 may be elongated or protrude from the body 1001 in the central axis direction of the body 1001 adjacent to the inner diameter of the body 1001 and may have an inner diameter substantially the same as the inner diameter of the body 1001. The first friction rib 1005 may have a first friction surface 1006, and the first friction surface 1006 may be a smooth polished surface. The second friction rib 1007 may have a second friction surface 1008, and the second friction surface 1008 may be a smooth polished surface. The friction ribs 1005 and 1007 and the support rib 1003 may face the body 1001.

An accommodation portion 1009 may be located between the first friction rib 1005 and the second friction rib 1007. The accommodation portion 1009 may be one surface of the body 1001. The accommodation portion 1009 may separate the first friction rib 1005 and the second friction rib 1007 from each other. The accommodation portion 1009 may accommodate a lubricant such as lubricating oil or grease.

Figure 63:
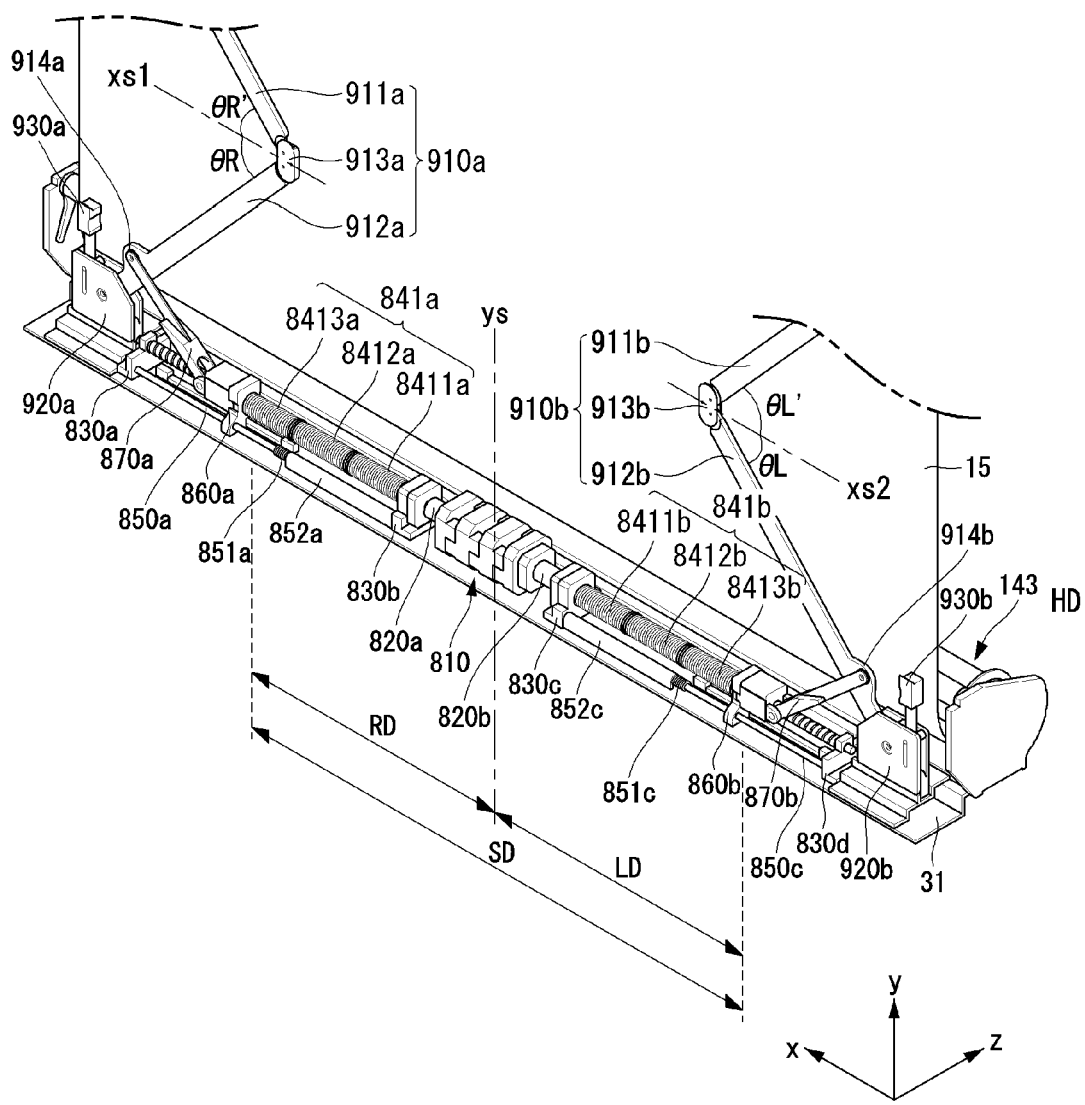
Figure 64:
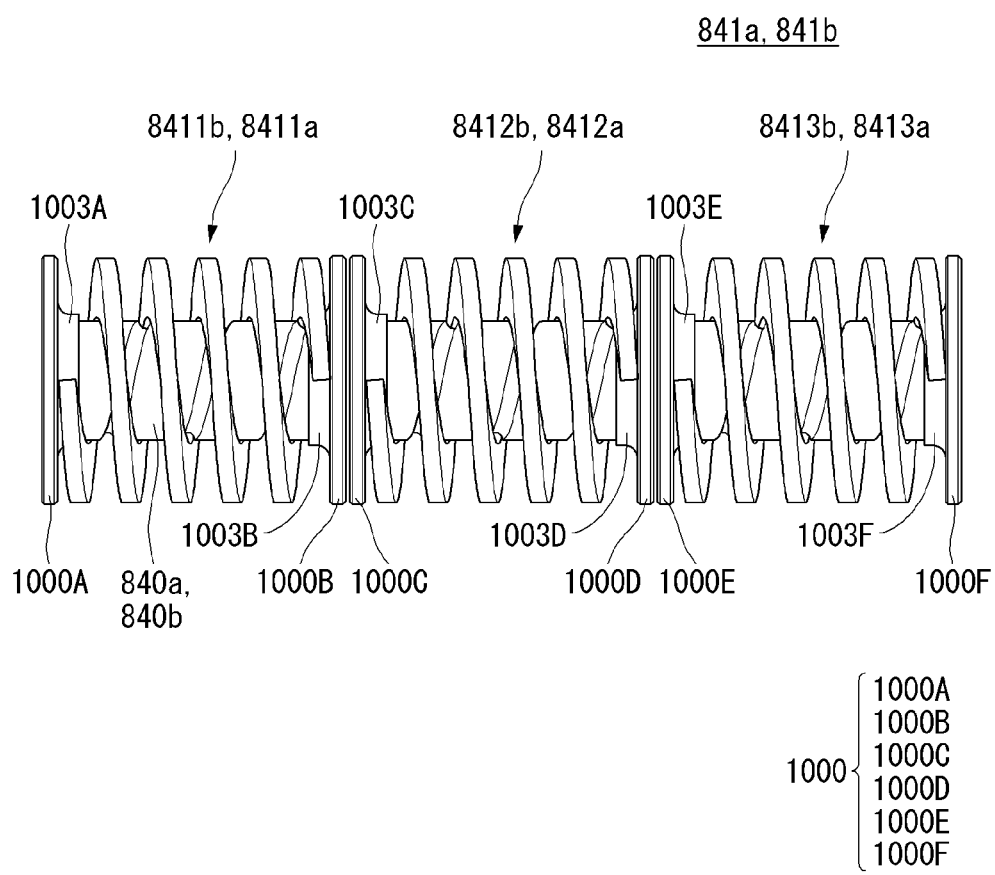

Referring to FIGS. 63 and 64, there may be a plurality of spacers 1000. The plurality of spacers 1000 may include a first spacer 1000A, a second spacer 10006, a third spacer 1000C, a fourth spacer 1000D, a fifth spacer 1000E, and a sixth spacer 1000F.

The first spacer 1000A may be located at or inserted into one end of the first part spring 8411*a*, 8411*b*. In this case, the support rib 1003A of the first spacer 1000A may be located or inserted toward the first part spring 8411*a*, 8411*b*. The second spacer 10006 may be located at or inserted into the other end of the first part spring 8411*a*, 8411*b*, and the third spacer 1000C may be located at or inserted into one end of the second part spring 8412*a*, 8412*b*. In this case, the support rib 1003B of the second spacer 1000B may be located or inserted toward the first part spring 8411*a*, 8411*b*, and the support rib 1003C of the third spacer 1000C may be located or inserted toward the second part spring 8412*a*, 8412*b*. The third spacer 1000C may face or contact the second spacer 10006.

The fourth spacer 1000D may be located or inserted into the other end of the second part spring 8412*a*, 8412*b*, and the fifth spacer 1000E may be located or inserted into one end of the third part spring 8413*a*, 8413*b*. In this case, the support rib 1003D of the fourth spacer 1000D may be located or inserted toward the second part spring 8412*a*, 8412*b*, and the support rib 1003E of the fifth spacer 1000E may be located or inserted toward the third part spring 8413*a*, 8413*b*. The fourth spacer 1000D may face or contact the fifth spacer 1000E. The sixth spacer 1000F may be located or inserted into the other end of the third part spring 8413*a*, 8413*b*. In this case, the support rib 1003F of the sixth spacer 1000F may be located or inserted toward the third part spring 8413*a*, 8413*b*.

Figure 65:
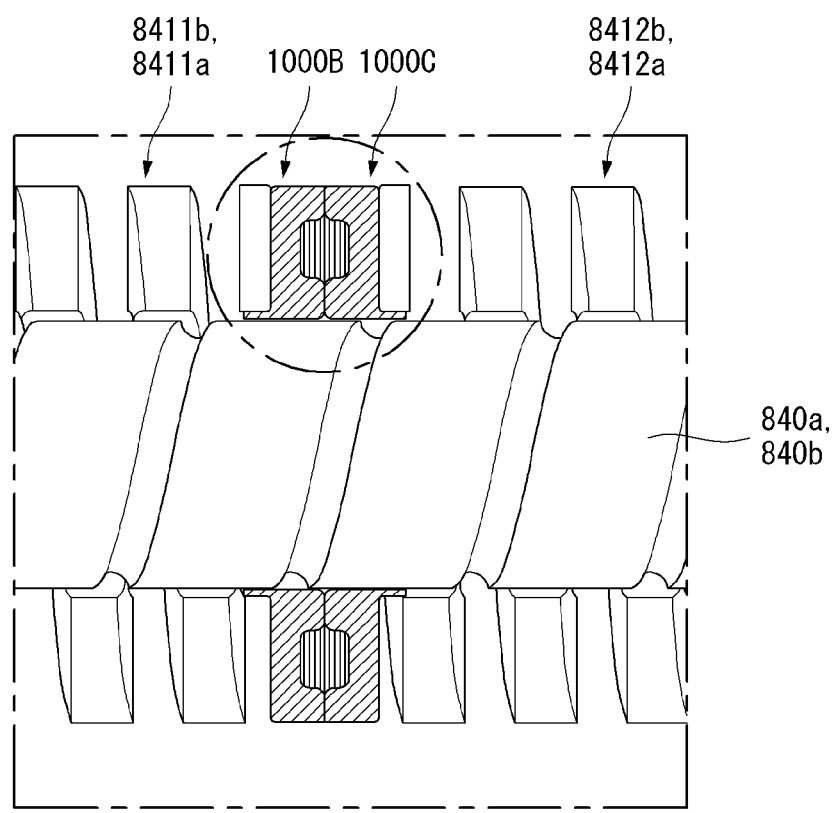
Figure 66:
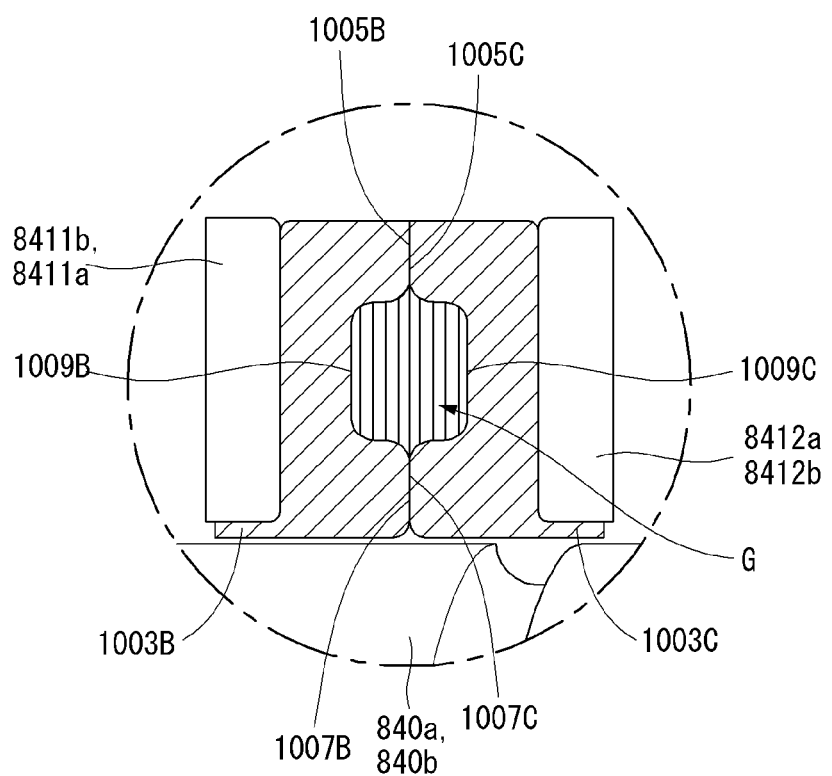

Referring to FIGS. 65 and 66 (the second spacer 1000B and/or the third spacer 1000C is described as an example, but may be applied to other spacers).

The support rib 1003B of the second spacer 1000B may support the first part spring 8411*a*, 8411*b*. The support rib 1003B of the second spacer 1000B may be inserted between the lead screw 840*a*, 840*b* and the first part spring 8411*a*, 8411*b*. The support rib 1003C of the third spacer 1000C may support the second part spring 8412*a*, 8412*b*. The support rib 1003C of the third spacer 1000C may be inserted between the lead screw 840*a*, 840*b* and the second part spring 8412*a*, 8412*b*.

The first friction rib 1005B of the second spacer 1000B may face or contact the first friction rib 1005C of the third spacer 1000C. The second friction rib 10076 of the second spacer 10006 may face or contact the second friction rib 1007C of the third spacer 1000C. The second spacer 1000B may perform frictional rotation with respect to the third spacer 1000C. A lubricant such as lubricating oil or grease may be accommodated in accommodation portions 1009B and 1009C. Accordingly, frictional rotation of the second spacer 10006 with respect to the third spacer 1000C may be smoothed.

Figure 67:
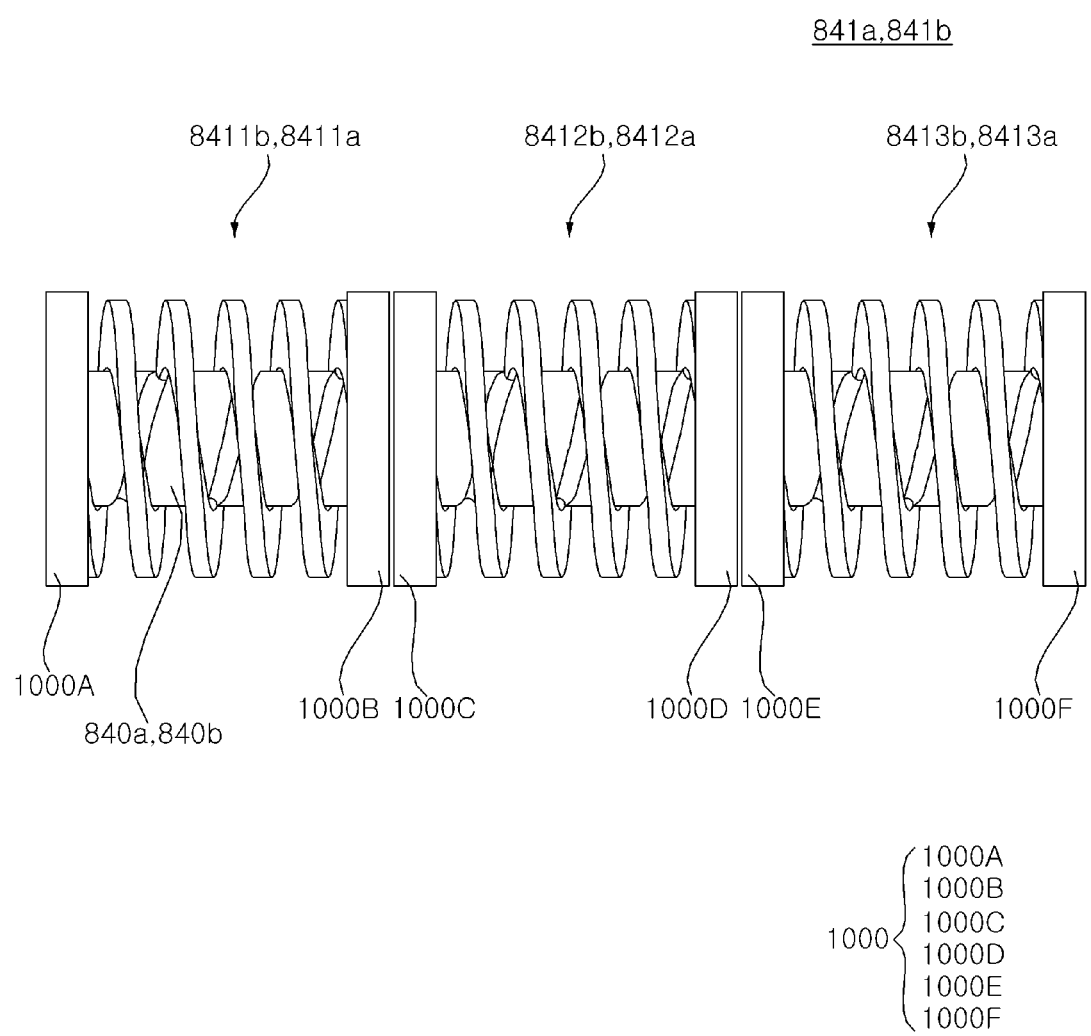

Referring to FIGS. 63 and 67, there may be a plurality of spacers 1000. The plurality of spacers 1000 may include a first spacer 1000A, a second spacer 10006, a third spacer 1000C, a fourth spacer 1000D, a fifth spacer 1000E, and a sixth spacer 1000F.

The first spacer 1000A may be located at or inserted into one end of the first part spring 8411*a*, 8411*b*. In this case, the support rib 1003A of the first spacer 1000A may be located or inserted toward the first part spring 8411*a*, 8411*b*. The second spacer 10006 may be located at or inserted into the other end of the first part spring 8411*a*, 8411*b*, and the third spacer 1000C may be located at or inserted into one end of the second part spring 8412*a*, 8412*b*. In this case, the support rib 1003B of the second spacer 1000B may be located or inserted toward the first part spring 8411a, 8411b, and the support rib 1003C of the third spacer 1000C may be located or inserted toward the second part spring 8412a, 8412b. The third spacer 1000C may face or contact the second spacer 10006.

The fourth spacer 1000D may be located or inserted into the other end of the second part spring 8412a, 8412b, and the fifth spacer 1000E may be located or inserted into one end of the third part spring 8413a, 8413b. In this case, the support rib 1003D of the fourth spacer 1000D may be located or inserted toward the second part spring 8412a, 8412b, and the support rib 1003E of the fifth spacer 1000E may be located or inserted toward the third part spring 8413a, 8413b. The fourth spacer 1000D may face or contact the fifth spacer 1000E. The sixth spacer 1000F may be located or inserted into the other end of the third part spring 8413a, 8413b. In this case, the support rib 1003F of the sixth spacer 1000F may be located or inserted toward the third part spring 8413a, 8413b.

Figure 68:
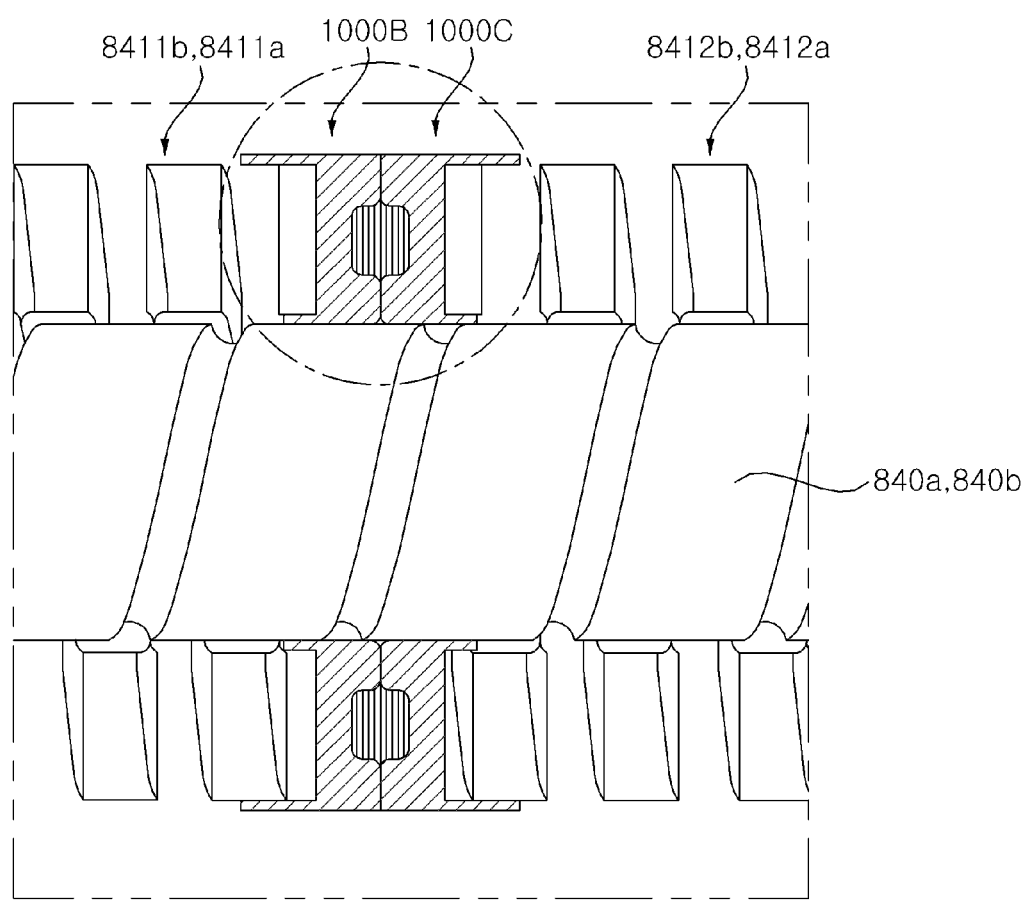
Figure 69:
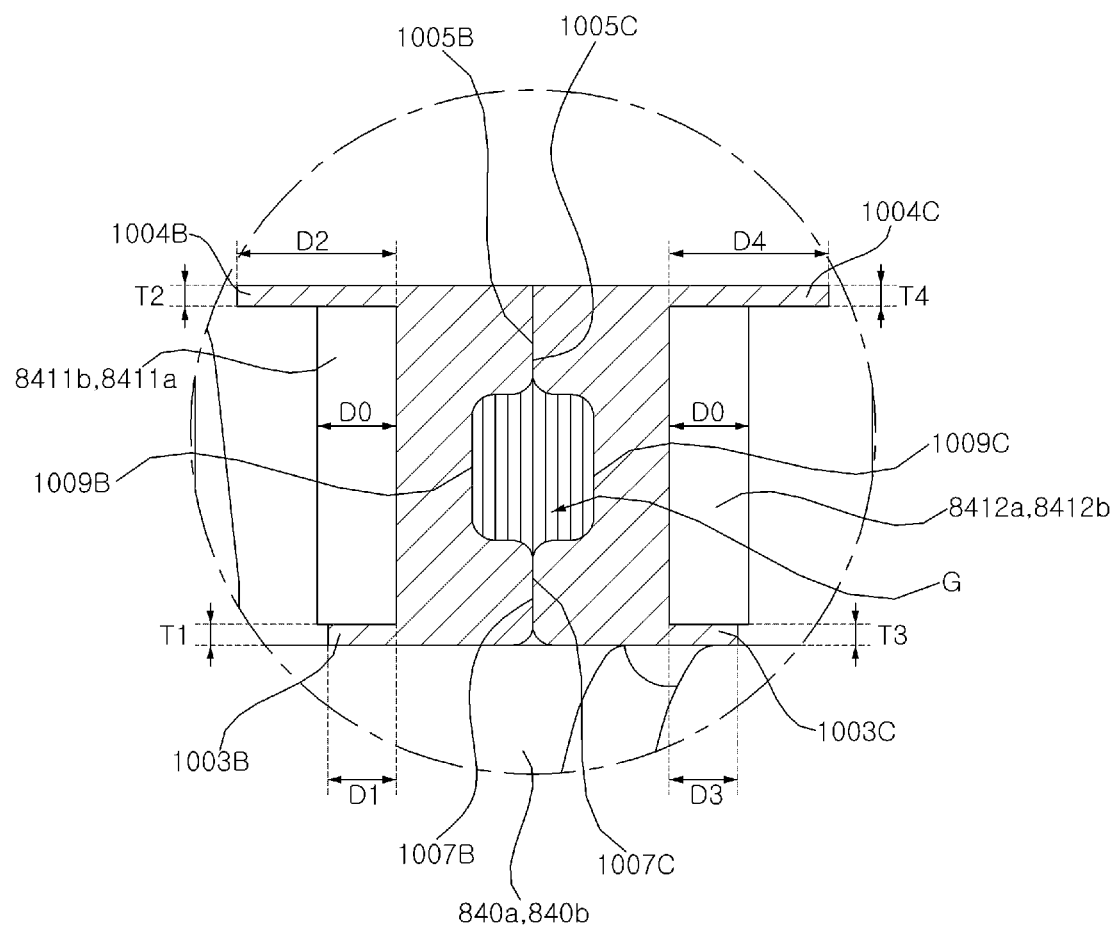

Referring to FIGS. 68 and 69 (the second spacer 1000B and/or the third spacer 1000C is described as an example, but may be applied to other spacers).

The support rib 1003B of the second spacer 1000B may support the first part spring 8411a, 8411b. The support rib 1003B of the second spacer 1000B may be inserted between the lead screw 840a, 840b and the first part spring 8411a, 8411b. The holding rib 1004B of the second spacer 1000B may support the first part spring 8411a, 8411b. The holding rib 1004B of the second spacer 1000B may support or contact an outer circumferential surface of the first part spring 8411a, 8411b.

A length D2 of the holding rib 10048 of the second spacer 10008 may be greater than a thickness D0 of a coil of the first part spring 8411a, 8411b. A length D1 of the support rib 1003B of the second spacer 1000B may be smaller than the thickness D0 of the coil of the first part spring 8411a, 8411b. Accordingly, damage to the support rib 10038 as being caught between the recesses of the lead screws 840a and 840b may be prevented.

A thickness T2 of the holding rib 1004B of the second spacer 1000B may be greater than a thickness T1 of the supporting rib 10038 of the second spacer 1000B.

Accordingly, vibration noise caused by compression and tension of the spring 8411a, 8411b, as well as other vibration noise due to movement of the spring 8411a, 8411b, may be prevented. In addition, vibration noise of the spring occurring due to strong sound pressure occurring in a speaker of the display device may be reduced accordingly.

The support rib 1003C of the third spacer 1000C may support the second part spring 8412a, 8412b. The support rib 1003C of the third spacer 1000C may be inserted between the lead screw 840a, 840b and the second part spring 8412a, 8412b. The holding rib 1004C of the third spacer 1000C may support the second part spring 8412a, 8412b. The holding rib 1004C of the third spacer 1000C may support or contact an outer circumferential surface of the second part spring 8412a, 8412b.

A length D4 of the holding rib 1004C of the third spacer 1000C may be greater than a thickness D0 of the coil of the second part spring 8412a, 8412b. A length D3 of the support rib 1003C of the third spacer 1000C may be smaller than the thickness D0 of the coil of the second part spring 8412a, 8412b. Accordingly, damage to the support rib 1003C as being caught between the recess of the lead screw 840a, 840b may be prevented.

A thickness T4 of the holding rib 1004C of the third spacer 1000C may be greater than a thickness T3 of the supporting rib 1003C of the third spacer 1000C.

Accordingly, vibration noise caused by compression and tension of the spring 8412a, 8412b, as well as other vibration noise due to flow of the spring 8412a, 8412b may be prevented. In addition, vibration noise of the spring occurring due to strong sound pressure occurring in the speaker of the display device may be reduced.

The first friction rib 1005B of the second spacer 1000B may face or contact the first friction rib 1005C of the third spacer 1000C. The second friction rib 10078 of the second spacer 10008 may face or contact the second friction rib 1007C of the third spacer 1000C. The second spacer 1000B may perform frictional rotation with respect to the third spacer 1000C. A lubricant such as lubricating oil or grease may be accommodated in the accommodation portions 10098 and 1009C. Accordingly, frictional rotation of the second spacer 10008 with respect to the third spacer 1000C may be smoothed.

Figure 70:
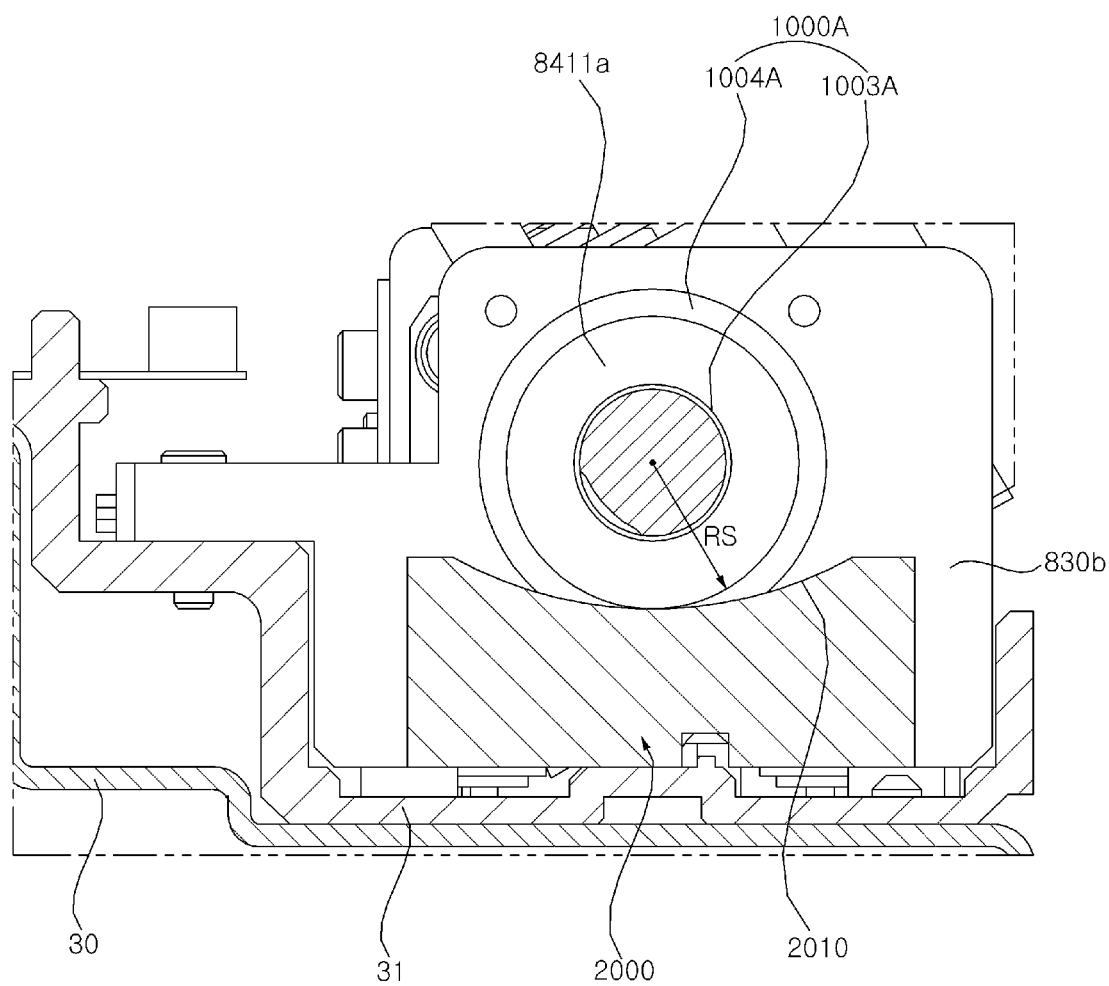

Referring to FIG. 70, a damping member 2000 may be located below the springs 841a and 841b and support the springs 841a and 841b. The damping member 2000 may be inserted or press-fitted between the base 31 and the spring 841a, 841b. For example, the spring 841a, 841b may be the first part spring 8411a, 8411b, and the damping member 2000 may be a sponge. As another example, the spring 841a, 841b may be the third part spring 8413a, 8413b.

The damping member 2000 may contact an outer peripheral surface of the spring 8411a. The damping member 2000 may provide a cushion to the spring 8411a. The damping member 2000 may have a depressed surface 2010 forming a concave upper surface. The depressed surface 2010 of the damping member 2000 may be elongated in a longitudinal direction of the spring 8411a. A radial direction of the depressed surface 2010 of the damping member 2000 may be the same as a radial direction of the spring 8411a. The concave upper surface 2010 of the damping member 2000 may be smaller than a curvature of the spring 8411a. For example, the curvature of the concave upper surface 2010 of the damping member 2000 may be $\frac{1}{2}$ to $\frac{1}{5}$ of the curvature of the spring 8411a.

Accordingly, vibration noise of the spring 841a, 841b occurring due to the strong sound pressure occurring in the speaker of the display device may be prevented.

Figure 71:
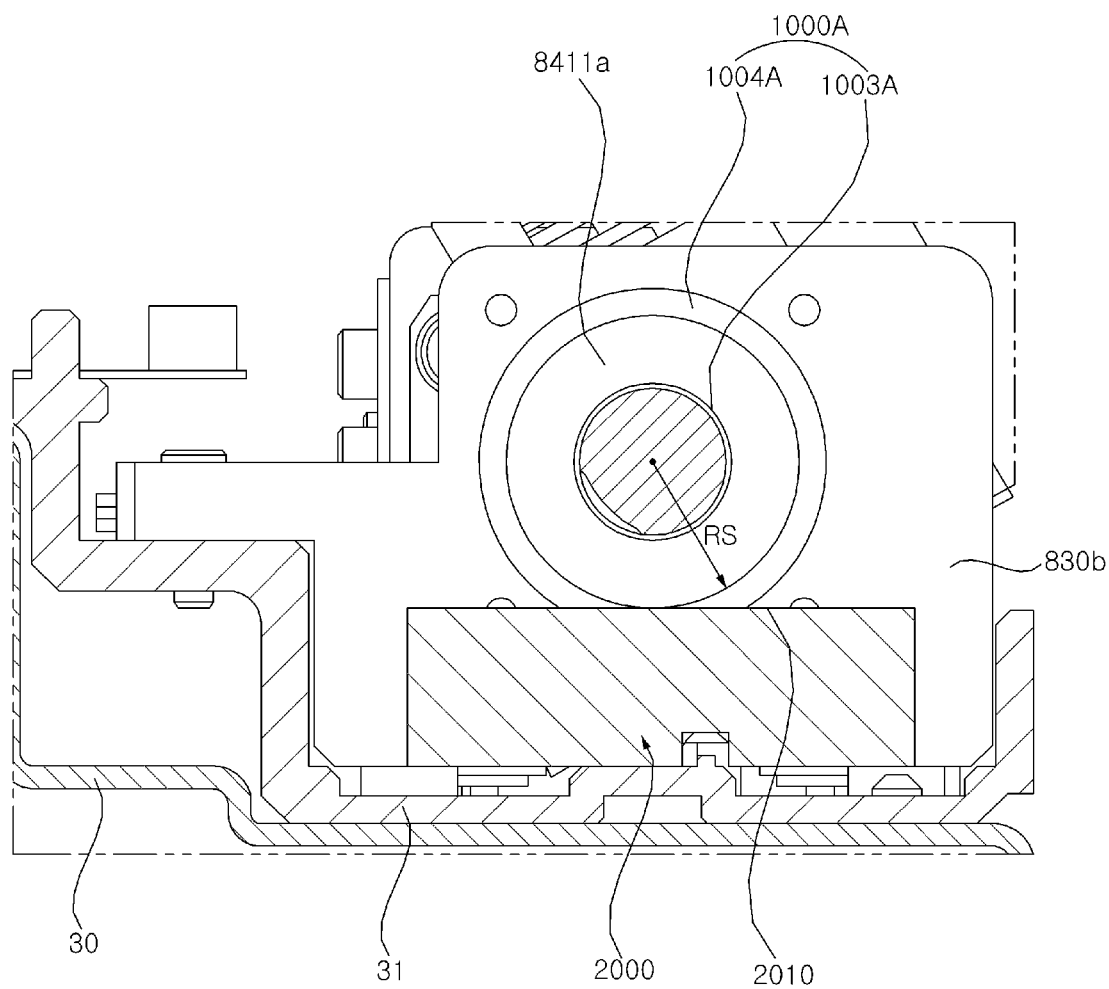

Referring to FIG. 71, the damping member 2000 may be located below the spring 841a, 841b and support the spring 841a, 841b. The damping member 2000 may be inserted or press-fitted between the base 31 and the springs 841a and 841b. For example, the spring 841a, 841b may be the first part spring 8411a, 8411b, and the damping member 2000 may be a sponge. As another example, the spring 841a, 841b may be the third part spring 8413a, 8413b.

The damping member 2000 may contact an outer peripheral surface of the spring 8411a. The damping member 2000 may provide a cushion to the spring 8411a. The damping member 2000 may have a depressed surface 2010 forming a concave upper surface. The depressed surface 2010 of the damping member 2000 may be elongated in the longitudinal direction of the spring 8411a. A radial direction of the depressed surface 2010 of the damping member 2000 may be the same as the radial direction of the spring 8411a. The concave upper surface 2010 of the damping member 2000 may be smaller than a curvature of the spring 8411a. For example, the curvature of the concave upper surface 2010 of the damping member 2000 may be $\frac{1}{10}$ to $\frac{1}{100}$ of the curvature of the spring 8411a.

Accordingly, vibration noise of the spring 841*a* and 841*b* occurring due to strong sound pressure occurring in the speaker of the display device may be prevented.

Certain or other embodiments of the invention described above are not mutually exclusive or distinct from each other. Certain or other embodiments of the invention described above may be used together or combined with each other in configuration or function For example, it means that a component A described in a specific embodiment and/or drawing may be combined with a component B described in another embodiment and/or drawing. That is, it means that, even if the combination of the components is not directly described, the combination is possible except for a case where the combination is described as impossible.

The detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A display device comprising:
    a housing;
    a roller installed inside the housing;
    a display wound around the roller;
    a link comprising a first arm pivotably coupled to the display and a second arm comprising a first end pivotably coupled to the first arm and a second end pivotably coupled to the housing;
    a lead screw installed inside the housing;
    a slider configured to slide along the lead screw according to a rotation of the lead screw;
    a rod having a first side connected to the slider and a second side connected to the second arm;
    a plurality of springs configured to receive the lead screw and provide an elastic force to the slider, wherein the plurality of springs are arranged in series; and
    a first spacer and a second spacer located between the plurality of springs and configured to receive the lead screw,
    wherein each of the first spacer and the second spacer comprises:
        a body configured to receive the lead screw;
        a support rib formed on a first side of the body and inserted between the plurality of springs and the lead screw;
        a holding rib formed on the first side of the body and supporting an outer circumferential side of one of the plurality of springs; and
        a friction rib being opposite to the support rib with respect to the body and formed on a second side of the body, and
    wherein the friction rib of the first spacer is in contact with the friction rib of the second spacer.

2. The display device of claim 1, further comprising:
    a damping member,
    wherein the damping member is in contact with an outer circumferential side of the spring and has a depressed surface that forms a concave upper surface such that a radial direction of the depressed surface corresponds with a radial direction of the spring.

3. The display device of claim 2, wherein a curvature of the spring is greater than a curvature of the depressed surface of the damping member.

4. The display device of claim 1, wherein the lead screw comprises a first lead screw and a second lead screw spaced apart from the first lead screw in a longitudinal direction of the first lead screw,
    wherein the display device further comprises a motor assembly disposed between the first lead screw and the second lead screw and configured to drive the first lead screw and the second lead screw.

5. The display device of claim 4, wherein the plurality of springs is configured to receive the first lead screw, and the plurality of springs comprises:
    a first part spring located between the motor assembly and the slider;
    a second part spring located between the slider and the first part spring; and
    a third part spring located between the slider and the second part spring,
    wherein:
    the first spacer and the second are spacer located between the first part spring and the second part spring; and
    a third spacer and a fourth spacer located between the second part spring and the third part spring.

6. The display device of claim 5, wherein the first spacer is symmetrical with the second spacer, and the third spacer is symmetrical with the fourth spacer.

7. The display device of claim 5, further comprising:
    a first bearing supporting a first side of the first lead screw; and
    a second bearing supporting a second side of the first lead screw.

8. The display device of claim 7, wherein the first bearing is located adjacent to the motor assembly, and the spacer further comprises:
    a fifth spacer located between the first bearing and the first part spring; and
    a sixth spacer located between the slider and the third part spring.

9. The display device of claim 5, wherein a length of the support rib is smaller than a thickness of a coil of the spring, and a length of the holding rib is greater than the thickness of the coil of the spring.

10. The display device of claim 9, wherein the thickness of the holding rib is greater than the thickness of the support rib.

11. The display device of claim 5, wherein the body has a ring shape, and the friction rib comprises:
    a first friction rib located adjacent to an outer diameter of the body; and
    a second friction rib located adjacent to an inner diameter of the body.

12. The display device of claim 11, further comprising:
    an accommodation portion located between the first friction rib and the second friction rib and forming a step from the first friction rib and the second friction rib,
    wherein a lubricant is applied to the accommodation portion.

13. The display device of claim 11, wherein the first spacer is symmetrical with the second spacer,
    wherein the first friction rib of the first spacer is in contact with the first friction rib of the second spacer and the second friction rib of the first spacer is in contact with the second friction rib of the second spacer.

14. The display device of claim 4, further comprising:
    a coupling connecting the motor assembly to the first lead screw.

* * * * *